United States Patent
Laroia et al.

(10) Patent No.: US 7,471,702 B2
(45) Date of Patent: Dec. 30, 2008

(54) METHODS AND APPARATUS FOR IMPLEMENTING, USING, TRANSMITTING, AND/OR RECEIVING SIGNALS AT LEAST SOME OF WHICH INCLUDE INTENTIONAL NULL TONES

(75) Inventors: Rajiv Laroia, Basking Ridge, NJ (US); Junyi Li, Bedminster, NJ (US); Frank A. Lane, Asbury, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 11/250,169

(22) Filed: Oct. 13, 2005

(65) Prior Publication Data

US 2006/0203709 A1 Sep. 14, 2006

Related U.S. Application Data

(60) Provisional application No. 60/660,022, filed on Mar. 9, 2005.

(51) Int. Cl.
*H04B 3/10* (2006.01)

(52) U.S. Cl. .................. 370/491; 370/343; 370/208; 455/452.2; 455/226.3; 455/267; 455/296; 455/101; 375/348

(58) Field of Classification Search .............. 370/208, 370/320, 335, 343, 344, 480, 491; 455/63.1, 455/63.4, 67.11, 67.13, 67.14, 68, 101, 226.1, 455/226.2, 226.3, 232.1, 233.1, 267, 296, 455/450–453, 455, 509, 561, 562.1, 701, 455/702; 375/227, 267, 346–348
See application file for complete search history.

(56) References Cited

U.S. PATENT DOCUMENTS 5,335,010 A  8/1994  Lindemeier et al.

(Continued)

FOREIGN PATENT DOCUMENTS

EP  0622911  11/1994

(Continued)

OTHER PUBLICATIONS

PCT International Search Report, for International Application No. PCT/US2006/008997, pp. 1-4, Aug. 3, 2006.

(Continued)

*Primary Examiner*—Duc Nguyen
*Assistant Examiner*—Anthony S Addy
(74) *Attorney, Agent, or Firm*—Kenyon S. Jenckes; Kenneth K. Vu; Thomas R. Rouse

(57) ABSTRACT

Base stations transmit strip signals using strip signal segments and self supporting modulation scheme techniques facilitating rapid channel estimate. A strip segment occupies one OFDM symbol time interval and uses a set of downlink tones; some, e.g., half, of the tones are left unused facilitating SIR measurement. The strip segments are advantageously timed to correspond to uplink access intervals in which connected wireless terminals do not typically transmit uplink signals. Connected wireless terminals including: multiple antennas used in combination, an antenna duplex module, single RF receiver chain and single RF transmitter chain, switch antenna coefficient combinations based on strip signal segment timing. The wireless terminal determines an independent downlink channel quality measurement, e.g., SNR and/or SIR for each strip signal segment and for on-going non-strip signaling. The wireless terminal compares channel quality measurements and selects an antenna coefficient combination to be used during non-strip signaling intervals obtaining very good antenna gain.

50 Claims, 22 Drawing Sheets

U.S. PATENT DOCUMENTS

| | | |
|---|---|---|
| 5,907,577 A | 5/1999 | Hoole |
| 6,172,970 B1 | 1/2001 | Ling et al. |
| 7,058,873 B2 | 6/2006 | Song et al. |
| 7,142,864 B2 | 11/2006 | Laroia et al. |
| 2002/0085641 A1 | 7/2002 | Baum |
| 2003/0003880 A1 | 1/2003 | Ling et al. |
| 2003/0203721 A1 | 10/2003 | Berezdivin et al. |
| 2004/0081131 A1* | 4/2004 | Walton et al. ............... 370/344 |
| 2005/0186921 A1 | 8/2005 | Hoo et al. |
| 2006/0116182 A1 | 6/2006 | Bekritski |

FOREIGN PATENT DOCUMENTS

| | | |
|---|---|---|
| EP | 0798878 | 10/1997 |
| EP | 1 032 153 | 8/2000 |
| EP | 1 091 447 | 4/2001 |
| GB | 2390514 | 1/2004 |
| WO | 04075023 | 9/2004 |
| WO | 05107304 | 11/2005 |

OTHER PUBLICATIONS

Notification of Transmittal of the International Preliminary Report on Patentability and PCT International Preliminary Report on Patentability, for International Application No. PCT/US2006/008997, pp. 1-5, Feb. 21, 2007.

* cited by examiner

METHODS AND APPARATUS FOR IMPLEMENTING, USING, TRANSMITTING, AND/OR RECEIVING SIGNALS AT LEAST SOME OF WHICH INCLUDE INTENTIONAL NULL TONES

RELATED APPLICATIONS

The present application claims the benefit of U.S. Provisional Patent Application Ser. No. 60/660,022, filed on Mar. 9, 2005, titled "METHODS AND APPARATUS FOR STRIP BASED SWITCHABLE ANTENNA", which is hereby expressly incorporated by reference.

FIELD OF THE INVENTION

The present invention relates to methods and apparatus for improving the communications for wireless communication devices including multiple antennas.

BACKGROUND OF THE INVENTION

One approach to measuring and evaluating different antenna coefficient combinations with multiple receive antennas is to route the outputs of the multiple receive antennas to different combining filters. One filter can be set to the set of antenna coefficients being used for current downlink signal processing, and that filter's output can be routed to the input of a $1^{st}$ RF processing chain in the receiver. A second filter can be set to a second set of antenna coefficients, e.g., a set of test coefficients, and the second filter's output can be input to a $2^{nd}$ RF processing chain in the receiver. Received signals are processed by each chain, channel quality in terms of signal to noise ratio (SNR) is measured for each chain and the results are stored. Subsequently, the set of test coefficients for the second filter are changed to another set of test coefficients and the channel quality measurement is again performed. After a sufficient number of sets of test coefficients have been evaluated, a comparison is performed and the set of coefficients providing the best channel quality is loaded into the $1^{st}$ filter. This approach has the disadvantages that two filters and two RF receiver chains are required, which increases cost, size, weight, and power consumption. In addition, the testing between different potential test coefficient sets is rather slow for each channel quality measurement. Based on the above discussion there is a need for improved methods and apparatus to measure and evaluate different antenna coefficient combining parameter sets.

It would be advantageous if methods and apparatus were developed which allowed for the evaluation of different antenna coefficient combinations using a single RF receiver chain thereby reducing cost and/or power consumption. It would also be beneficial if such methods and apparatus provided for rapid evaluation of test coefficient sets. Measurement techniques that rapidly achieved signal to interference ratio (SIR) information in addition to SNR information would be beneficial in obtaining a better overall selection of antenna combining coefficients.

Since a low cost mobile wireless combination devices with multiple antenna used in combination may be structured to use the same antenna combination simultaneously as a transmit antenna and receive antenna, inventive methods and apparatus that allow for the evaluation of different downlink channels without disrupting the uplink communications from the wireless terminal to the base station would also be beneficial.

A communications system employing some wireless communications devices with multiple antennas used in combination, typically includes many wireless communication devices with only a single antenna. It would be beneficial if the methods and apparatus employed for the wireless communication devices with multiple antennas used in combination did not require the base station to have to distinguish between types of wireless communication devices.

SUMMARY OF THE INVENTION

The present invention is directed to improving the communications for mobile wireless communications devices including: multiple antennas which can be used in combination or by selection. To simplify the description, antenna selection is treated as a special case of antenna combination where the combining coefficient is set to 1 for the selected one of the multiple antennas and set to 0 for all the other antennas. In some but not necessarily all embodiments, the communications methods and devices of the invention are used to implement wireless terminals which support OFDM communication. Various wireless communications devices implemented in accordance with the invention include an antenna duplex module with adjustable antenna gain elements, e.g., adjustable gain coefficients, a single receiver chain, and a single transmitter chain.

Some devices implemented in accordance with the invention support orthogonal frequency division multiplexing (OFDM) signaling and include multiple antennas which can be used in combination, an antenna duplex module with adjustable antenna coefficients, a single receiver RF chain, and a single transmitter RF chain. The mobile OFDM communications device may use novel strip downlink signals from a base station, which are one feature of the invention, as part of the testing, evaluation, and selection of possible antenna coefficient combinations.

The commonality of elements such as a single set of multiple antennas to be used in combination by both the receiver and the transmitter and a single antenna duplex module with adjustable antenna coefficients is advantageous in that cost, weight, and/or size can be kept lower than in other embodiments lacking commonality, yet the present invention supports evaluation, selection, and use of a wide range of antenna coefficient combinations to achieve very good antenna gain. The ability of a wireless communications device, implemented in accordance with the present invention, including a single RF receiver chain and a single RF transmitter chain to evaluate multiple antenna coefficient combinations, keeps cost, size, weight, and/or power consumption lower than other approaches using multiple RF receiver chains and/or multiple RF transmitter chains.

The present invention allocates time for a wireless communications device, e.g., mobile, implemented in accordance with the present invention, to check out possible alternative antenna combinations. A base station, implemented in accordance with the present invention, transmits strip channel segment broadcast signals using strip channel segments, at predetermined times in a downlink transmission sequence, to wireless terminals. In other times, the base station transmits non-strip channel segments. The strip channel segments and non-strip channel segments are transmitted in a time multiplex manner.

Each strip channel segment uses one OFDM symbol time interval. Each strip channel signal uses a strip channel segment, e.g., a segment using the set of downlink tones. In accordance with the present invention, the strip channel signal is communicated using a modulation scheme, referred to herein as self supporting modulation, wherein information modulated in a strip segment can be decoded without the need for information or signal measurements from outside the strip segment. With self-supporting modulation the strip channel segment can be decoded just based on the signal in the strip segment and without using the channel estimates derived from the signal in the previous time interval. The use of the self supporting modulation scheme allows the wireless terminal to decode the signal just based on the signal received in the OFDM symbol time of the strip channel segment, without requiring the channel estimation information derived from the previous OFDM symbol time intervals. In some embodiments, some of the tones of the strip channel segment are left unused to facilitate the measurement of interference power and therefore channel quality, e.g., SNR and/or SIR. The channel quality for a given antenna coefficient combination is measured based on the signal received in the OFDM symbol time of the strip channel segment using that antenna coefficient combination. In some embodiments, approximately half of the tones in a strip segment are transmitted with signal while approximately half of the tones are not transmitted. Those not transmitted tones can be used to measure the interference power, while the transmitted tones can be used to measure the signal and interference power. In some embodiments, the set of transmitted tones and the set of not transmitted tones are predetermined and known to the base station and the wireless terminals for a given strip segment.

In accordance with the invention, the wireless terminal uses an antenna coefficient combination, called the current combination, in the non-strip channel segments and measures the channel quality for the current combination from the signal received in the non-strip channel segments. The wireless terminal uses alternative (candidate) antenna coefficient combinations in the strip channel segments. Preferably, one alternative antenna coefficient combination is used in one strip channel segment. After the wireless terminal has measured the channel quality of the alternative antenna coefficient combinations, the wireless terminal compares it with the channel quality of the current combination, and decides whether to replace the current combination with an alternative one, preferably the one of the better channel quality, to be used in the subsequent non-strip channel segments. The wireless terminal can, and often does, change antenna coefficient combination sets between subsequent strip channel segments. In some embodiments, the wireless terminal switches to the selected alternative one at the end of the strip channel segments, which is the beginning of the subsequent non-strip channel segments. In some embodiments, one to three successive OFDM symbol time intervals are allocated in groups for strip signaling.

In accordance with one feature of the present invention, the strip channel segments are advantageously timed to occur within access intervals. The access intervals are time intervals reserved for "new" wireless terminals, e.g., a wireless terminal entering a cell or a wireless terminal powering on, to send unsynchronized uplink signals as part of a registration process to establish a point of network attachment. During the access time interval, those "existing" wireless terminals which already have a point of network attachment, and do not wish to change their point of network attachment, typically remain quiescent with regard to uplink signal transmissions. Therefore, if wireless terminals with a current point of network attachment, switch their antenna combination coefficient settings during the access interval to correspond to different downlink strip channel segments, their operation with regard to uplink signaling is not adversely affected or upset, and the wireless terminals can advantageously evaluate different downlink channels.

In addition to measuring downlink channel quality for each strip channel segment, the wireless terminal can maintain a channel estimate for the ongoing other downlink channel signaling, e.g., using received traffic channel segment, pilot channel segment, beacon channel segment, and/or other control channel segment signals. The channel estimates for non-strip channel segments typically are obtained from multiple OFDM symbol time intervals, and in some embodiments, are maintained and continue across strip channel segments provided that the antenna coefficient combination is unchanged in the those non-strip channel segments. However, if a new antenna coefficient combination is used, the channel estimates for the subsequent non-strip channel segments are to be re-initialized. In one embodiment, the re-initialization value is fixed. In another embodiment, the wireless terminal obtains and keeps the memory of the channel estimates for the downlink channel of the selected antenna coefficient combination from the signal received in the corresponding strip channel segment. The channel estimates can be obtained by the pilot signal in the strip channel segment and can be further obtained by the data signal in the strip channel segment once the data signal has been decoded. The channel estimates are then used as the re-initialization value for the subsequent non-strip channel segments.

The wireless terminal uses the channel quality measurements obtained from the strip segments and that from the non-strip segments to compare and select a set of antenna coefficients to be used as the antenna coefficients during the intervals of non-strip segment signaling. For example, the antenna coefficient set can be selected as a function of SNR and/or SIR, such that the selected antenna coefficient set corresponds to maximum SNR and/or SIR. In some embodiments, the wireless terminal may perform many tests of antenna combinations using many strip segments before making a selection that may result in a change of a non-strip segment antenna combination coefficient set, so as to limit the re-initializations of channel estimation used for ordinary signaling in the non-strip channel segments. Each re-initialization of channel estimate for ordinary signaling can be disruptive of communications as the decoder and/or encoder operation can be a function of measured channel quality.

The uplink channel has no channel coherence from one dwell to the next dwell, a dwell being a set of a fixed number of successive OFDM symbol times, e.g., seven, in which the uplink tone hopping is not changed. The antenna coefficient switching selection is based upon downlink channel quality measurement; however, it is reasonable to assume that an advantageous antenna combination for downlink signaling will, generally, also provide an advantageous antenna combination for uplink signaling. In accordance with the present invention both the uplink and the downlink use a common set of antennas in combination with the same antenna coefficients set being selected within a common duplex module.

In accordance with the present invention, the base station need not, and in many cases does not, know switching information and/or the sets of antenna coefficients being used by the wireless terminals. However, the base station benefits from the improved communication channels obtained by the wireless terminal switching selection which uses the better wireless terminal antenna coefficient combination. In addition, wireless terminals, that do not include multiple antennas with strip based switching capability, e.g., low cost wireless terminals with a single antenna, are unaffected by the strip based signaling, and can treat the strip based signals as they do with other downlink broadcast signals.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

DETAILED DESCRIPTION OF THE INVENTION

Figure 1:
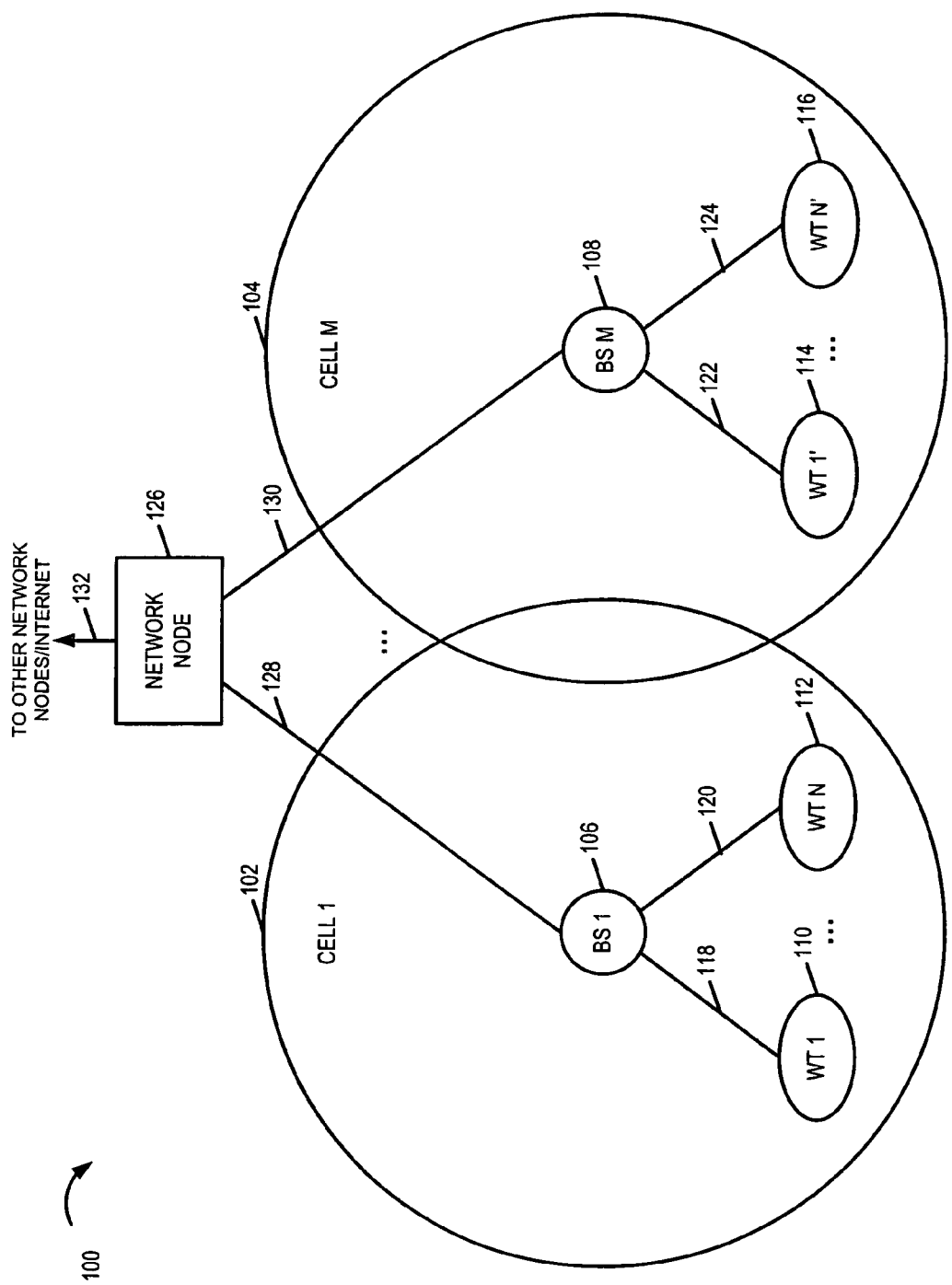
FIG. 1 is a drawing of an exemplary communications system, implemented in accordance with the present invention and using methods of the present invention.

FIG. 1 is a drawing of an exemplary communications system 100, implemented in accordance with the present invention and using methods of the present invention. Exemplary system 100 may be, e.g., an orthogonal frequency division multiplexing (OFDM) multiple access wireless communication system. System 100 includes a plurality of cells (cell 1 102, cell M 104). Each cell (cell 1 102, cell M 104) represents a wireless coverage area for a corresponding base station (BS 1 106, BS M 108), respectively. A plurality of wireless terminal (WTs) (WT 1 110, WT N 112, WT 1' 114, WT N' 116) are included in system 100. At least some of the WTs are mobile nodes (MNs); the MNs may move throughout the system 100 and establish wireless links with different BSs, the BS corresponding to the cell in which the WT is currently located. In FIG. 1, (WT 1 110, WT N 112) are coupled to BS 1 106 via wireless links (118, 120), respectively; (WT 1' 114, WT N' 116) are coupled to BS M 108 via wireless links (122, 124), respectively.

The BSs (106, 108) are coupled to network node 126 via network links (128, 130), respectively. Network node 126 is coupled to other network nodes, e.g., routers, other base stations, AAA server nodes, Home Agent nodes, etc. and/or the Internet via network link 132. Network links 128, 130, 132 may be, e.g., fiber optic links. Network node 126 and networks links 128, 130, 132 are part of a backhaul network linking various BSs in different cells together and providing connectivity so that a WT located in one cell can communicate with a peer node in a different cell.

System 100 may include a plurality of different types of WTs. At least some of the WTs (110, 112, 114, 116) have multiple antennas, are implemented in accordance with the present invention, and use methods of the present invention to choose antenna combining coefficient values to improve operation.

System 100 is shown having cells with one sector per cell. The methods and apparatus of the present invention are also applicable in systems having more than one sector per cell, e.g., 2, 3, or more than 3 sectors per cell. In addition the methods and apparatus of the present invention are applicable in systems having different numbers of sectors per cell in different portions of the system.

Figure 9:
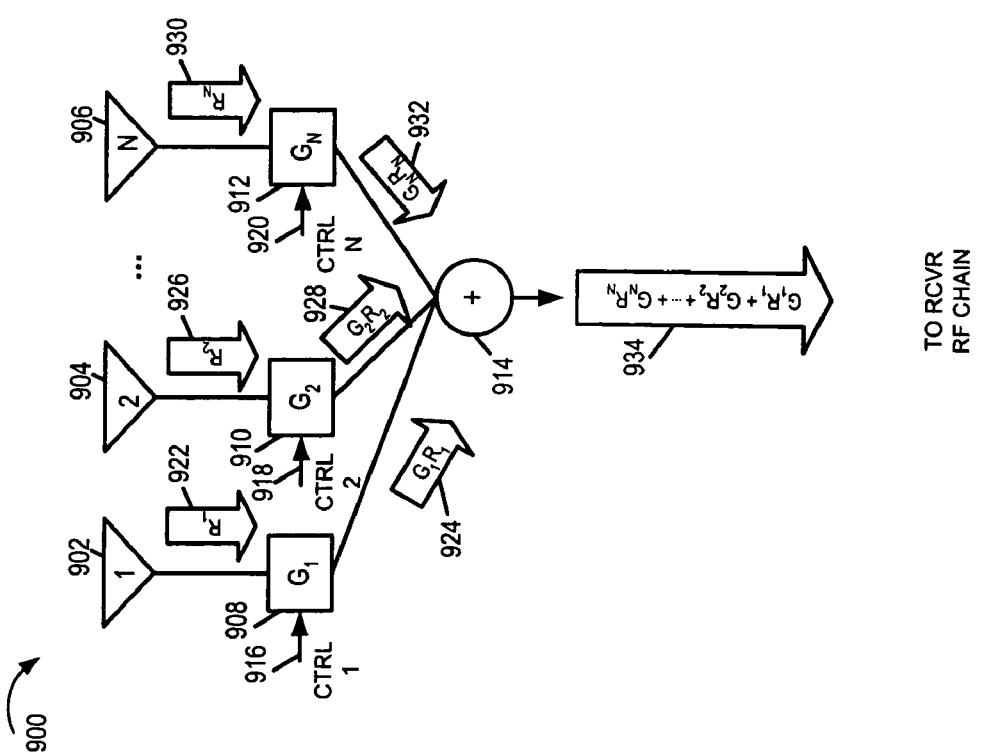
FIG. 9 is a drawing illustrating exemplary components and signaling in an exemplary wireless terminal in some embodiments of the present invention, said wireless terminal including one receiver RF chain.
Figure 12:
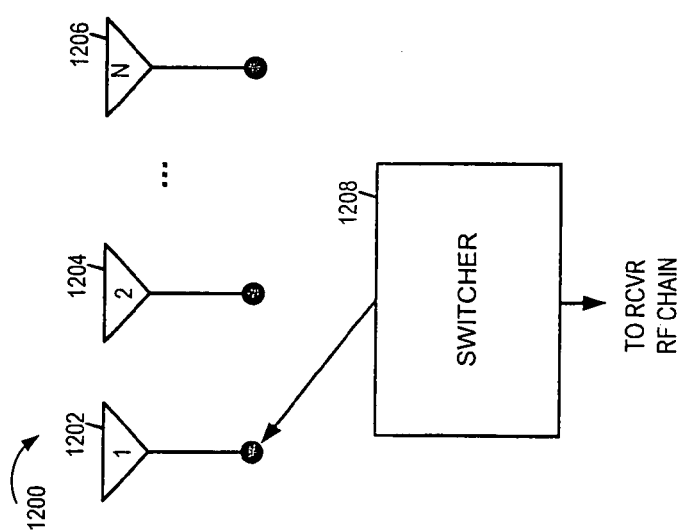
FIG. 12 is a drawing illustrating exemplary components in an exemplary wireless terminal in some embodiments of the present invention, said wireless terminal including one receiver RF chain and a switcher for selecting to use one of a plurality of antenna elements.

The wireless terminal equipped with multiple antennas can use the multiple antennas in at least the following two ways. One way is to combine the signals received in the multiple antennas, as illustrated in FIG. 9. In particular, the signal received in one antenna is multiplied by a coefficient and then combined to form the final received signal. The set of coefficients or gains determine the use of multiple antennas. In this case, the wireless terminal is equipped with a set of multipliers and gain controllers and a combiner. The other way is to select one out of the signals received in the multiple antennas, as illustrated in FIG. 12. In particular, at any given time, only the signal from one antenna is passed to the receiver and the signals from all the other antennas are not used. In this case, the wireless terminal is equipped with a switcher. Preferably, those antennas are directional antennas, each of which pointing to a distinct direction.

Note that the effect of the second way (antenna selection) can be achieved in the first way (antenna combination) by setting one coefficient corresponding to the selected antenna to 1 and resetting all the other coefficients to 0. Hence, to simplify the description, the subsequent description of the invention will treat the second way (antenna selection) as a special case of the first way (antenna combination). It is however noted that as pointed out in the above the implementation of the two ways is very different.

Figure 2:
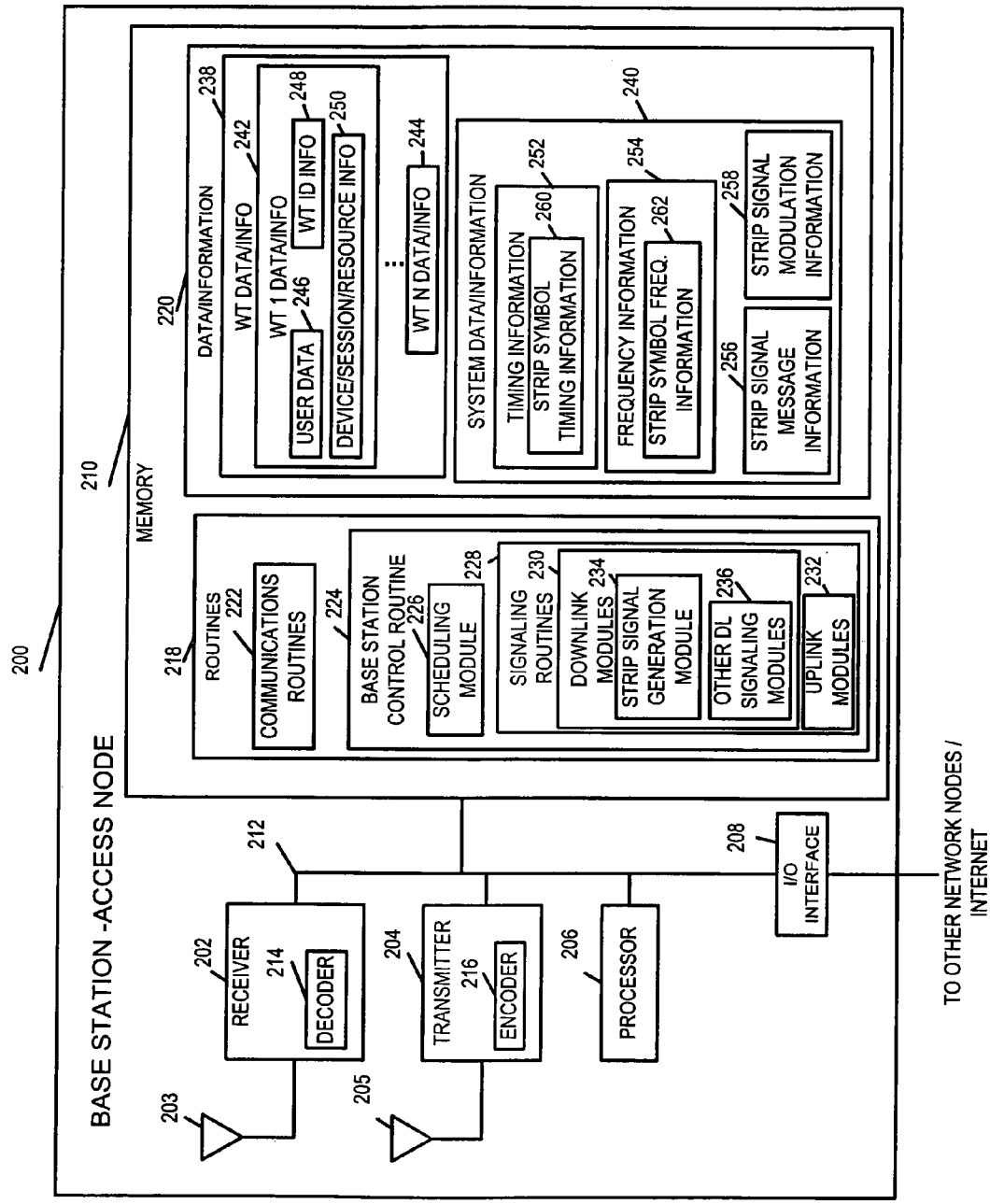
FIG. 2 is a drawing of an exemplary base station, implemented in accordance with the present invention and using methods of the present invention.

FIG. 2 is a drawing of an exemplary base station 200, implemented in accordance with the present invention and using methods of the present invention. Exemplary BS 200 is sometimes referred to as an access node. BS 200 may be any of the BS (106, 108) of system 100 of FIG. 1. Exemplary BS 200 includes a receiver 202, a transmitter 204, a processor 206, I/O interface 208, and memory 210 coupled together via a bus 212 over which the various elements may interchange data and information.

Receiver 202 is coupled to receive antenna 203 through which BS 200 may receive uplink signals from a plurality of wireless terminals. Some of the WTs may be communicating their uplink signals using multiple antennas in combination. The BS 200 need not, and in many cases does not know whether a WT is using one or multiple antennas to communicate its uplink signals. In addition, in cases where the WT is using multiple antennas in combination, BS 200, need not, and in many cases does not, know combination information being used by the WT. Receiver 202 includes a decoder 214 for decoding received encoded uplink signals.

Transmitter 204 is coupled to transmit antenna 205 over which downlink signals are sent to a plurality of wireless terminals. Transmitter 204 includes an encoder for encoding information prior to transmission. Transmitted signals from transmitter 204 include strip broadcast signals, using a self supporting modulation technique, in accordance with the present invention. The strip broadcast signals are used by WTs, implemented in accordance with the present invention, to test different antenna combinations. BS 200 need not, and in many cases, does not, know testing antenna combination information being used by WTs.

I/O interfaces 208 couples the BS 200 to other network nodes, e.g., routers, other base stations, AAA server nodes, Home Agent nodes and/or the Internet. I/O interface 208 provides an interface to a backhaul network providing interconnectivity between nodes in different cells.

Memory 210 includes routines 218 and data/information 220. The processor 206, e.g., a CPU, executes the routines 218 and uses the data/information 220 in memory 210 to operate the BS 200 and implement methods of the present invention.

Routines 218 include communications routines 222 and base station control routines 224. The communications routines 222 implement various communications protocols used by BS 200.

The base station control routines 224 control the operation of BS 200 including receiver 202 operation, transmitter 204 operation, I/O interface 208 operation, scheduling, power control, timing control, uplink signaling, and downlink signaling including strip signaling in accordance with the present invention. Base station control routines 224 include a scheduling module 226, and signaling routines 228. The scheduling module 226, e.g., a scheduler, schedules uplink and downlink channel air link resources, e.g., segments, to wireless terminal users.

Signaling routines 228 include downlink modules 230 and uplink modules 232. The downlink modules 230 include a strip signal generation module 234 and other downlink signaling modules 236.

The strip signal generation module 234 uses the data/information 220 including system data information 240 to generate strip downlink broadcast signals at the appropriate time in the downlink timing sequence. The strip signal generation module 234 uses n self supporting modulation scheme, in accordance with the present invention. The self supporting modulation scheme allows the wireless terminal to decode the signal just based on the signal received in the OFDM symbol time of the strip channel segment, without requiring the channel estimation information derived from the previous OFDM symbol time intervals. The use of the self supporting modulation scheme facilitates rapid changes in channel estimation allowing the WT to test and evaluate different antenna combinations for each of successive OFDM symbols without disrupting the signal reception during those time periods. In some embodiments, the strip signal generation module 234 generates one to three successive strip signals during an access interval, each strip signal corresponding to a different strip signal segment during a different OFDM timing interval. A single strip segment may include a set of downlink tones, e.g., the full set of downlink tones or a subset of the full set of downlink tones, for one OFDM symbol timing interval. The strip signal generation module 234 uses the tones of the strip segment to convey one or more strip signal messages. In accordance with some embodiments of the invention, some, e.g., approximately half, of the tones of a strip signal segment may be intentionally left unused, which others use non-zero power thereby facilitating the measurement of SNR and SIR by the WT receiving the strip signal. The allocation of tones between non-zero and zero power tones may vary from one OFDM timing interval to the next.

Other downlink signaling modules 236 include modules pertaining to traffic channel segment signals for user data, pilot channel segment signals, beacon channel segment signals, and other control channel segment signals, e.g., timing and power control signaling.

Uplink modules 232 includes signaling modules used to control the reception and processing of uplink signals from WTs including uplink traffic channel signals conveying user data, control channel signals conveying timing and power control information, resource request signaling, and registration signaling. In accordance with the present invention, the downlink and uplink timing is synchronized for BS 200 such that downlink strip signals are transmitted by BS 200 within access intervals, the access intervals being reserved time intervals including uplink access segments in which a WT entering a cell may send an unsynchronized registration request signal.

Data/information 220 includes WT data/information 238 and system data/information 240. WT data/information 238 includes a plurality of sets of WT data/information (WT 1 data/information 242, WT N data/information 244). Each set of WT data/info (244, 244) corresponds to a WT using or requesting to use BS 200 as a point of network attachment. WT 1 data/info 242 includes user data 246, WT ID information 248, and device/session/resource information 250. User data 246 includes data/information from WT 1 intended to be transmitted to peer nodes of WT 1 in communications sessions with WT 1 and data/information received from peer nodes of WT 1 intended to be forwarded to WT 1. WT ID information 248 includes identification information associated with WT 1 including, e.g., an IP address and a BS 200 assigned active user identifier. Device/session/resource information 250 includes uplink and downlink segments, e.g., traffic channel segments, assigned to WT 1 by scheduling module 226 and session information including address and routing information pertaining to peer nodes of WT 1 in communication sessions with WT 1.

System data/information 240 includes timing information 252, frequency information 254, strip signal message information 256, and strip signal modulation information 258. Timing information 252 includes timing structure information used by BS 200, e.g., OFDM symbol timing information, grouping of OFDM symbols such as halfslots, slots, superslots, beacon slots, ultra slots. Timing information 252 also includes timing relationships between the uplink and downlink segments. Timing information 252 includes strip symbol timing information 260 identifying the OFDM symbol intervals within an overall larger repetitive timing structure such an ultra slot to be used for strip signaling by BS 200. Strip symbol timing information 260 also includes information coordinating the strip signal symbols to be within uplink access intervals.

Frequency information 254 includes frequency structure information such as downlink bandwidth, downlink tones, uplink bandwidth, uplink tones, frequency tone hopping sequences, segment tone identification information. Frequency information 254 includes strip symbol frequency information 262 includes tones assigned to each downlink strip signal segment and designations of zero power tones and non-zero power tones within each strip signal segment. In some embodiments, about half of the tones of the strip signal segment include signal at non-zero power and about half of the tones have a zero transmission power level.

Strip signal message information 256 includes data/information, e.g., broadcast messages, conveyed in strip signals, prior to modulation and, in some embodiments, encoding. Strip signal modulation information 258 includes information identifying and used in the particular self supporting modulation scheme used for strip signal signaling by BS 200.

Figure 3:
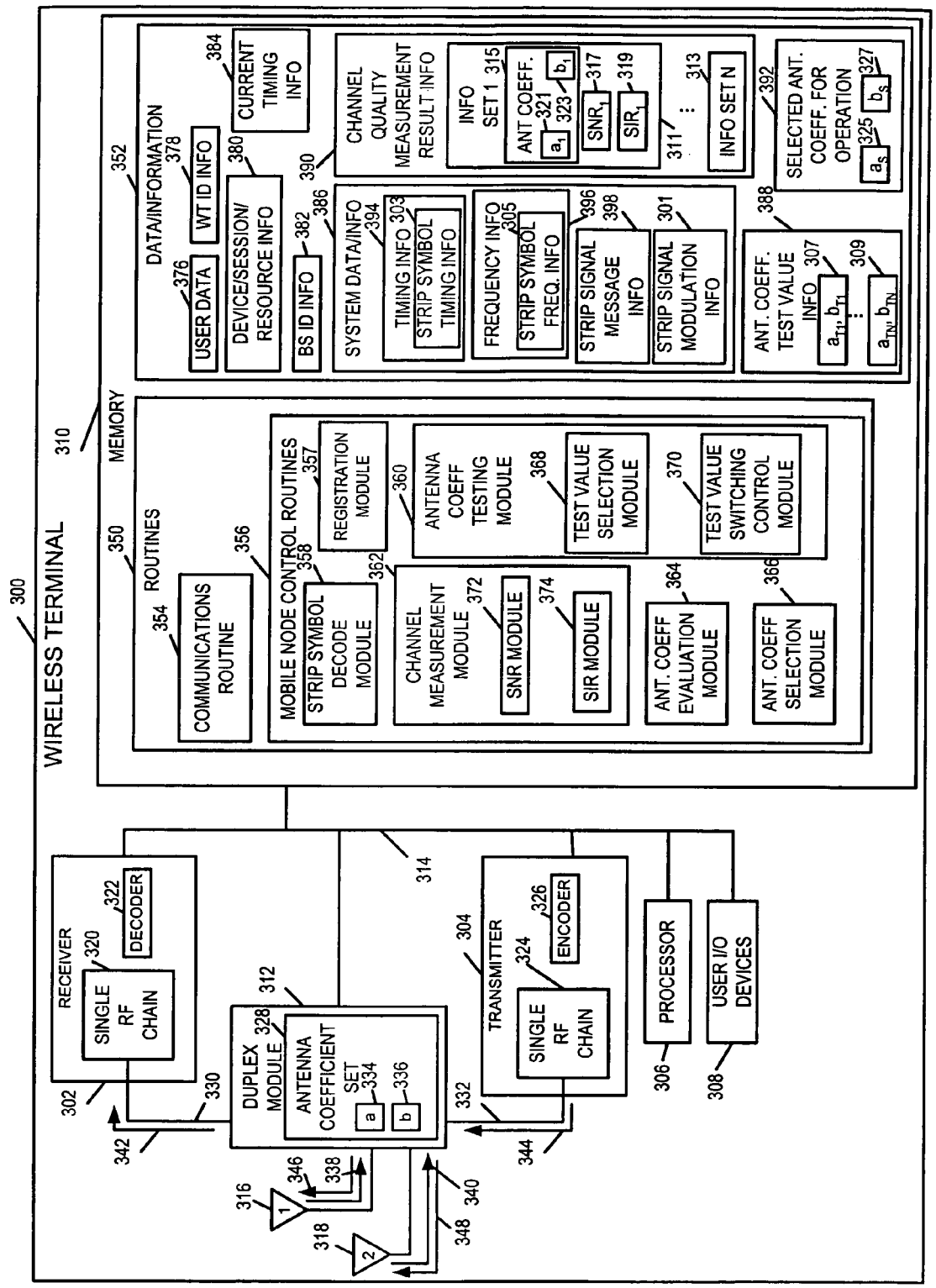
FIG. 3 is a drawing of an exemplary wireless terminal, implemented in accordance with the present invention and using methods of the present invention.

FIG. 3 is a drawing of an exemplary wireless terminal 300, implemented in accordance with the present invention and using methods of the present invention. WT 300 may be any of the WTs (110, 112, 114, 116) of system 100 of FIG. 1. Exemplary WT 300 includes a receiver 302, a transmitter 304, a processor 306, user I/O devices 308, a duplex module 312 and memory 310 coupled together via a bus 314 over which the various elements may interchange data and information.

Receiver 302 includes a single RF chain 332 and a decoder 322 for decoding downlink signals, while transmitter 304 includes a single RF chain 324 and an encoder 326 for encoding uplink signals. Wireless terminal 300 includes two antennas (antenna 1 316, antenna 2 318) coupled to the duplex module 312. The two antennas (316, 318) may be located such as to provide conventional antenna diversity based upon antenna separation distance in terms of wavelength or antenna orientation variation. However, the antennas (316, 318) need not, and in many cases have not been positioned to achieve these conventional antenna diversity effects. In many embodiments of the present invention, the antennas (316, 318) are positioned relatively closely together, e.g., due to size constraints of the wireless communications device. The duplex module 312, e.g., a controllable filtering module, allows the two antennas (316, 318) to be used in combination with different sets of antenna combining coefficients. The duplex module 312 also permits the same two antennas (316, 318) to be coupled simultaneously to both receiver 302 and transmitter 304, such that both antennas (316, 318) may be used in combination to function as both a receive antenna and a transmit antenna. Duplex module 328 includes a changeable antenna coefficient set 328 including antenna coefficient a 334, pertaining to antenna 1 316, and antenna coefficient b 336, pertaining to antenna 2 318. Antenna coefficients a 334 and b 336 may be, e.g., complex numbers.

Downlink signal 338 received via antenna 1 338 is modified by antenna coefficient a 334; downlink signal 340 received via antenna 2 318 is modified by antenna coefficient b 336; the modified signals are combined in duplex module 312 and exit as signal 342. Duplex module 312 is coupled to the input of the single RF chain 320 in receiver 302 via path 330 over which signal 342 is conveyed.

The output of single RF chain 324 in transmitter 304 is coupled to duplex module 312 via path 332 over which uplink signals 344 are communicated. Uplink signals 344 are modified by antenna coefficient a 334 and exit the duplex module 312 as signal 346 to be transmitted over antenna 1 316. In parallel, uplink signals 344 are modified by antenna coefficient b 336 and exit the duplex module 312 as signal 348 to be transmitted over antenna 2 318. Signals 346 and 348 shall be received as a combined signal by BS 200.

In accordance with the invention, the antenna coefficient set 328 within duplex module 312 is switched for strip symbol times to try out different a 334, b 336 combinations. In accordance with one feature of various embodiments of the present invention, the strip symbol times are structured to be within the access time interval. The access time interval is a reserved time interval during which a WT 300 entering a cell may send an unsynchronized signal as a registration request. During this access time interval, WTs 300 which are currently registered with a BS 200 and do not wish to change the point of network attachment, remain quiescent and do not transmit uplink signals. This correspondence between strip symbol timing and access interval timing is advantageous in that different antenna coefficients sets 328, with different channel conditions may be tested, for a currently registered WT 300, without disrupting normal uplink channel communications.

By using a single RF chain 320 in receiver 302, a single RF chain 324 in transmitter 304, and commonality of antennas set (316,318) for both reception and transmission, cost is reduced over implementations using multiple RF chains and/or multiple antenna sets. In addition, the use of single RF chains 320, 324 results in lower power consumption over multiple RF chain implementations, a significant consideration in battery powered communication devices. The commonality of the same antenna set (316, 318) and the same antenna coefficient set 328 used for both reception and transmission allows WT 300 to determine a favorable combination of coefficients based on the downlink channel measurement information and then also use the same set of coefficients to establish a corresponding uplink channel, which is likely to have favorable performance over other combinations.

User I/O devices 308 includes, e.g., microphones, speakers, keypad, keyboard, mouse, touchscreen, camera, displays, alarms, vibration device, etc. Various user I/O devices 308 are used to input user data/information intended for peer nodes of WT 300 and to output received data/information from peer nodes of WT 300. In addition, user I/O devices 308 are used by an operator of WT 300 to initiate various functions, e.g., power on, power off, place a call, terminate a call, etc.

Memory 310 includes routines 350 and data/information 352. The processor 306, e.g., a CPU, executes the routines 350 and uses the data/information 352 in memory 310 to control the operation of WT 300 and implement the methods of the present invention.

Routines 354 include a communications routine 354 and mobile node control routines 356. The communications routine 354 implements the various communications protocols used by the WT 300. The mobile node control routines 356 controls operations of WT 300 including the operation of receiver 302, duplex module 312, transmitter 304, and user I/O devices 308. Mobile node control routine 356 includes a registration module 357, a strip symbol decode module 358, an antenna coefficient testing module 360, a channel measurement module 362, an antenna coefficient evaluation module 364, and an antenna coefficient selection module 366.

Registration module 357 is used to control signaling to register WT 300 with a BS 200 when the WT 300 enters the cell corresponding to BS 200 and seeks to establish BS 200 as a point of network attachment. Registration module 357 controls the generation and transmission of an unsynchronized registration request uplink signal transmitted by WT 300 during an access interval on an access segment, e.g., a contention based access segment. If WT is already registered with BS 200, and does not seek to register with a different BS point of network attachment, then WT 300 remains quiescent and does not transmit uplink signals during the access interval.

Strip symbol decode module 358 operates in coordination with decoder 322 to decode received strip signals which have communicated using a self supporting modulation scheme. This is in contrast to the scheme used in a non-strip channel segment. In a non-strip channel segment, the signal is typically communicated using a continuous (or coherent) modulation scheme, in which the wireless terminal assumes that the wireless channel does not vary discontinuously and therefore can continuously evolve the channel estimates over the time period during which the signal is transmitted and coherently decode the non-strip channel segment. The self supporting modulation scheme is used for the strip symbols since each strip symbol represents a different channel and the self supporting modulation scheme facilitates rapid changes in channel estimate because of different antenna coefficient combinations used.

Antenna coefficient testing module 360 controls the antenna coefficients used during the strip symbols. Antenna coefficient testing module 360 includes a test value selection module 368 and a test value switching control module 370. Test value selection module 368 determines the a, b antenna combination coefficient values to be used during each of the strip symbol intervals. The test value switching control module 370 controls the loading and changing of different antenna coefficient sets into duplex module 312 at the appropriate time in the timing sequence.

Channel measurement module 362 measures the quality of the downlink channels between BS 200 and WT 300 based on received downlink signals. The downlink channel varies when different antenna coefficients are used. Channel measurement module 362 may measure independent channel quality for each received strip symbol. In addition, the channel measurement module 362 may further estimate the downlink channel, e.g., the channel response coefficients, for each received strip symbol. In addition, the channel measurement module 362 may further estimate the downlink channel for the non-strip symbol downlink signals, and this estimation may be a filtered estimation using multiple OFDM symbol intervals. In some embodiments, the non-strip symbol channel estimate is an ongoing measurement which may be interrupted by strip signaling and resumes following strip signaling, until a determination is made to change the antenna coefficients used for non-strip signaling. Channel measurement module 362 includes a signal-to-noise ratio (SNR) module 373 and a signal-to-interference (SIR) module 374.

Antenna coefficient evaluation module 364 evaluates each channel quality measurement, e.g., SNR and/or SIR to predetermined minimal acceptable levels to determine if the antenna coefficient combination is acceptable for use. Using the channel quality measurement, which are acceptable for use, the antenna coefficient module 364 ranks the potential antenna coefficient combination based upon a predetermined criteria, e.g., highest to lowest SNR.

Antenna coefficient selection module 366 uses the evaluation information to perform a selection of the antenna combination to use for ordinary (non-strip signaling) operations and controls implementation of the selection. In some embodiments, the antenna coefficient selection module 366, performs a selection after a fixed number of antenna coefficient test combinations have been evaluated. In some embodiments, the antenna coefficient set selected to be used for regular (non-strip symbol) operation is controlled to remain constant for a minimum fixed amount of time or number of OFDM intervals, provided the corresponding channel quality continues to exceed a predetermined minimal acceptable threshold, thus acting to limit the number of re-initialization of the channel estimate for regular signaling. Each re-initialization can result in a temporary disruption in decoding operation. In some embodiments, the antenna coefficient selection module 366 selects the highest ranked set, e.g. the set corresponding to the best SNR. In some embodiments, an improvement gain of a predetermined level over the current selection is used as a factor in determining whether or not to switch antenna coefficient sets. When the antenna coefficient selection module 366 decided to implement a change, module 366 controls the duplex module 312 to implement the change during the access interval.

Data/information 352 includes user data 376, WT ID information 378, device/session/resource information 380, base station ID information 382, current timing information 384, system data/information 386, antenna coefficient test value information 388, channel quality measurement result information 390, and selected antenna coefficients for operation 392. User data 376 includes data/information intended for a peer of WT 300 in a communications session with WT 300 intended to be transmitted by WT 300 to BS 200 over uplink traffic channel segments. User data 376 also includes data/information sourced from a peer of WT 300 in a communications session with WT 300 and received from BS 200 via downlink traffic segments. Wireless terminal identification information 378 includes, e.g., a WT IP address and a BS 200 assigned WT active user identifier. Device/session/resource information 380 includes uplink and downlink segments, e.g., traffic channel segments, assigned to WT 300 and session information including address and routing information pertaining to peer nodes of WT300 in communication sessions with WT 300. Device/session/resource information 380 also includes information pertaining to device WT 300 such as, e.g., current software version, WT model number, device calibration parameters, power control information, and timing control information. Base station identification information 382 includes an identifier, e.g., a value of slope in a pilot tone hopping sequence, associated with the BS 200 being used as the current point of network attachment for WT 300.

Current timing information 384 includes information tracking the current time with respect to a point within a larger repetitive timing cycle, e.g., an ultra cycle, used by BS 200, the larger repetitive timing cycle including multiple strip symbols at predefined times within the cycle.

System data/information 386 includes timing information 394, frequency information 396, strip signal message information 398, and strip signal modulation information 301. Timing information 394 includes timing structure information, e.g., OFDM symbol timing information, grouping of OFDM symbols such as halfslots, slots, superslots, beacon slots, ultra slots. Timing information 394 also includes segment timing information and timing relationships between the uplink and downlink channel segments. Timing information 394 includes strip symbol timing information 303 identifying the OFDM symbol intervals designated for strip signaling within an overall larger repetitive timing structure such an ultra slot, the timing structure being known and used by BS 200 and WT 300. Strip symbol timing information 303 is used by WT 300 to determine when to switch antenna coefficients for test evaluation of different antenna combinations and when to restore the antenna coefficients to the selected set of operating antenna coefficients for non-strip signaling.

Frequency information 396 includes frequency structure information such as downlink bandwidth, downlink tones, uplink bandwidth, uplink tones, frequency tone hopping sequences, segment tone identification information. Frequency information 396 includes strip symbol frequency information 305 including tones assigned to each downlink strip signal segment and designations of zero power tones and non-zero power tones within each strip signal segment. In some embodiments, about half of the tones of the strip signal segment include signal at non-zero power and about half of the tones have a zero transmission power level.

Strip signal message information 398 includes format, framing, and/or coding information used for broadcast messages, conveyed in strip signals. Strip signal modulation information 301 includes information identifying the particular self supporting modulation scheme used for strip signal signaling by BS 200. Strip symbol decode module 358 uses the strip signal message info 398 and strip signal modulation information 301 when processing received strip signals.

Antenna coefficient test value information 388 includes information identifying or used to obtain the sets of antenna coefficient combination test values to be used by duplex module 312 during an OFDM symbol time interval corresponding to a strip segment. In some embodiments, the antenna coefficient test value information includes multiple predetermined sets of test coefficients $((a_{T1}, b_{T1})$ 307, $(a_{TN}, b_{TN})$ 309). In some embodiments, the antenna coefficient test value information 388 includes information used to derive sets of coefficients, e.g., formulas, sequences, coefficient change values, step sizes, etc.

Channel quality measurement results information 390 includes a plurality of sets of channel quality measurement information (info set 1 311, info set N 313). Each set of information (311, 313) corresponds to one set of antenna coefficients. Channel quality measurement information sets (311, 313) are obtained from results of the channel measurement module 362. Information sets (311, 313) include information from strip signal based measurements or from measurements of non-strip signals, e.g., other downlink signals including, e.g., traffic channel signals, pilot signals, and/or beacon signals. Channel quality measurement information set 1 311 includes antenna coefficient set 315, signal to noise ratio 1 $(SNR_1)$ 317 and signal to interference ratio 1 $(SIR_1)$ 319. Antenna coefficient set 315 includes antenna coefficient $a_1$ 321 corresponding to antenna 1 316 and antenna coefficient $b_1$ 323 corresponding to antenna 2 318. SNR1 317 and SIR1 319 are derived from received downlink signals while the antenna coefficients 328 in the duplex module 312 are set to antenna coefficients 315. Selected antenna coefficients for operation 392 includes a set of antenna coefficients to be used by the duplex module 312 of WT 300 for non strip based signaling, e.g., signaling including downlink and uplink traffic channel signaling. Selected antenna coefficients for operation includes $a_s$ 325 corresponding to antenna 1 316 and $b_s$ 327 corresponding to antenna 2 318.

Figure 4:
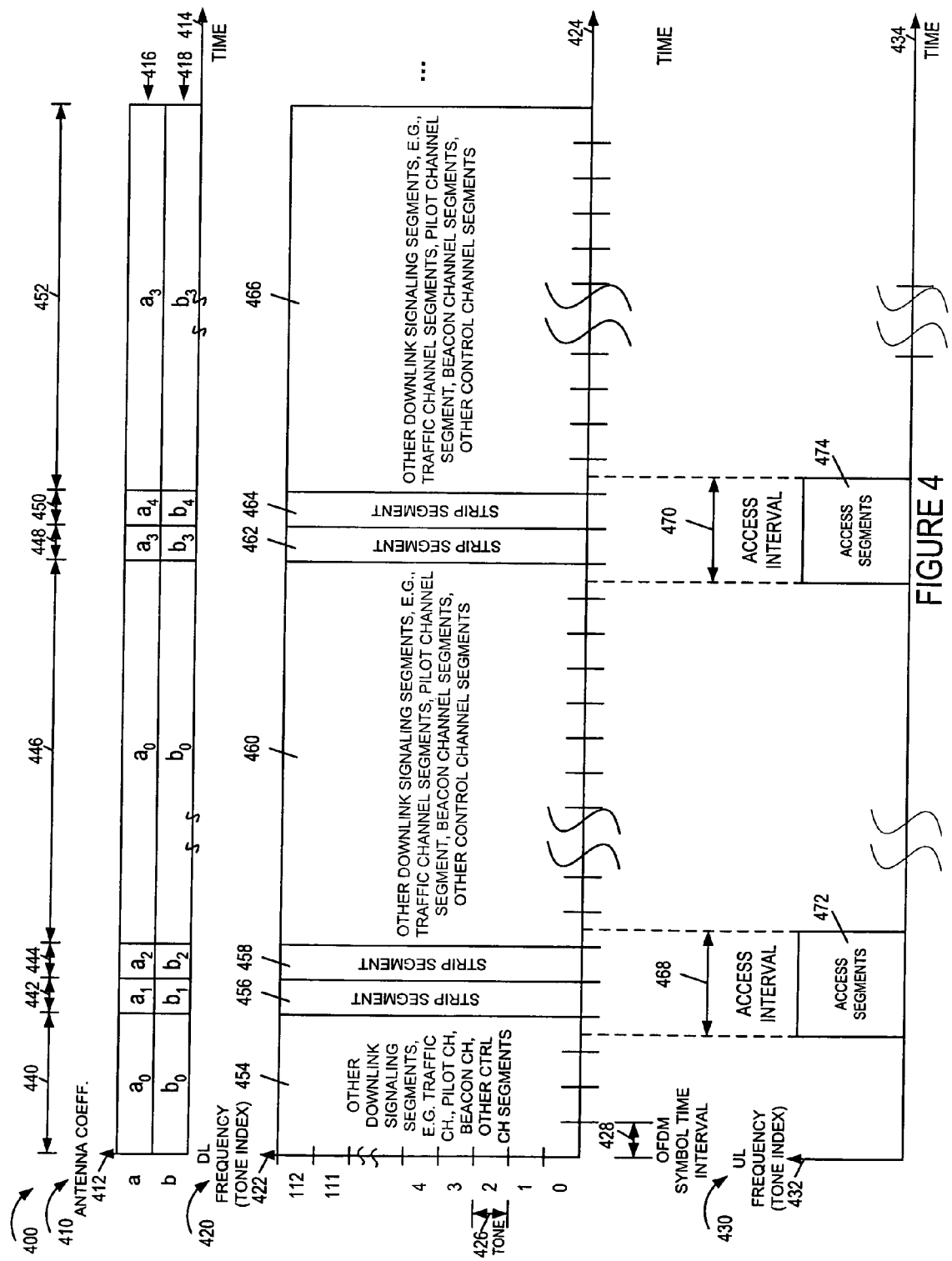
FIG. 4 is a drawing illustrating exemplary timing relationships between antenna coefficient changes, downlink signaling and uplink signaling, in accordance with various embodiments of the present invention.

FIG. 4 is a drawing 400 illustrating exemplary timing relationships between antenna coefficient changes, downlink signaling and uplink signaling. Drawing 400 includes a graph 410 indicating antenna coefficients on vertical axis 412 vs time on horizontal axis 414. Graph 410 indicates a pair of antenna coefficient values for antenna coefficient set 328 in duplex module 312 as a function of time. First row 416 illustrates antenna coefficient a 334 values, while second row 418 illustrates antenna coefficient b 336 values. Drawing 400 also includes a graph 420 of downlink frequencies (tone index) on vertical axis 422 vs time on horizontal axis 424. The basic unit of the vertical axis 422 is the tone 426. In this example, 113 different consecutive tones are used by the downlink. The basic unit of the horizontal axis 424 is an OFDM symbol time interval 428. A set of modulation symbols on the downlink tones during an OFDM symbol time interval is sometimes referred to as an OFDM symbol. If the OFDM symbol time interval corresponds to a strip segment, then the OFDM symbol is sometimes referred to as a strip symbol. Drawing 400 also includes a graph 430 of uplink frequencies (tone index) on vertical axis 432 vs time on horizontal axis 434. The timing used for axes 414, 424, and 434 is the same in FIG. 4.

In interval 440, the antenna 1 coefficient a 334 is set to $a_0$, the antenna 2 coefficient b 336 is set to $b_0$, and other downlink signaling 454 occurs including, e.g., signaling using downlink traffic channel segments, pilot channel segments, beacon channel segments, and other downlink control channel segments. The antenna coefficients are switched such that antenna coefficient a 334 is set to $a_1$ and antenna coefficient b 336 is set to $b_1$ for interval 442. Interval 442 corresponds to a downlink strip segment 456. The antenna coefficients are switched such that antenna coefficient a 334 is set to $a_2$ and antenna coefficient b 336 is set to $b_2$ for interval 444. Interval 444 corresponds to a downlink strip segment 458. The antenna coefficients are switched such that antenna coefficient a 334 is set to $a_0$ and antenna coefficient b 336 is set to $b_0$ for interval 446. During interval 460 other downlink signaling 460 occurs including, e.g., signaling using downlink traffic channel segments, pilot channel segments, beacon channel segments, and other downlink control channel segments.

The antenna coefficients are switched such that antenna coefficient a 334 is set to $a_3$ and antenna coefficient b 336 is set to $b_3$ for interval 448. Interval 448 corresponds to a downlink strip segment 462. The antenna coefficients are switched such that antenna coefficient a 334 is set to $a_4$ and antenna coefficient b 336 is set to $b_4$ for interval 450. Interval 450 corresponds to a downlink strip segment 464. The antenna coefficients are switched such that antenna coefficient a 334 is set to $a_3$ and antenna coefficient b 336 is set to $b_3$ for interval 452. During interval 452 other downlink signaling 466 occurs including, e.g., signaling using downlink traffic channel segments, pilot channel segments, beacon channel segments, and other downlink control channel segments.

In the example of FIG. 4, each exemplary strip segment 456, 458, 462, 464 occupies the set of 113 downlink tones for the duration of one OFDM symbol time interval. Each strip segment can convey a strip symbol conveying a strip signal using a self supporting modulation scheme. In one embodiment, the self supporting modulation scheme is a non-coherent modulation scheme in which the modulation scheme does not require estimating the wireless channel. An example is M-ary non-coherent orthogonal modulation. In another embodiment, the strip segment includes one or more pilot tones in the strip segment itself. Those pilot tones are preferably distributed across the frequency, so that the wireless terminal can just use those pilot tones to derive the channel estimates. Note that in this case, the channel estimates do not continuously evolve from the channel estimates derived in the previous time. Indeed, the channel estimates in the strip segment are independently of the channel estimates in the previous non-strip segment. Once the channel estimates are derived for the strip segment, the wireless terminal coherently decodes the signal transmitted in the strip segment. The idea of using a self supporting modulation scheme in the strip segment is that the demodulation of the strip segment does not rely on the channel estimation in the previous time interval, but is only based on the signal in the strip segment.

In some embodiments, some of the tones, e.g., approximately half of the tones, of each strip segment are intentionally left unused, e.g., no modulated symbol is transmitted by the BS on those tones. The tones in each strip segment with no BS transmission signal, may vary from one strip segment to the next strip segment. Unused tones in the strip signal segment facilitate measurement of SIR. Each strip segment can be used to provide a separate independent downlink channel quality measurement, e.g., SNR and/or SIR, corresponding to a set of test antenna coefficients. In addition, intervals 440, 446, and 450 can be used to measure and determine SNR and/or SIR for sets of antenna coefficients. In some embodiments, the channel estimate from a first non-strip segment interval 440 may be continued in a subsequent non-strip segment interval 446, e.g., when the antenna coefficients used in interval 440 and interval 446 are the same.

Strip segments 456 and 458 are grouped together and occur within access interval 468. Similarly strip segments 462, 464 are grouped together and occur within access interval 470. Each access interval (468, 470) includes uplink access segments (472, 474), respectively. The uplink access segments are used by WTs seeking to establish a network point of attachment with a base station to send an unsynchronized uplink signal or signals used in a registration process. During the access interval corresponding to access segments, WTs that already have a network point of attachment and do not wish to change the attachment point typically remain quiescent in regard to the transmission of uplink signaling. In accordance with the present invention, downlink strip segments are advantageously timed to correspond to uplink access segments. The antenna coefficients 328 used by the duplex module 312 are used for both downlink and uplink signaling. A WT 300, with a current point of network attachment, which switches between different antenna coefficients sets for evaluating different downlink channels based on different antenna coefficient combinations does not have its uplink signaling adversely affected, since such a WT does not transmit uplink signals during the strip segments. In addition, in some embodiments, changes between selected antenna coefficients for non-strip segment intervals of operation also occur with the access interval. For example, non-strip interval 446 uses antenna coefficients $a_0$, $b_0$ while the next subsequent non-strip interval 452 uses antenna coefficients $a_3$, $b_3$, and the changes of coefficients occur within access interval 470.

Numerous schemes may be used for testing different antenna coefficient combinations, in accordance with the present invention. For example, in some embodiments, the WT 300 may sequence through a set of possible combinations and then make a selection decision. For example, consider that the example of FIG. 4 includes 5 different sets of antenna coefficient combinations ($a_0$, $b_0$), ($a_1$, $b_1$), ($a_2$, $b_2$), ($a_3$, $b_3$), ($a_4$, $b_4$). After obtaining measurements, e.g., SNR and/or SIR for the five sets of possibilities, the WT 300 selects the best combination, e.g., based on some predetermined criteria and sets the normal operation antenna combination to that selection, e.g., set ($a_3$, $b_3$) starting with interval 452; subsequently strip segments will use antenna coefficient combinations ($a_0$, $b_0$), ($a_1$, $b_1$), ($a_2$, $b_2$), ($a_4$, $b_4$). The process of testing, result comparison, and selection repeats.

In some embodiments, the WT 300 makes a selection decision after each group of strip segments. For example, after interval 444, WT 300 may compare results from antenna coefficient combinations ($a_0$, $b_0$), ($a_1$, $b_1$), ($a_2$, $b_2$) and decide that ($a_0$, $b_0$) is the best selection, therefore the antenna coefficient combination is set to ($a_0$, $b_0$) for interval 446. After interval 450, WT 300 may compare results from antenna coefficient combinations ($a_0$, $b_0$), ($a_3$, $b_3$), and ($a_4$, $b_4$) and decide that ($a_3$, $b_3$) is the best selection; therefore, the antenna coefficient combination is set to ($a_3$, $b_3$) for interval 452. The process of testing, result comparison, and selection repeats.

In some embodiments, the number of downlink strip segments in a group is one to three. In some embodiments, the WT has three antenna coefficient combinations ($a_0$, $b_0$), ($a_1$, $b_1$), ($a_2$, $b_2$), in which case while one coefficient combination, e.g., ($a_0$, $b_0$), is used in a non-strip interval (interval 440), the WT tries out the other two coefficient combinations, e.g., ($a_1$, $b_1$), ($a_2$, $b_2$), respectively in the two strip segments (intervals 442 and 444) shown in FIG. 4, so that the WT obtains the channel quality conditions for all the three combinations before it enters the next non-strip interval (interval 446). In some embodiment, each access interval corresponds to a group of strip segments, while in other embodiments, some access intervals correspond to downlink strip segment groups while other access intervals do not correspond to strip segments.

Although the examples of the present invention are shown for the case of two antennas, the present invention is also applicable to implementations using more that two antennas in combination. The invention is also applicable to embodiments implemented with two or more antennas which may be used in combination wherein the combination uses less than the total number of available antennas. In some embodiments, one of the potential antenna coefficient combinations that may be selected for ordinary operation is such that one antenna is used and the other available antenna or antennas are unused.

In some embodiments, antenna coefficient combination possibilities are fixed sets. In other embodiments, antenna coefficient combinations are changing sets of coefficients. In some embodiments, the antenna coefficients used for strip signaling segment testing are chosen as a function of the current downlink channel ordinary signaling performance.

Figure 5:
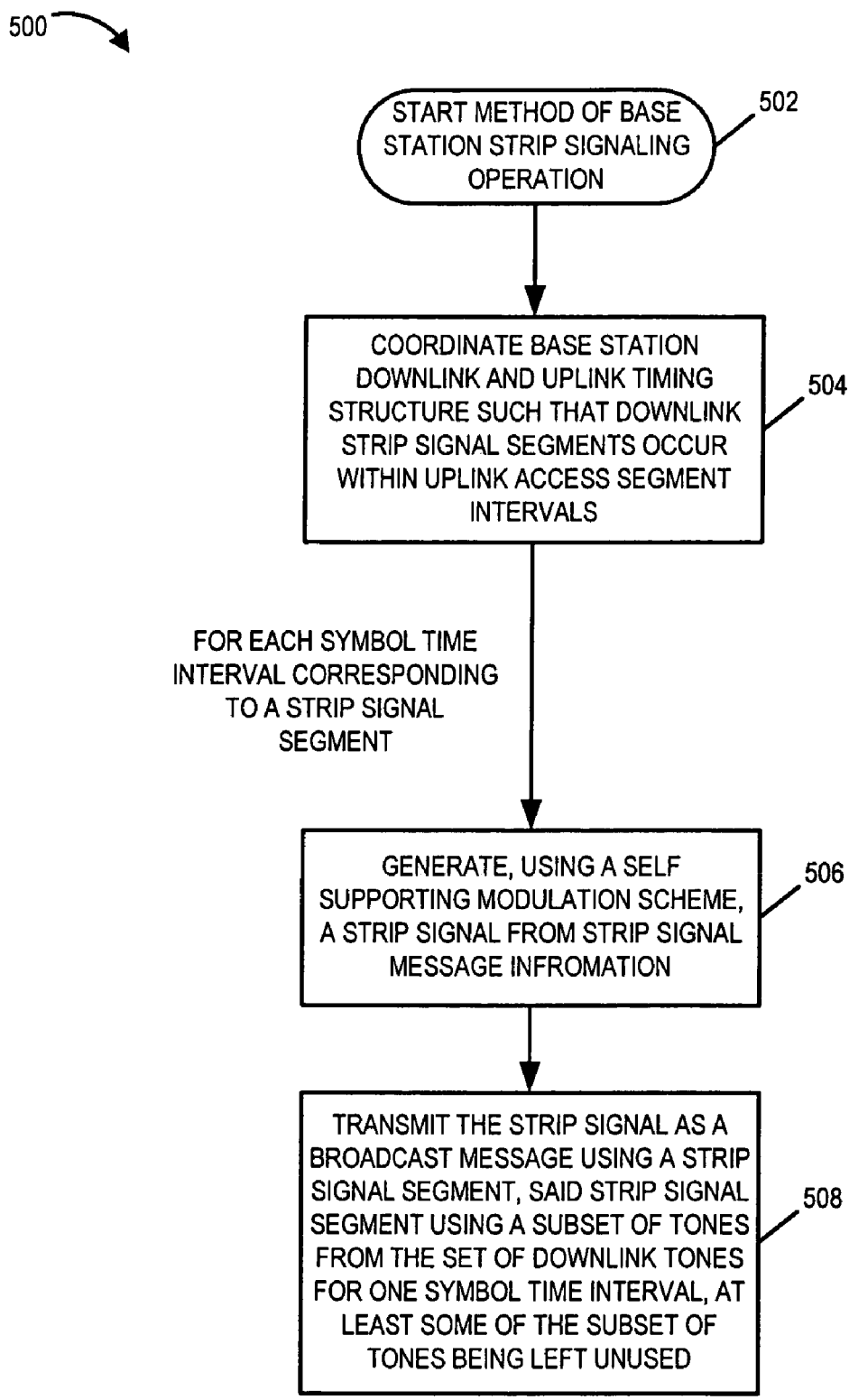
FIG. 5 is a flowchart of an exemplary method of operating a base station to perform downlink strip signaling in accordance with the present invention.

FIG. 5 is a flowchart 500 of an exemplary method of operating a base station, e.g., exemplary BS 200 of FIG. 2, to perform downlink strip signaling in accordance with the present invention. Operation of the method of strip signaling starts in step 502 where the base station is powered on, initialized, and starts operations using a predetermined downlink timing structure, e.g., a repetitive downlink timing structure, and a set of downlink tones, e.g., a set of orthogonal downlink tones. Operation proceeds from step 502 to step 504. In step 504, the base station is operated to coordinate base station downlink and uplink timing structure such that downlink strip signal segments occur within uplink access segment intervals.

For each symbol time interval corresponding to a strip signal segment, steps 506 and 508 are performed. In some embodiments in the downlink timing structure, strip signal segments are grouped in sets of one to three segments, each segment corresponding to a symbol time interval, the one to three successive downlink strip signal segments corresponding in time to an uplink access segment interval. Operation proceeds from step 504 to step 506.

In step 506, the base station is operated to generate, using a self supporting modulation scheme, a strip signal from strip signal message information. For example, the strip signal message information may convey base station parameters, e.g., an identifier, downlink power reference information, etc.; the modulation scheme may be an orthogonal modulation scheme, and the strip signal may be a set of modulation symbols representing the mapping of the strip signal message information using the orthogonal modulation scheme onto tones within the strip signal segment. The use of a self supporting modulation scheme for the strip signaling facilitates a rapid channel estimate using measurements from a single symbol time interval. Operation proceeds from step 506 to step 508.

In step 508, the base station is operated to transmit the strip signal as a broadcast message using a strip signal segment, said strip signal segment using a subset of tones from the set of downlink tones for one symbol time interval, at least some of the subset of downlink tones being left unused. In some embodiments, the subset of tones of the strip signal segment is the complete set of downlink tone used by the base station corresponding to a downlink carrier. Wide tone coverage within the strip signal segment facilitates a channel estimate applicable to the set of downlink tones.

Leaving tones within the strip signal segment unused facilitates SIR channel quality measurement. In some embodiments, approximately half of the tones of the strip signal segment are intentionally left unused (not transmitted). Different embodiments are possible concerning which of the tones within the strip signal segment are to be unused. In some embodiments, at least some of said tones left unused are predefined and known to the base station and wireless terminal. In some embodiments, at least some said tones left unused are variable and depend on the information and/or encoding. The wireless terminal can use those unused tones to measure the interference power in the process of measuring the channel quality.

Figure 6A:
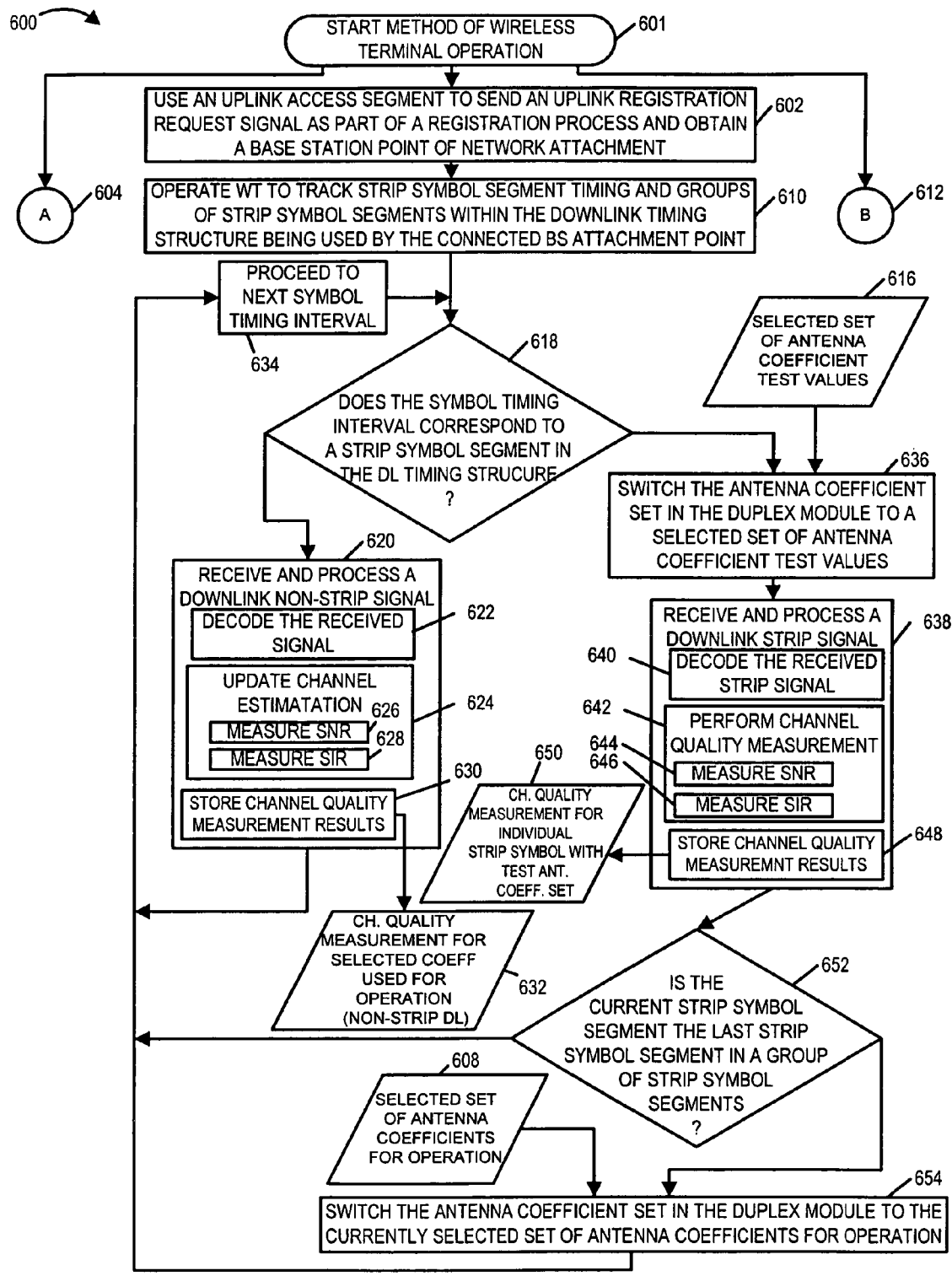
FIG. 6 comprising the combination of FIG. 6A
FIG. 6B is a flowchart of an exemplary method of operating a wireless terminal to perform strip signaling operations in accordance with the present invention.
Figure 6:
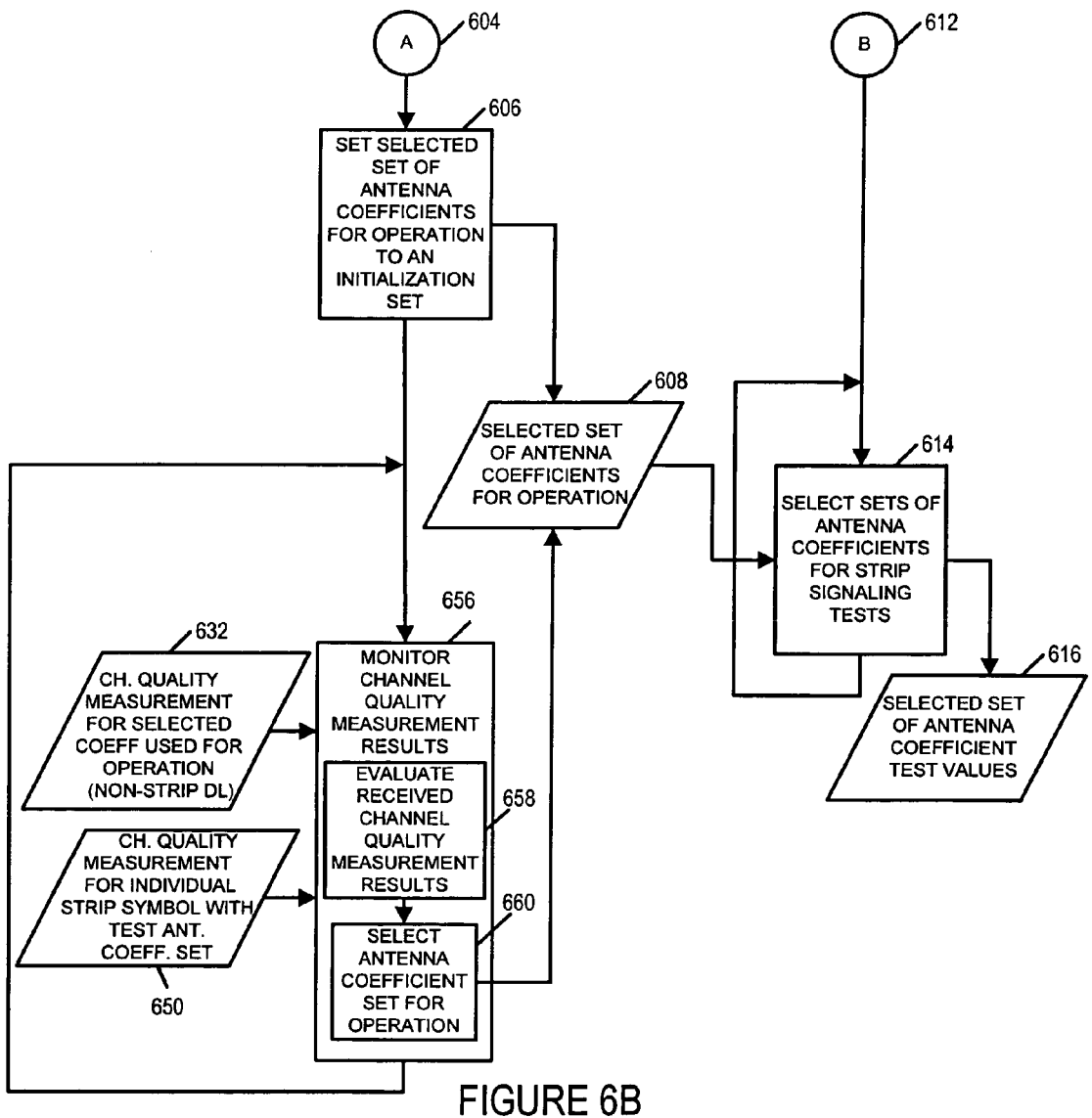

FIG. 6 is a flowchart 600 of an exemplary method of operating a wireless terminal, e.g., exemplary WT 300 of FIG. 3, to perform strip signaling operations in accordance with the present invention. Operation of the method of strip signaling starts in step 601 where a wireless terminal which has been powered on is initialized. Operation proceeds from start step 601 to connecting node A 604, step 602, and connecting node B 612. In step 602, the wireless terminal is operated to use an uplink access segment, e.g., a contention based uplink access segment, during an uplink access interval, to send a registration request signal as part of a registration process and obtain a base station point of network attachment. Downlink and uplink carrier frequencies, sets of downlink and uplink tones, e.g., orthogonal tones sets, and downlink/uplink timing structures are associated with the obtained point of network attachment. Operation proceeds from step 602 to step 610.

Returning to connecting node A 604, operation proceeds to step 606, in which the wireless terminal is operated to set selected set of antenna coefficients for operation 608 to an initialization set. The initialization set can be, e.g., a preselected value stored as part of a set of factory initial load parameters, the value last used by the wireless terminal in a previous turn-on, or the value last used by the wireless terminal associated with the BS point of network attachment to which the WT shall attempt registration.

Returning to connecting node B 612, operation proceeds to step 614, in which the wireless terminal is operated to select sets of antenna coefficients for strip signaling tests. The current selected set of antenna coefficients for operations 608 is used as an input to step 614, so that the selected set of antenna coefficient test values 616 output from step 614 is different than the set of antenna coefficients being currently used for non-strip signaling. Step 614 is repeated such that a selected set of antenna coefficient test values 616 is available to be used as input in step 636 for each strip symbol segment, with different sets 616 being output for different strip symbol segments in a group of strip symbol segments.

Returning to step 610, in step 610 the wireless terminal is operated to track strip symbol segment timing and groups of strip symbol segments within the downlink timing structure being used by the connected BS attachment point. Operation proceeds from step 610 to step 618. In step 618, the wireless terminal is operated to determine if the symbol timing interval corresponds to a strip symbol segment in the downlink timing structure. If the symbol timing interval does correspond to a strip symbol segment, then operation proceeds to step 636; otherwise operation proceeds to step 620. Typically there are many more time intervals used for non-strip downlink signaling than are used for downlink strip signaling. For example, in one exemplary embodiment, there may be one group of strip symbol segment symbol time intervals for every superslot, a superslot being a designated grouping in the downlink timing structure of many symbol time intervals; e.g., in one exemplary embodiment a superslot may use 113 consecutive symbol time intervals of which a group of one to three symbol times are reserved for strip symbol segments and the remaining 112 to 110 symbol time intervals are used for non-strip signaling.

In step 620, the wireless terminal receives and processes a downlink non-strip signal received over a non-strip downlink segment, e.g., a received symbol including a set of modulation symbols corresponding to each of the downlink tones conveying traffic channel information, beacon information, and/or control signaling data/information. Step 620 includes sub-steps 622, 624 and 630. In sub-step 622, the wireless terminal is operated to decode the received signal. The decoding is coherent and based on a channel estimation continuously evolving in the non-strip segment. Operation proceeds from sub-step 622 to step 624. In sub-step 624, the wireless terminal is operated to update the channel estimation corresponding to the set of selected antenna coefficients being used for non-strip signaling operation. Sub-step 624 further includes sub-step 626 in which the wireless terminal measures SNR and sub-step 628 in which the wireless terminal measures SIR. Operation proceeds from sub-step 624 to sub-step 630, in which the wireless terminal is operated to store the channel quality measurement results for selected coefficients used for operation (non-strip downlink signaling) 632. It should be understood that various operations performed in step 620 may be extended over multiple symbol times, e.g., decoding information from a block coherent set of downlink traffic channel information or obtaining an update for a channel estimate using received block coherent information. In such embodiments, channel estimate 632 may not be updated for each processed symbol time interval corresponding to step 620. Operation proceeds from step 620 to step 634.

Returning to step 636, in step 636, the wireless terminal is operated to switch the antenna coefficient set in the duplex module to a selected set of antenna coefficient test values 616. Operation proceeds from step 636 to step 638. In step 638, the wireless terminal is operated to receive and process a downlink strip signal. Step 638 includes sub-steps 640, 642, and 648. In sub-step 640, the wireless terminal is operated to decode the received strip signal. The strip signal has been encoded prior to transmission by the base station using a self supporting modulation technique known to both the base station and wireless terminal. The self supporting modulation scheme does not require the channel estimates derived from the signal of the previous time, i.e., the channel estimates established in step 620. Instead, the self supporting modulation scheme decodes the signal solely based on the strip segment. In sub-step 640, the wireless terminal may further derive and store the channel estimates for the tested antenna coefficient set so that they can be used as the re-initiation value if the tested antenna coefficient set is later selected to receive the subsequent non-strip segments. In sub-step 642, the wireless terminal is operated to perform a channel quality measurement, which includes measuring SNR 644 and measuring SIR 646. The channel quality measurement of sub-step 642 is based upon one symbol time interval corresponding to the strip symbol received during the strip symbol segment being evaluated and is independent of other symbol time intervals. In sub-step 648, the wireless terminal is operated to store the obtained channel quality measurement results of sub-step 642 as channel quality measurement for individual strip symbol with test antenna coefficient set 650. It should be noted that if the test antenna coefficients are unsuitable, then the wireless terminal may be unable to complete the decoding operation of step 640, and thus be able to obtain a values for the channel estimate. In such a case, predetermined information indicative of a failure to decode can be stored in place of a measured channel estimate value to indicate a failure to decode.

Operation proceeds from step 638 to step 652. In step 652, a check is made as to the whether the current strip symbol segment, is the last strip symbol segment in a group of strip symbol segments. In some embodiments strip symbol segments are structured in the predetermined downlink timing sequence used by a base station in groups of one to three. If the strip symbol segment whose signal was processed in step 638 was the last strip symbol segment in the group, then operation proceeds to step 654; otherwise operation proceeds to step 634. In step 654, the wireless terminal is operated to switch the antenna set in the duplex module to the currently selected set of antenna coefficients for operation 608. Operation proceeds from step 654 to step 634.

In step 634, the wireless terminal is operated to proceed to the next symbol timing interval in the downlink timing sequence, and operation continues with step 618.

Returning to step 606, operation proceeds from step 606 to step 656, where the wireless terminal monitors channel quality measurement results including channel quality measurement for selected coefficients used for operation (non-strip downlink) 632 and channel quality measurement for individual strip symbol with test antenna coefficient set 650. Note that non-strip operation channel quality measurement 632 corresponds to one set of antenna coefficient being used as the primary downlink antenna set; however, the value of the channel quality measurement may be filtered and change, e.g., slowly, over multiple symbol time intervals; in addition, the channel quality measurement 632 may be maintained across a group of strip signal segments and resume, e.g., without reset, following completion of the group of strip signal segments. In contrast, each channel quality measurement for a strip symbol segment 650 is independent of other symbol time intervals and corresponds to one set of antenna coefficient. For example, in one embodiment where strip symbol segments are structured in groups of three, three separate channel quality measurements 650 are obtained, each strip channel estimate 650 corresponding to a different set of antenna coefficients, and the three sets of antenna coefficients are different from the set of antenna coefficients used in obtaining the most recent non-strip signaling channel quality measurement 632.

Step 656 includes sub-step 658 and sub-step 660. In sub-step 658, the wireless terminal is operated to evaluate each channel quality, e.g., SNR and/or SIR to predetermined minimal acceptable levels to determine if the antenna coefficient combination is acceptable for use. Using the channel quality, which is acceptable for use, the wireless terminal ranks the potential antenna coefficient combination based upon a predetermined criterion, e.g., highest to lowest SIR. Operation proceeds from sub-step 658 to sub-step 660.

In sub-step 660, the wireless terminal uses the evaluation information to perform a selection of the antenna combination to use for ordinary (non-strip signaling) operations and controls implementation of the selection. The output from sub-step 660 is a selected set of antenna coefficients for operation 608. If the selected set is different than the set corresponding to estimate 632, then a new selected set replaces the current selected set, e.g., the value in set 608 is updated. In some embodiments, the wireless terminal performs a selection after a fixed number of antenna coefficient test combinations have been evaluated. In some embodiments, the antenna coefficient set selected to be used for regular (non-strip symbol) operation is controlled to remain constant for a minimum fixed amount of time or number of symbol time intervals, provided the corresponding channel quality continues to exceed a predetermined minimal acceptable threshold, thus acting to limit the number of re-initialization of the channel estimate for regular signaling. Each re-initialization can result in a temporary disruption in decoding operation. In some embodiments, the wireless terminal selects the highest ranked set, e.g. the set corresponding to the best SNR. In some embodiments, an improvement gain of a predetermined level over the current selection is used as a factor in determining whether or not to switch antenna coefficient sets. When the wireless terminal decides to implement a change, the wireless terminal controls its antenna duplex module to implement the change during the access interval, e.g., as part of step 654. After a new antenna coefficient set is selected, the channel estimates can be re-initialized to the value stored in step 638 or 650, which was obtained when the selected antenna coefficient set was tested in one of the previous strip channel segments. Since, the same antennas and antenna coefficient sets are used by the duplex module for both downlink and uplink signaling, by changing during an access interval, where the presently connected wireless terminal does not normally transmit uplink signals, wireless terminal uplink signaling is not interrupted by the antenna coefficient change. In addition the commonality between uplink and downlink antennas and duplex module antenna coefficients makes it likely that the uplink channel will also benefit from a set of operating antenna coefficients determined to be favorable for the downlink.

Step 656 is repeated on an ongoing basis as new channel estimate information 632, 650 is received.

In some embodiments, the signals transmitted in the strip segments are not necessarily broadcast messages. For example, an exemplary strip segment signal may be data/information intended for a set, e.g., four, wireless terminals. In some embodiments, the modulation techniques used during a strip signal segment may be a coherent modulation technique, e.g., in some embodiments a relatively large number of pilot symbols are conveyed in the strip symbol segment, so that a channel estimation can be obtained based on information within the strip symbol segment, and does not have to rely on information, e.g., pilot symbols from symbol time intervals prior to the strip signal segment. For example, in an exemplary downlink structure using 113 tones, 4 tones may be allocated during most symbol time intervals to convey pilot symbols; however, during a strip symbol segment, 16 tones may be allocated to convey pilot symbols.

Figure 7A:
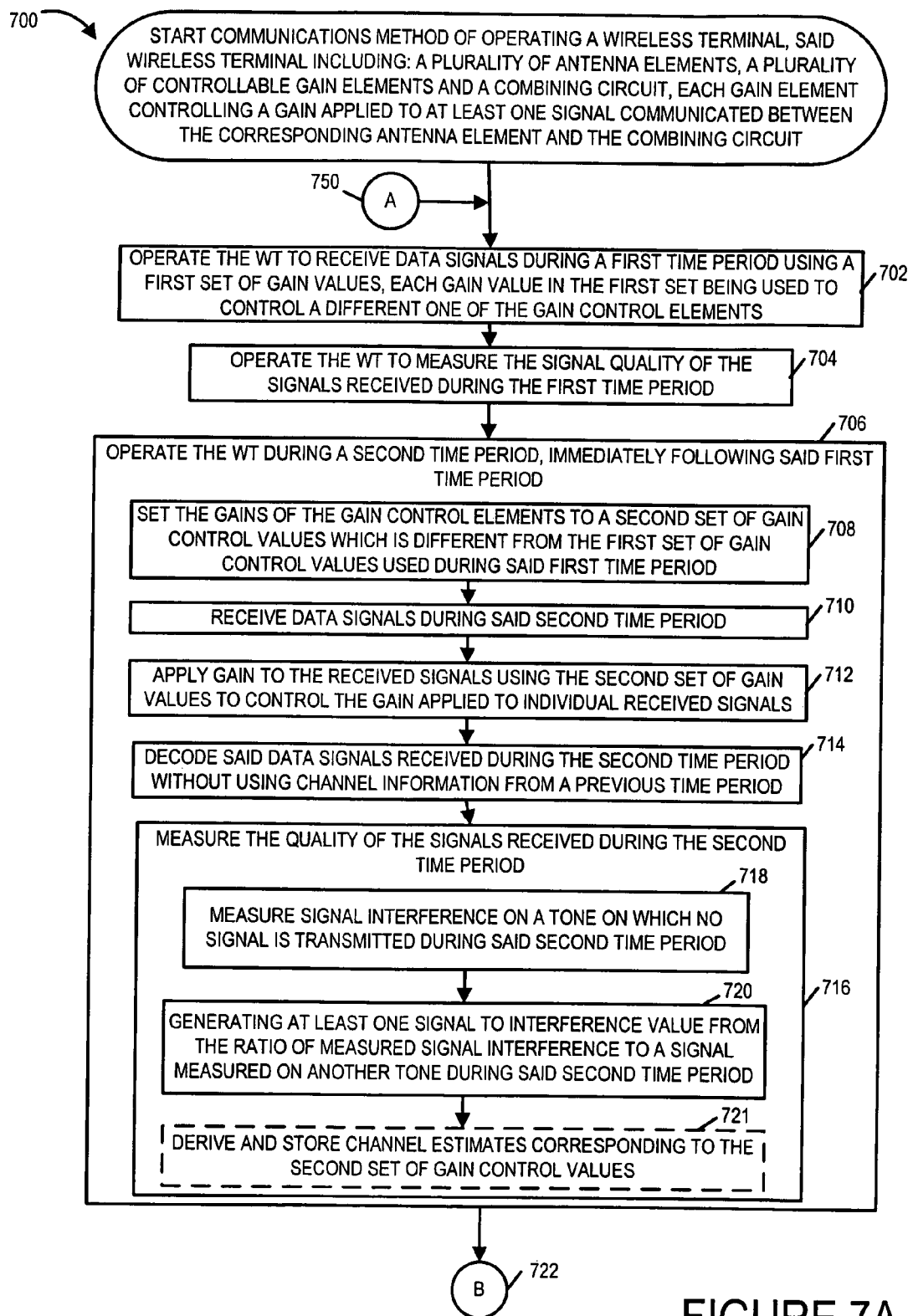
FIG. 7 comprising the combination of FIG. 7A
FIG. 7B is a flowchart of an exemplary communications method in accordance with the present invention for use by a wireless terminal implemented in accordance with the present invention.
Figure 7B:
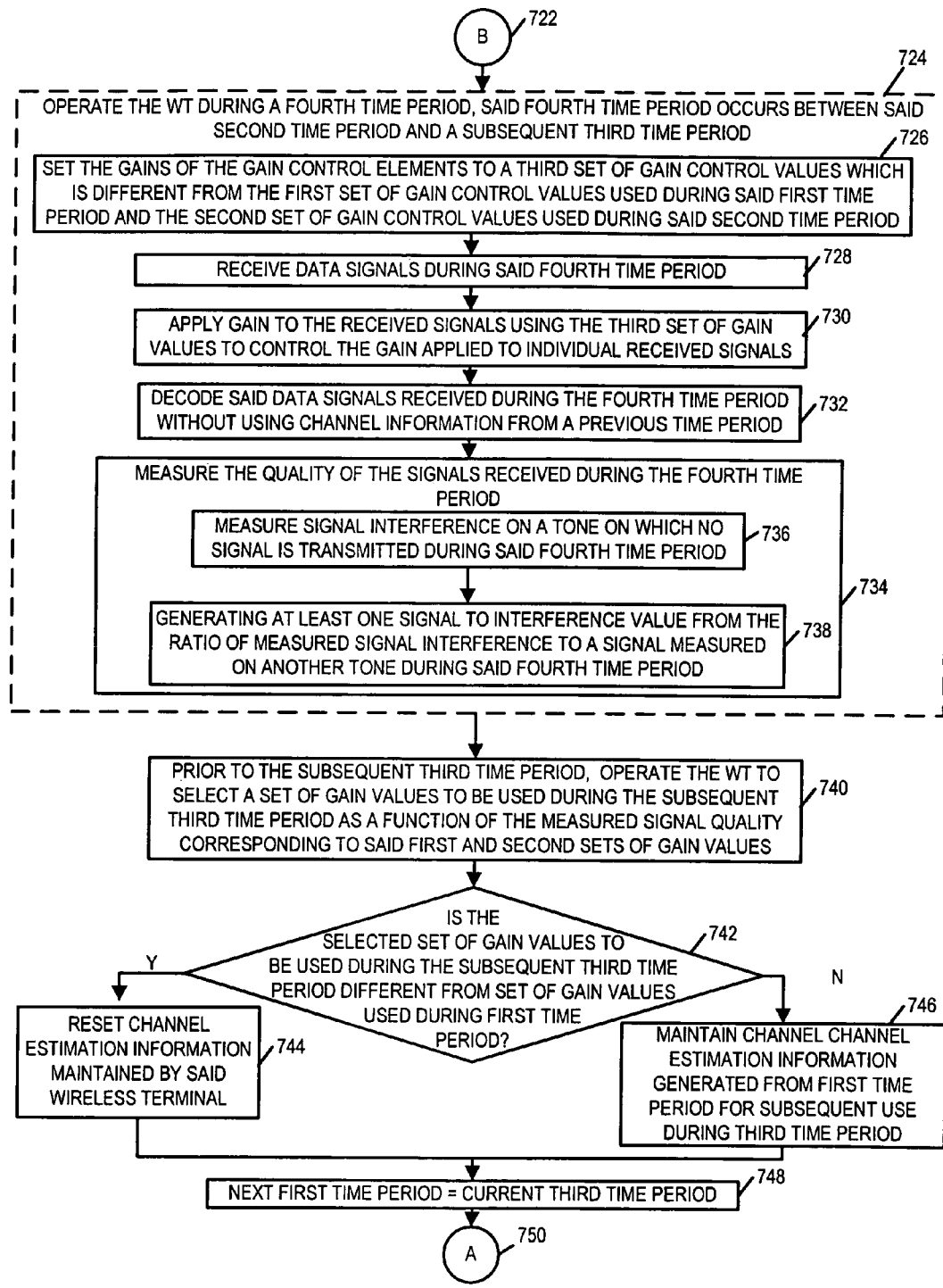

FIG. 7 comprising the combination of FIG. 7A and FIG. 7B is a flowchart 700 of an exemplary communications method in accordance with the present invention for use by a wireless terminal implemented in accordance with the present invention. The wireless terminal may be, e.g., exemplary wireless terminal 300 of FIG. 3. The wireless terminal includes a plurality of antenna elements, a plurality of controllable gain elements and a combining circuit, each gain element controlling a gain applied to at least one signal communicated between the corresponding antenna element and the combining circuit. In some embodiments, the wireless terminal has a single radio frequency receiver processing chain. In some embodiments, the wireless terminal has a single radio frequency transmitter chain. The wireless terminal may be part of a frequency division multiplexing system which includes a base station, e.g., BS 200 of FIG. 2, that transmits signals to said wireless terminal using a plurality of tones.

Operation starts in step 701, where the wireless terminal is powered and initialized, and has established a wireless communication link with a base station being used as a point of network attachment. Operation proceeds from start step 701 to step 702.

In step 702, the wireless terminal is operated to receive data signals during a first time period using a first set of gain values, each gain value in the first set being used to control a different one of the gain control elements. Operation proceeds from step 702 to step 704. In step 704, the wireless terminal is operated to measure the signal quality of the signals received during the first time period. Operation proceeds from step 704 to step 706.

In step 706, the wireless terminal is operated during a second period of time to perform method sub-steps 708, 710, 712, 714, and 716, said second period of time immediately following said first period of time. In sub-step 708, the wireless terminal is operated to set the gains of the gain control elements to a second set of gain control values which is different from the first set of gain control values used during said first time period. Then in sub-step 710, the wireless terminal is operated to receive data signals during said second time period. Operation proceeds from sub-step 710 to sub-step 712. In sub-step 712, the wireless terminal is operated to apply gain to the received signals using the second set of gain values to control the gain applied to the individual received signals. Operation proceeds from sub-step 712 to sub-step 714. In sub-step 714, the wireless terminal is operated to decode said data signals received during the second time period without using channel information from a previous time period. Operation proceeds from sub-step 714 to sub-step 716, where the wireless terminal is operated to measure the quality of the signals received during the second time period. Sub-step 716 includes lower level sub-step 718 and 720. In sub-step 718 the wireless terminal is operated to measure signal interference on a tone on which no signal is transmitted during said second time period. In the system, the base station may have been operated to transmit signals to said wireless terminal using a plurality of tones, and no signal is transmitted on at least some tones during said second time period. In some embodiments, wherein a plurality of tones are used during said second time period, the percentage of tones on which no signals are transmitted during said second time period is between 30% and 70% of the total number of tones used during the first time period. Then, in sub-step 720, the wireless terminal is operated to generate at least one signal to interference value from the ratio of measured signal interference to a signal measured on another tone during said second time period. In some embodiments, sub-step 716 also includes lower level sub-step 721. In sub-step 721, the wireless terminal may derive and store the channel estimates corresponding to the second set of gain control values. The channel estimates can be obtained from the pilot tones transmitted in the second time period, if there are pilot tones. Moreover, after the strip segment has been decoded, the tones in the strip segment become known and therefore can be used as training symbols to derive the channel estimates.

Operation proceeds from step 706 via connecting node B 722 to step 724.

In some embodiments, the downlink timing structure and system implementation is such that step 724 is bypassed and operation proceeds from connecting node B 722 to step 740. In step 724, the wireless terminal is operated during a fourth time period to perform sub-steps 726, 728, 730, 732, and 734, said fourth time period occurring between said second time period and a subsequent third time period. In sub-step 726, the wireless terminal is operated to set the gains of the gain control elements to a third set of gain control values which is different from the first set of gain control values used during said first time period and the second set of gain control values used during said second time period. Then, in sub-step 728, the wireless terminal is operated to receive data signals during said fourth time period. In sub-step 730, the wireless terminal is operated to apply gain to the received signals using the third set of gain values to control the gain applied to individual received signals. Next, in sub-step 732, the wireless terminal is operated to decode said data signals received during the fourth time period without using channel information from a previous time period. Operation proceeds from sub-step 732 to sub-step 734, where the wireless terminal is operated to measure the quality of the signals received during the fourth time period. Sub-step 734 includes lower level sub-step 736 and 738. In sub-step 736, the wireless terminal is operated to measure signal interference on a tone on which no signal is transmitted during said fourth time period. In sub-step 738, the wireless terminal is operated to generate at least one signal to interference value from the ratio of measured signal interference to a signal measured on another tone during said fourth time period. Operation proceeds from step 724 to step 740.

In step 740, prior to the subsequent third time period, the wireless terminal is operated to select a set of gain values to be used during the subsequent third time period as a function of the measured signal quality corresponding to said first and second sets of gain values. In embodiments including step 724, the selecting of step 740 is also a function of the measured signal quality corresponding to said third set of gain values. Operation proceeds from step 740 to step 742.

In step 742, the wireless terminal checks if the selected set of gain values to be used during the subsequent third time period is different from the set of gain values used during the first time period. If the selected set of gain values is different than the set of gain values previously used during the first time period, then operation proceeds to step 744; otherwise operation proceeds to step 746.

In step 744, the wireless terminal is operated to reset channel estimation information maintained by said wireless terminal. Since, the gain values used during the subsequent third time period will be different than those used during the first time period, the channel estimate, e.g., for the coherent modulation from the first time period, is reset. The reset value can be equal to a predetermined value or to the stored channel estimates in sub-step 721.

In step 746, the wireless terminal is operated to maintain channel estimation information generated from the first time period for subsequent use for received signal compensation purposes during the third time period. The channel estimation of the first time period may be allowed to continue and resume during the subsequent third time period, since the set of gain values used is the same.

Operation proceeds from either step 744 or step 746 to step 748, where the wireless terminal associates the next first time period with the current third time period. Operation proceeds from step 748 via connecting node A 750 to step 702, where the wireless terminal is operated to receive data signals during another first time period.

In some embodiments, the second time period is less than one fortieth the first time period and different types of information coding are used in said first and second time periods. In various embodiments, the continuous or coherent modulation scheme is used for information coding during the first time period information coding using continuous modulation scheme by continuously evolving a channel estimate and coherently decoding the information using the channel estimate, and the self supporting modulation scheme is used for information coding during said second time period, information coding using self supporting modulation scheme being capable of decoding without the use of a channel estimate derived from the previous time interval.

In some embodiments, the first time period and the second time period may both use coherent coding techniques; however, during each symbol time interval of the first time period on average a fewer number of tones are dedicated to convey pilot symbols than during each symbol time interval of the second time period, e.g., four vs sixteen pilot symbols per symbol time period. In such an embodiment, this high concentration of pilot tones per symbol time during the second time period allows a channel estimate to be performed using information only within the second time period.

In some embodiments, the second period of time is a single orthogonal frequency division multiplexing (OFDM) symbol transmission time period. In various embodiments, the gain values in said first and second sets of gain values are complex values. In some embodiments, wherein the gain values are complex values at least some of the gain values are real values.

In various embodiments at some times, the step of selecting a set of gain values, step 740, selects only one antenna element at a time from said plurality of antenna elements and said selected set of gain values includes a non-zero value, for the one gain value corresponding to the selected antenna element and a value of zero for all the other antenna gain values in the selected set. In some embodiments, each of the sets of gain values from which a selected set is obtained includes one non-zero value corresponding to one antenna element and zero for the gain values in the set corresponding to each of the other antenna elements, different sets having the non-zero value associated with different antenna elements.

In some embodiments, during said second period of time said wireless terminal, a wireless terminal currently connected to the base station, refrains from transmitting any signal. For example, the system downlink and uplink timing structure of the base station may be coordinated such that an access interval used for registering wireless terminals not currently connected to the base station corresponds to the second time period.

In some embodiments, when the wireless terminal selects and changes the gain values used to control the gain of received signals, the wireless transmitter changes the gain of the transmitted signals using the same set of gain values used to control the gain of received signals. Some such embodiments use antenna elements and controllable antenna gain elements common to both the transmitter and receiver; the transmit and receive signals can be routed through a common duplex module.

In various embodiments, multiple different sets of gain values are tested prior to each selection of a set of gain values providing a ratio of gain value tests to selection which is at least 2 to one. One such embodiment, is the method of flowchart 7 including step 724. In another exemplary embodiment, steps 740 and step 742 are not performed during each iteration of the flow, but rather after a fixed number of iteration or based on some other predetermined criteria. In such an embodiment, during iterations where steps 740 and 742 are omitted, operations proceed from step 724 to step 746 and then to step 748; during iteration where steps 740 and 742 are performed the selection can be a function of the set of values used during the first interval and during any previous second or fourth intervals since the last selection was performed.

Figure 8:
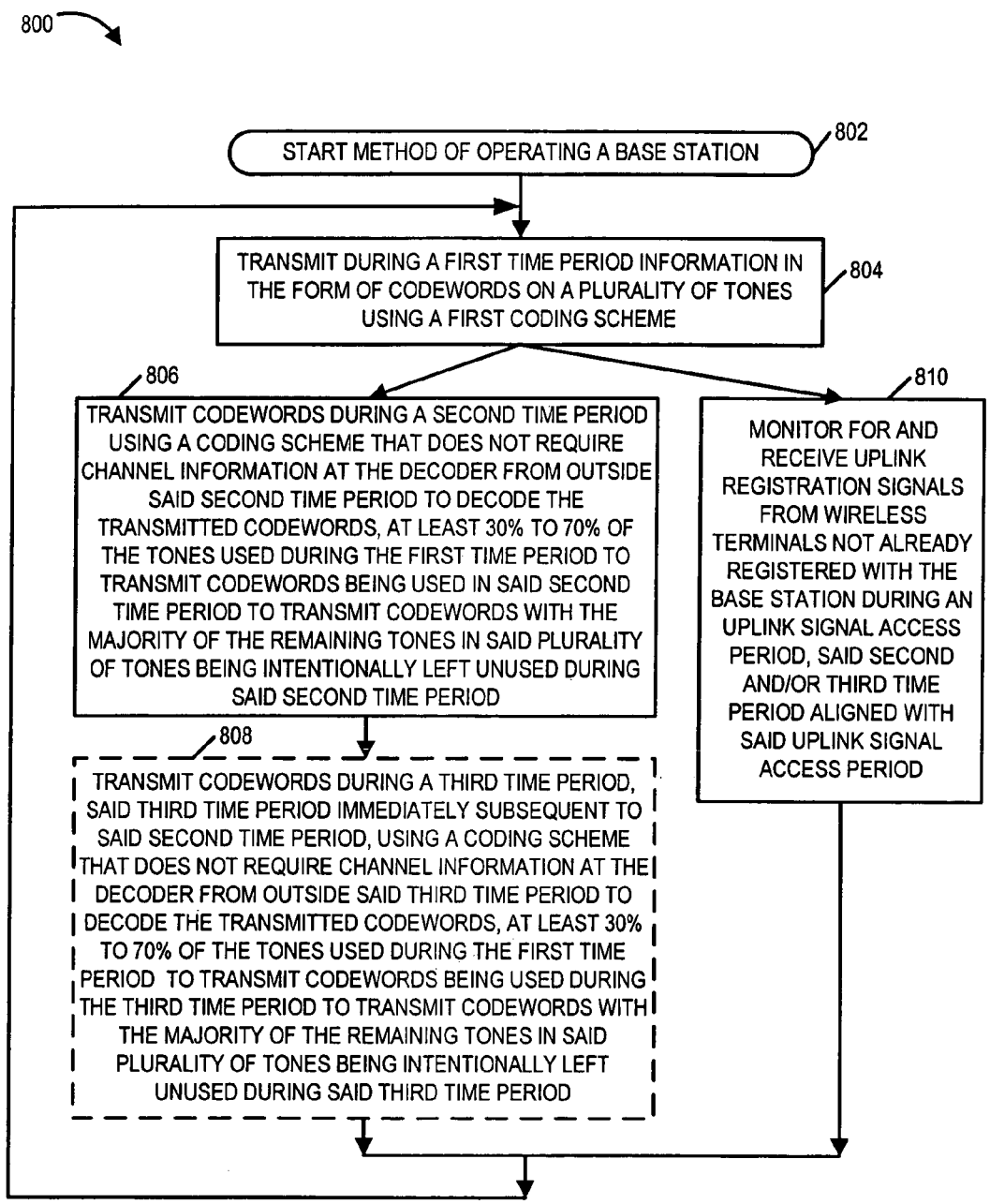
FIG. 8 is a flowchart of an exemplary method of operating a base station to transmit information using a plurality of tones in accordance with the present invention.

FIG. 8 is a flowchart 800 of an exemplary method of operating a base station to transmit information using a plurality of tones in accordance with the present invention. The base station may be, e.g., exemplary BS 200 of FIG. 2, implemented in accordance with the present invention. The base station may be part of a frequency division multiplexing wireless communications system, e.g., an OFDM multiple access spread spectrum system including a plurality of wireless terminals, e.g., mobile nodes. The base station may use a set of downlink tones, e.g., 113 tones.

Operation starts in step 802, where the base station is powered on and initialized. The base station may use stored downlink and uplink timing structure information. Operation proceeds from step 802 to step 804. In step 804, the base station is operated to transmit during a first time period information in the form of codewords on a plurality of tones, e.g., downlink tones being used by the base station point of network attachment, using a first coding scheme. Operation proceeds from step 804 to step 806 and step 810.

In step 806, the base station is operated to transmit codewords during a second time period using a coding scheme that does not require channel information at the decoder from outside said second time period to decode the transmitted codewords, at least 30% to 70% of the tones used during the first time period to transmit codewords being used in said second time period to transmit codewords with the majority of the remaining tones in said plurality of tones being intentionally left unused during said second time period. Operation proceeds from step 806 to step 808.

In some embodiments, e.g., depending upon the downlink timing structure implemented and used by the base station, step 808 is performed. In other embodiments, step 808 is not performed and bypassed. In step 808, the base station is operated to transmit codewords during a third time period, said third time period immediately subsequent to said second time period, using a coding scheme that does not require channel information from outside said third time period to decode the transmitted codewords, at least 30% to 70% of the tones used during the first time period to transmit codewords being used during the third time period to transmit codewords with the majority of the remaining tones in said plurality of tones being intentionally left unused during said third time period.

In step 810, the base station is operated to monitor for and receive uplink registration signals from wireless terminals not already registered with the base station during an uplink signal access period, said second and/or third time periods being aligned with said uplink signal access period. The base station does not receive any information signals from wireless terminals already registered with the base station during said second and/or third time periods.

Operation proceeds from steps (806 or 808) and step 810 to step 804, where the base station is operated to transmit during another first time period.

In some embodiments, the first time period includes at least 50 symbol transmission time periods and the second time period includes less than one $50^{th}$ of the symbol time periods included in the first time period. In various embodiments, the second time period is a single transmission time period and/or the third time period is a single transmission time period.

In some embodiments, the majority of codewords transmitted during the first and second time periods communicate user data, e.g., one or more of voice data and text data. In embodiments, the majority of codewords transmitted during the first, second and third time periods communicate user data, e.g., one or more of voice data and text data.

FIG. 9 is a drawing 900 illustrating exemplary components and signaling in an exemplary wireless terminal in some embodiments of the present invention, said wireless terminal including one receiver RF chain. The wireless terminal includes a plurality of antenna elements (antenna element 1 902, antenna element 2 904, antenna element N 906), a plurality of controllable gain elements (gain element 1 908, gain element 2 910, gain element N 912), and a combining circuit 914. Controls (control 1 916, control 2 918, control N 920) are controlled as a set by the wireless terminal to change the gain values ($G_1$, $G_2$, $G_N$) for gain elements (908, 910, 912), respectively. For example, the wireless terminal switches the set of gain values to correspond to different time periods. Signal $R_1$ 922 is received over antenna element 1 902, processed through gain element 908 with gain $G_1$ resulting in signal $G_1R_1$ 924 which is an input to the combining circuit 914. Signal $R_2$ 922 is received over antenna element 2 904, processed through gain element 910 with gain $G_2$ resulting in signal $G_2R_2$ 928 which is an input to the combining circuit 914. Signal $R_N$ 922 is received over antenna element N 906, processed through gain element 912 with gain $G_N$ resulting in signal $G_NR_N$ 932 which is an input to the combining circuit 914. The output of combining circuit 934 is signal $G_1R_1+G_2R_2+\ldots+G_NR_N$ 934 which is forwarded to the receiver RF chain.

Figure 10:
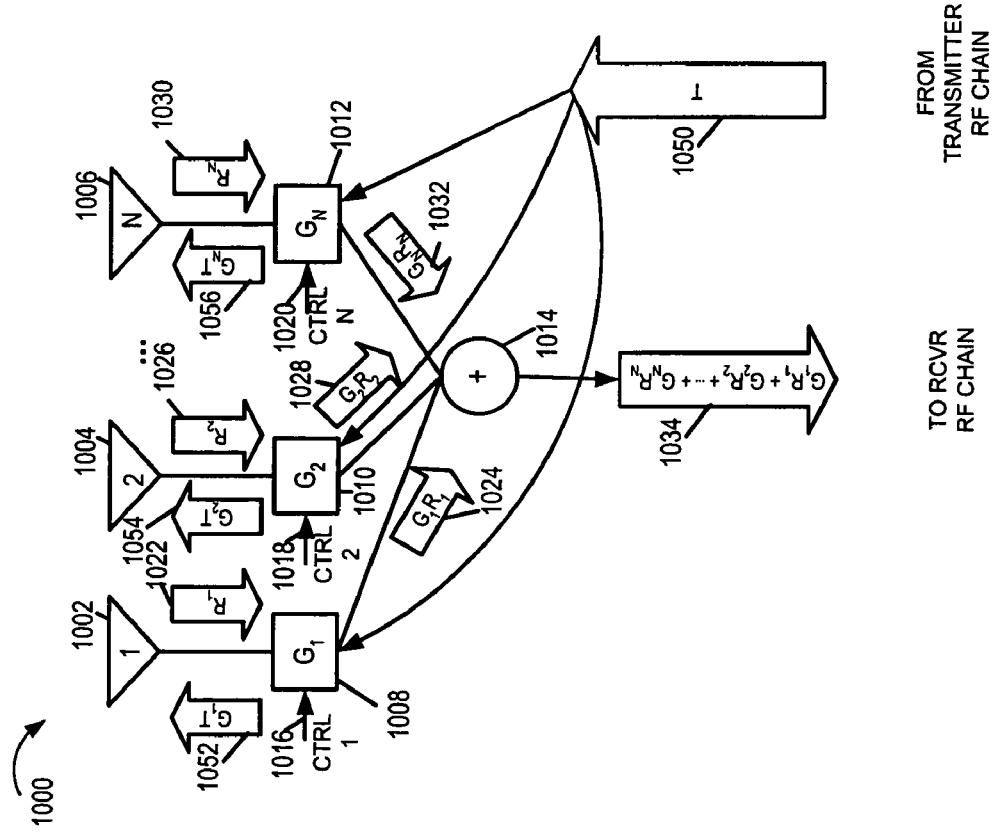
FIG. 10 is a drawing illustrating exemplary components and signaling in an exemplary wireless terminal in some embodiments of the present invention, said wireless terminal including one receiver RF chain and one transmitter RF chain.

FIG. 10 is a drawing 1000 illustrating exemplary components and signaling in an exemplary wireless terminal in some embodiments of the present invention, said wireless terminal including one receiver RF chain and one transmitter RF chain. The wireless terminal includes a plurality of antenna elements (antenna element 1 1002, antenna element 2 1004, antenna element N 1006), a plurality of controllable gain elements (gain element 1 1008, gain element 2 1010, gain element N 1012), and a combining circuit 1014. Controls (control 1 1016, control 2 1018, control N 1020) are controlled as a set by the wireless terminal to change the gain values ($G_1$, $G_2$, $G_N$) for gain elements (1008, 1010, 1012), respectively. For example, the wireless terminal switches the set of gain values to correspond to different time periods. The set of gain values ($G_1$, $G_2$, $G_3$) are used for signals in both directions through the gain element. Signal R1 1022 is received over antenna element 1 1002, processed through gain element 1008 with gain $G_1$ resulting in signal $G_1R_1$ 1024 which is an input to the combining circuit 1014. Signal $R_2$ 1022 is received over antenna element 2 1004, processed through gain element 1010 with gain $G_2$ resulting in signal $G_2R_2$ 1028 which is an input to the combining circuit 1014. Signal $R_N$ 1022 is received over antenna element N 1006, processed through gain element 1012 with gain $G_N$ resulting in signal $G_NR_N$ 1032 which is an input to the combining circuit 1014. The output of combining circuit 1014 is signal $G_1R_1+G_2R_2+\ldots+G_NR_N$ 1034 which is forwarded to the receiver RF chain. Transmit signal T 1050 is received from the RF transmitter chain and coupled to each of the antenna gain elements (1008, 1010, 1012). The output of antenna gain elements (1008, 1010, 1012) are signals ($G_1T_1$ 1052, $G_2T_2$ 1054, $G_3T_3$ 1056) which are transmitted over antenna elements (1 1002, 2 1004, N 1006), respectively.

Figure 11:
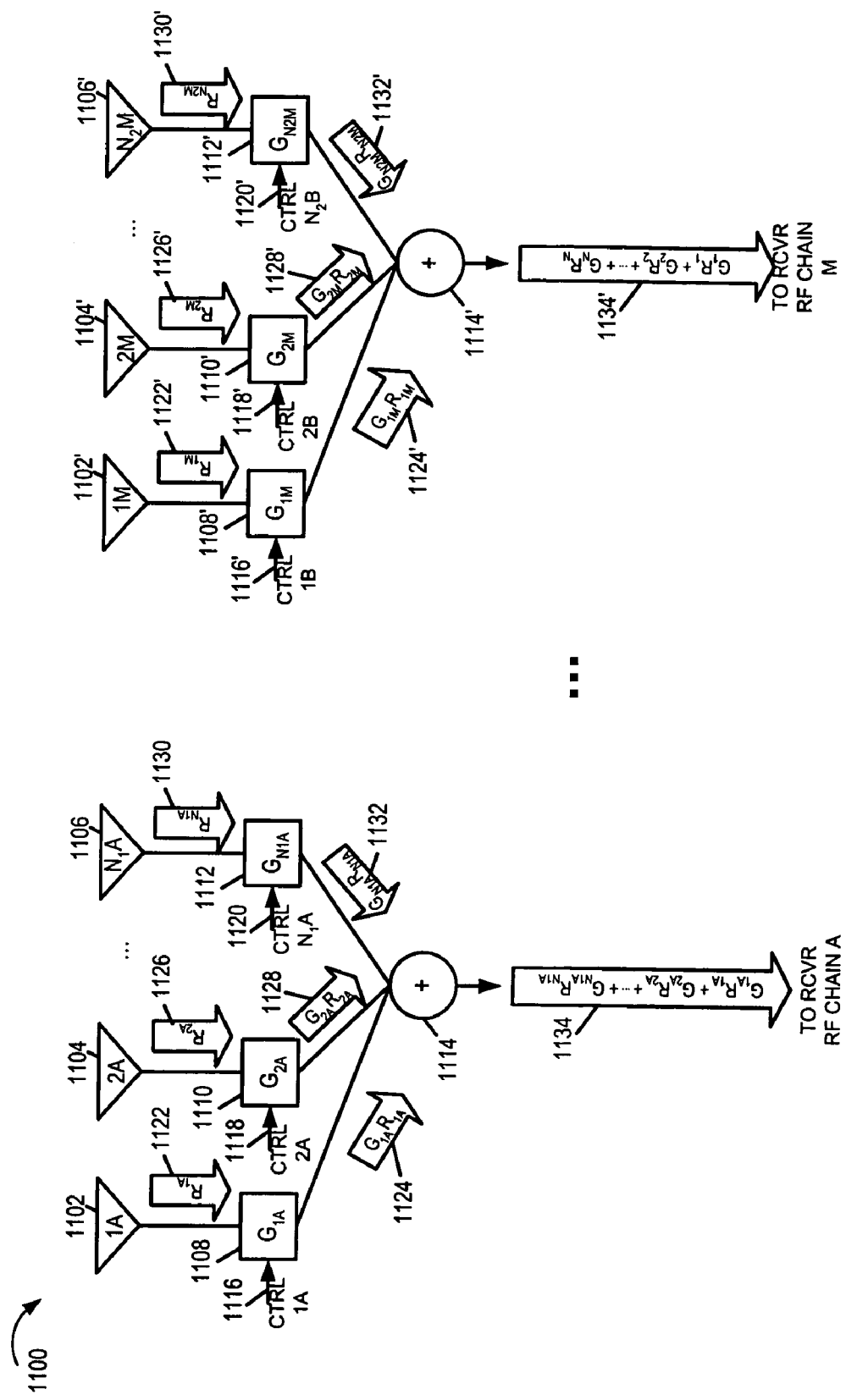
FIG. 11 is a drawing illustrating exemplary components and signaling in an exemplary wireless terminal in some embodiments of the present invention, said wireless terminal including multiple receiver RF chains.

FIG. 11 is a drawing 1100 illustrating exemplary components and signaling in an exemplary wireless terminal in some embodiments of the present invention, said wireless terminal including multiple receiver RF chains, e.g., M receiver RF chains. The wireless terminal includes, for the first RF chain, a plurality of antenna elements (antenna element 1A 1102, antenna element 2A 1104, antenna element $N_1A$ 1106), a plurality of controllable gain elements (gain element 1A 1108, gain element 2A 1110, gain element $N_1A$ 1112), and a first combining circuit 1114. Controls (control 1A 1116, control 2A 1118, control $N_1A$ 1120) are controlled as a set by the wireless terminal to change the gain values ($G_{1A}$, $G_{2A}$, $G_{N1A}$) for gain elements (1108, 1110, 1112), respectively. For example, the wireless terminal switches the set of gain values to correspond to different time periods. Signal $R_{1A}$ 1122 is received over antenna element 1A 1102, processed through gain element 1108 with gain $G_{1A}$ resulting in signal $G_{1A}R_{1A}$ 1124 which is an input to the first combining circuit 1114. Signal $R_{2A}$ 1122 is received over antenna element 2A 1104, processed through gain element 1110 with gain $G_{2A}$ resulting in signal $G_{2A}R_{2A}$ 1128 which is an input to the first combining circuit 1114. Signal $R_{N1A}$ 1122 is received over antenna element $N_1A$ 1106, processed through gain element 1112 with gain $G_{N1A}$ resulting in signal $G_{N1A}R_{N1A}$ 1132 which is an input to the first combining circuit 1114. The output of combining circuit 1134 is signal $G_{1A}R_{1A}+G_{2A}R_{2A}+\ldots+G_{N1A}R_{N1A}$ 1134 which is forwarded to the first receiver RF chain, chain A.

The wireless terminal includes, for the Mth RF chain, a plurality of antenna elements (antenna element 1M 1102', antenna element 2M 1104', antenna element $N_2M$ 1106'), a plurality of controllable gain elements (gain element 1M 1108', gain element 2M 1110', gain element $N_2M$ 1112'), and an Mth combining circuit 1114. Note that $N_1$ can be the same or different the $N_2$. Controls (control 1M 1116', control 2M 1118', control $N_2M$ 1120') are controlled as a set by the wireless terminal to change the gain values ($G_{1M}$, $G_{2M}$, $G_{N2M}$) for gain elements (1108', 1110', 1112'), respectively. For example, the wireless terminal switches the set of gain values to correspond to different time periods. Note that in general the controlling switching of gain set values corresponding to RF chain A is not synchronized with the controlled switching of gain set values corresponding to receiver chain M, as receiver chain A may be tuned to receive signals from a first base station, while receiver chain M may be tuned to receive signals from a different base station. Signal $R_{1M}$ 1122' is received over antenna element 1M 1102', processed through gain element 1108' with gain $G_{1M}$ resulting in signal $G_{1M}R_{1M}$ 1124' which is an input to the Mth combining circuit 1114'. Signal $R_{2M}$ 1122' is received over antenna element 2M 1104', processed through gain element 1110' with gain $G_{2M}$ resulting in signal $G_{2M}R_{2M}$ 1128' which is an input to the Mth combining circuit 1114'. Signal $R_{N2M}$ 1122' is received over antenna element $N_2M$ 1106', processed through gain element 1112' with gain $G_{N2M}$ resulting in signal $G_{N2M}R_{N2M}$ 1132' which is an input to the Mth combining circuit 1114'. The output of combining circuit 1114' is signal $G_{1M}R_{1M}+G_{2M}R_{2M}+\ldots+G_{N2M}R_{N2M}$ 1134' which is forwarded to the Mth receiver RF chain, chain M.

FIG. 12 is a drawing 1200 illustrating exemplary components in an exemplary wireless terminal in some embodiments of the present invention, said wireless terminal including one receiver RF chain. The embodiment of FIG. 12 uses a switcher 1200 to select one out of the plurality on N antenna elements (1 1202, 2 1204, N 1206). Received signals are routed through the selected antenna element to the RF receiver chain, while received signals on the other, non-selected, antenna elements are not forwarded. In FIG. 12, the switcher 1200 is shown coupled to antenna element 1 1202. The switcher can be controlled to switch between antenna elements based on information including time period boundaries. This embodiment can be viewed from a functional equivalency standpoint as the switcher 1200 including a set of controllable gain elements in which one value is set equal to one, corresponding to the selected antenna element, and the other values are equal to zero, corresponding to the other antenna elements.

Figure 13:
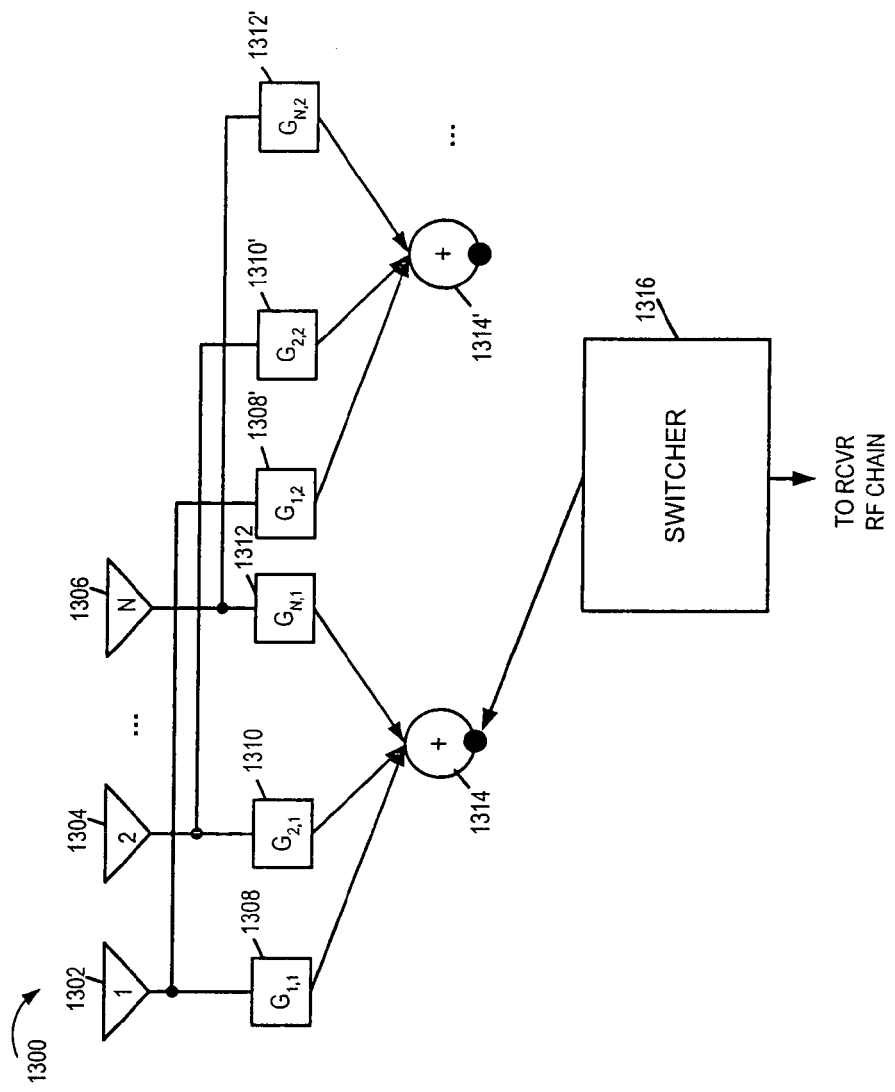
FIG. 13 is a drawing illustrating exemplary components in an exemplary wireless terminal in some embodiments of the present invention, said wireless terminal including a switcher for switching between multiple sets of gain elements to select one of multiple "compound" antenna patterns.

FIG. 13 is a drawing 1300 illustrating exemplary components in an exemplary wireless terminal in some embodiments of the present invention, said wireless terminal including one receiver RF chain. In the embodiment of FIG. 13, multiple "compound" antenna patterns are possible. The embodiment of FIG. 13 includes a plurality of antenna elements (1302, 1304, 1306) coupled to a first set of gain elements (1308, 1310, 1312), with gain values (G1,1, G2,1, GN,1), respectively. The output of the first set of gain elements (1308, 1310, 1312) is input to a first combining circuit 1314. Antenna elements (1302, 1304, 1306) are also coupled to a second set of gain elements (1308', 1310', 1312'), with gain values (G1,2, G2,2, GN,2), respectively. The output of the second set of gain elements (1308', 1310', 1312') is input to a second combining circuit 1314'. Additional sets of gain elements each with a corresponding combining circuit can be implemented. The FIG. 13 embodiment also includes a switcher 1316 which couples one of the output of one of the combining circuits (1314, 1314') to switcher 1316 which is coupled to the receiver's RF chain input.

Each antenna pattern is in effect created by the weighted sum of the N antenna elements. Different antenna patterns differ in its weighing coefficients, gain values of the a set of gain elements, e.g., (G1,1, G2,1, ..., GN,1), (GN,1, G1,2,..., GN,2). The weighting coefficients, sometimes referred to a gain values, can be complex or real. The gain values can be fixed, i.e., predetermined or programmable, i.e., adjustable.

Figure 14:
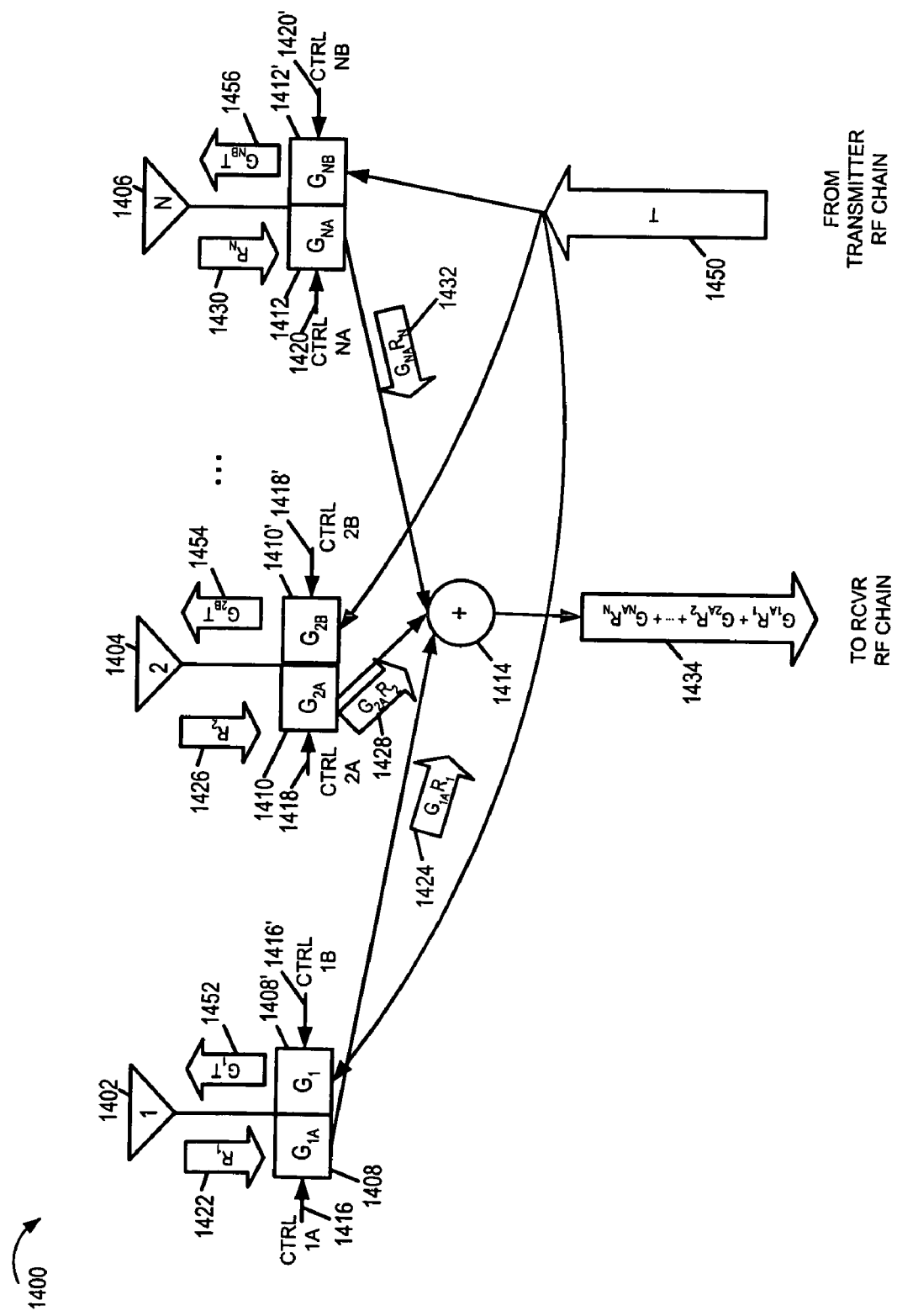
FIG. 14 is a drawing illustrating exemplary components and signaling in an exemplary wireless terminal in some embodiments of the present invention, said wireless terminal using a common set of antenna elements for receive and transmit, but being capable of having different antenna patterns for receive and transmit simultaneously and operating the switching controlling receive patterns independently of the switching controlling transmit patterns.

FIG. 14 is a drawing 1400 illustrating exemplary components and signaling in an exemplary wireless terminal in some embodiments of the present invention, said wireless terminal using a common set of antenna elements for receive and transmit, but being capable of having different antenna patterns for receive and transmit simultaneously and operating the switching controlling receive patterns independently of the switching controlling transmit patterns. In such an embodiment, switching antenna patterns for downlink signal testing can be operated independently of switching antenna patterns for uplink signaling from the wireless terminal. The switching of the receive antenna pattern need not impact wireless terminal uplink signaling as the transmit antenna pattern can remain unchanged during such downlink signal testing periods. The wireless terminal includes a plurality of antenna elements (antenna element 1 1402, antenna element 2 1404, antenna element N 1406), a plurality of controllable gain elements (receive gain element 1 1408, receive gain element 2 1410, receive gain element N 1412), and a combining circuit 1414. Controls (control 1A 1416, control 2 1418, control N 1420) are controlled as a set by the wireless terminal to change the receive gain values ($G_{1A}$, $G_{2A}$, $G_{NA}$) for receive gain elements (1408, 1410, 1412), respectively. For example, the wireless terminal switches the set of gain values to correspond to different time periods. Signal $R_1$ 1422 is received over antenna element 1 1402, processed through gain element 1408 with gain $G_{1A}$ resulting in signal $G_{1A}R_1$ 1424 which is an input to the combining circuit 1414. Signal $R_2$ 1422 is received over antenna element 2 1404, processed through gain element 1410 with gain $G_{2A}$ resulting in signal $G_{2A}R_2$ 1428 which is an input to the combining circuit 1414. Signal $R_N$ 1422 is received over antenna element N 1406, processed through gain element 1412 with gain $G_{NA}$ resulting in signal $G_{NA}R_N$ 1432 which is an input to the combining circuit 1414. The output of combining circuit 1414 is signal $G_{1A}R_1+G_{2A}R_2+\ldots+G_{NA}R_N$ 1434 which is forwarded to the receiver RF chain.

Transmit signal T 1450 is received from the RF transmitter chain and coupled to each of the transmit antenna gain elements (1408', 1410', 1412') with gains ($G_{1B}$, $G_{2B}$, $G_{NB}$), respectively. The output of antenna gain elements (1408', 1410', 1412') are signals ($G_{1B}T$ 1452, $G_{2B}T$ 1454, $G_{NB}T$ 1456) which are transmitted over antenna elements (1 1402, 2 1404, N 1406), respectively.

Figure 16:
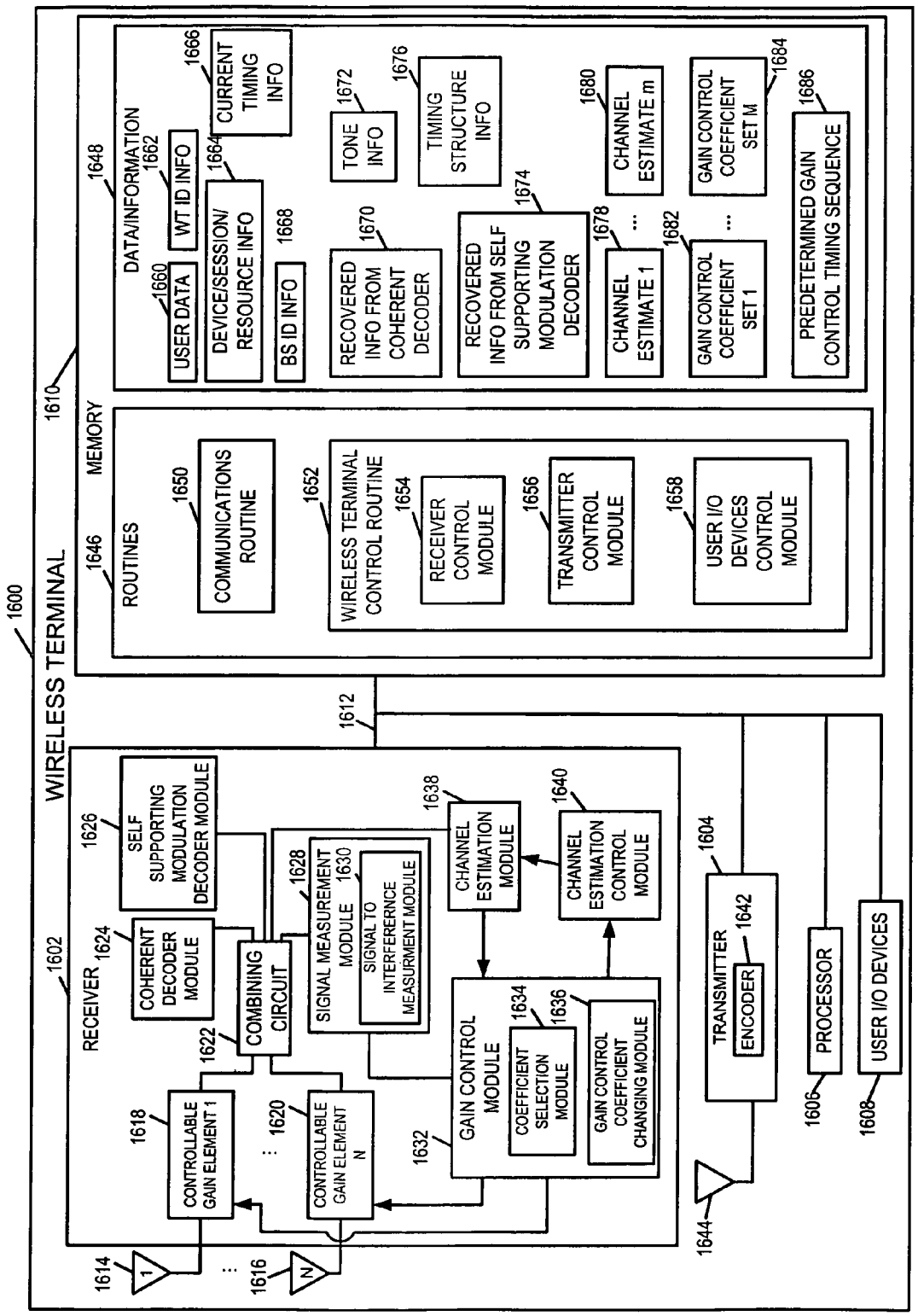
FIG. 16 is a drawing of an exemplary wireless terminal, e.g., a mobile node, implemented in accordance with the present invention and using methods of the present invention.

FIG. 16 is a drawing of an exemplary wireless terminal 1600, e.g., a mobile node, implemented in accordance with the present invention and using methods of the present invention. For example, exemplary wireless terminal 1600 may be a wireless terminal in an exemplary orthogonal frequency division multiplexing (OFDM) spread spectrum multiple access wireless communication system, implemented in accordance with the present invention.

Exemplary wireless terminal 1600 includes a receiver 1602, a transmitter 1604, a processor 1606, user I/O devices 1608, and a memory 1610 coupled together via a bus 1612 over which the various elements can interchange data and information. Receiver 1602 receives and processes downlink signals, e.g., downlink OFDM signals, from a base station. Receiver 1602 includes a plurality of controllable gain elements (controllable gain element 1 1618, . . . , controllable gain element N 1620) coupled to a plurality of antenna elements (antenna element 1 1614, . . . , antenna element N 1616), respectively. Downlink signals are received by the plurality of antenna elements (1614, . . . , 1616). In some embodiments a plurality of separate antennas are used in place of the plurality of separate antenna elements. Each controllable gain element (1618, . . . , 1620) is coupled to a different one of the plurality of antenna elements (1614, . . . , 1616). Receiver 1602 also includes a combining circuit 1622, a coherent decoder module 1624, a self supporting modulation decoder module 1626, a signal measurement module 1628, a channel estimation module 1638, a gain control module 1632, and a channel estimation control module 1640. The signal measurement module 1628 includes a signal to interference measurement module 1630. The gain control module 1632 includes a coefficient selection module 1634 and a gain control coefficient changing module 1636.

The combining circuit 1622 is coupled to each of the gain elements (1618, . . . , 1620) and combines the output of each gain element into a combined signal, the gain of each gain control element being controlled by a gain control coefficient. Signal measurement module 1628 is coupled to the combining circuit 1622. Signal measurement module 1628 performs signal measurements on the combined signal output from the combining circuit 1622 during different periods of time. In some embodiments, during time periods of a second type, an OFDM symbol is received which includes at least one null tone and a plurality of additional tones on which information is communicated using self supporting modulation scheme. Signal measurement module 1628 includes a signal to interference measurement module 1630. Signal to interference measurement module 1630 computes a signal to interference measurement as a function of a measurement of at least one null tone and at least one of the additional tones used to communicate information in the OFDM symbol.

The gain control module 1632 is coupled to the signal measurement module 1628. The gain control module 1632 controls the wireless terminal to use different sets of gain control coefficients during different periods of time. The gain control module 1632 includes a coefficient selection module 1634 and a gain control coefficient changing module 1636. The coefficient selection module 1634 selects a set of gain coefficients to be used during a subsequent period of time based on signal measurements made during at least two periods of time during which different sets of gain control coefficients were used. In some embodiments, the coefficient selection module selects the set of gain coefficients which resulted in the higher received signal quality. The gain control coefficient changing module 1636 changes the set of gain control coefficients from one time period of the second type to the next time period of the second type according to a predetermined sequence. The predetermined sequence is a sequence used to test different gain coefficient sets to determine their effect on signal quality.

Coherent decoder module 1624 is coupled to the combining circuit 1622. The coherent decoding module 1624 performs coherent decoding to recover information communicated using coherent modulation during a period of time of a first type during which information is communicated using coherent modulation. Self supporting modulation decoder module 1626 is also coupled to the combining circuit 1622. Self supporting modulation decoding module performs decoding to recover information communicated during a period of time of a second type during which information is communicated to the wireless terminal using a self supporting modulation scheme, which is only based on the signal received in the period of time of the second type and does not rely on the channel estimation derived from the signal in any previous time.

Channel estimation module 1638 generates a channel estimate during periods of time in which coherent modulation is used. The channel estimation control module 1640 is coupled to the channel estimation module 1638. The channel estimation control module 1640 controls the use of channel estimates. The channel estimation control module 1638 changes the channel estimate from a first time period in which coherent modulation is used to the next time period in which coherent channel estimation is used, when the next time period uses a different set of gain control coefficients than the first time period. The channel estimate control module 1640 resets to a re-initialization value a channel estimate being used for coherent modulation, when the set of gain control coefficients changes from one period in which coherent modulation is used to the next period in which coherent modulation is used.

Transmitter 1604 is coupled to transmit antenna 1644 via which the wireless terminal 1600 and can transmit uplink signals, e.g., OFDM uplink signals, to a base station. In some embodiments, the same antenna, antennas, or antenna elements are used for transmitter 1604 and receiver 1602. Transmitter 1604 includes an encoder 1642 which can be used to encode information which is to be communicated in the uplink signals. User I/O devices 1608, e.g., microphone, speaker, display, keyboard, keypad, switches, camera, etc., are used to input user data/information, output user data/information, and to allow an operation to control at least some of the functions of the wireless terminal, e.g., initiate a user session, terminate a call, etc.

Memory 1610 includes routines 1646 and data/information 1648. The processor 1606, e.g., a CPU executes the routines 1646 and uses the data/information 1648 in memory 1610 to control the operation of the wireless terminal 1600 and implement methods of the present invention.

Routines 1646 includes a communications routine 1650 and wireless terminal control routine 1652. The communications routine 1650 handles various communications operations and performs various communications protocols used by the wireless terminal. Wireless terminal control routine 1652 includes a receiver control module 1654, a transmitter control module 1656, and a user I/O devices control module 1658. The receiver control module 1654 controls the operation of receiver 1602; transmitter control module 1656 controls operations of the transmitter 1656. User I/O devices control module 1658 control user I/O devices 1608.

Data/information 1648 includes user data 1660, e.g., voice data, audio data, image data, text data, etc., wireless terminal identification information 1662, e.g., a base station assigned wireless terminal active user identifier, device/session/resource information 1664, e.g., WT 1600 device information, peer node information, communication session information, routing information, and/or air link resource information such as assigned uplink and downlink channel segments, and downlink broadcast segment information. Data information 1648 also includes current timing information 1666, e.g., a current OFDM symbol time period index in a repetitive timing structure being used by the base station, base station identifier information 1668, e.g., a base station identifier, base station type identifier, sector and/or carrier identifier information.

Data/information 1648 also includes recovered information from coherent decoder 1670, recovered information from self supporting modulation decoder 1674, tone information 1672, timing structure information 1676, a plurality of sets of channel estimation information (channel estimate 1 1678, . . . , channel estimate m 1680), a plurality of sets of gain control coefficient sets (gain coefficient set 1 1682, . . . , gain control coefficient set M 1684), and predetermined gain control timing sequence information 1686. Each of the plurality of stored channel estimates corresponds to a different set of gain coefficients, the channel estimation module 1638 maintaining different channel estimates in memory which are generated while decoding received signals using different gain control coefficients.

Figure 17:
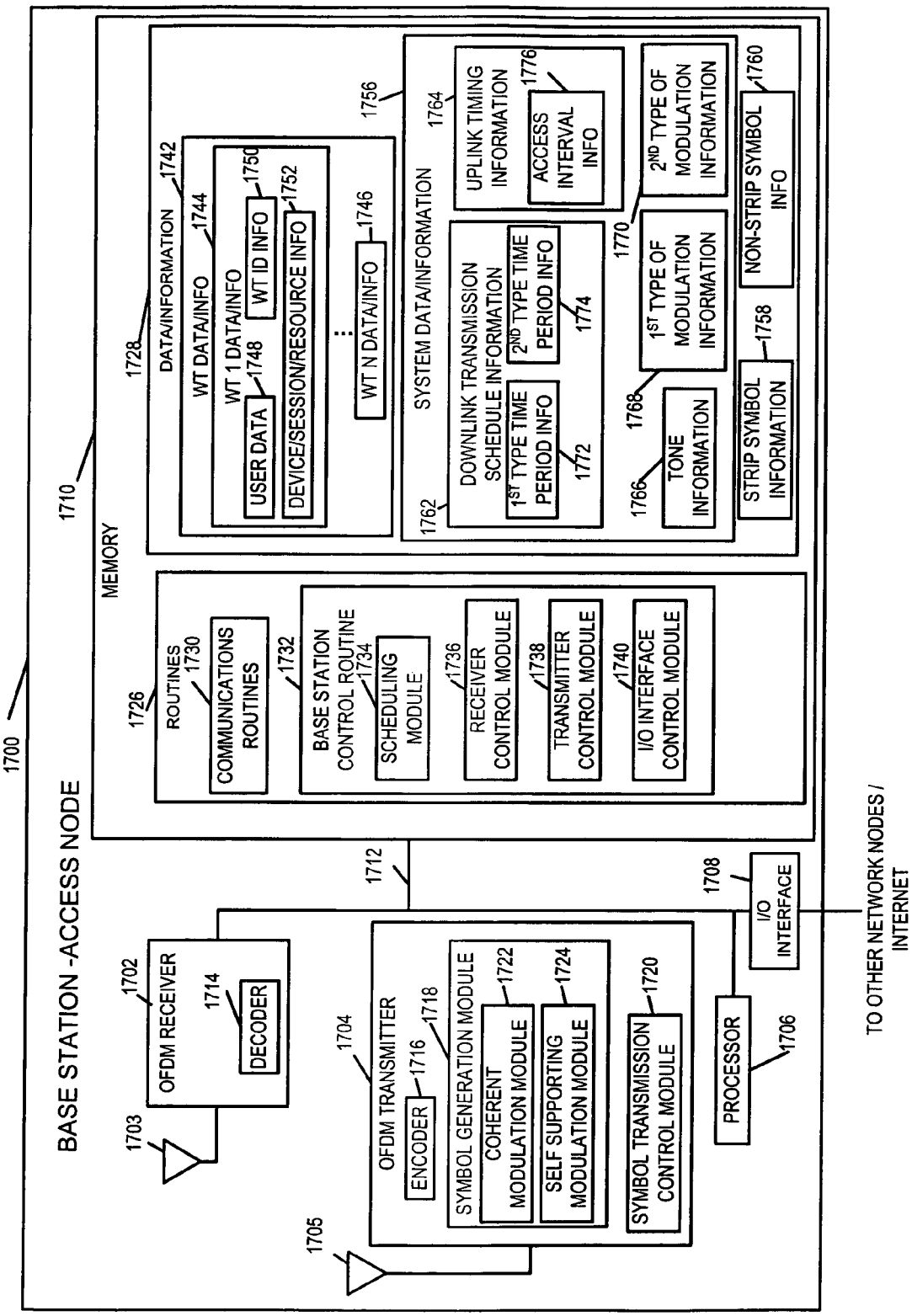
FIG. 17 is a drawing of an exemplary base station implemented in accordance with the present invention and using methods of the present invention.

FIG. 17 is a drawing of an exemplary base station 1700 implemented in accordance with the present invention and using methods of the present invention. Exemplary base station 1700 is, e.g., one of a plurality such base stations in an exemplary OFDM wireless communications system, e.g., a spread spectrum multiple access wireless communications system including a plurality of wireless terminals, e.g., wireless terminals 1600. Exemplary base station 1700 includes an OFDM receiver 1702, an OFDM transmitter 1704, a processor 1706, an I/O interface 1708, and memory 1710 coupled together via a bus 1712 over which the various elements can interchange data and information.

Receiver 1702 is coupled to a receive antenna 1703 over which uplink OFDM signals are received, e.g., from a plurality of wireless terminals 1600. Received uplink signals can include uplink traffic channel signals and/or uplink control signals. Received uplink signals can also include registration process signals received during time periods corresponding to second type time periods. Receiver 1702 includes decoder 1714 for decoding received uplink signals.

Transmitter 1704 is coupled to a transmit antenna 1705 via which the base station 1700 transmits downlink OFDM symbol signals, e.g., to a plurality of wireless terminals. In some embodiments, symbols transmitted during a second type time period are strip symbols which include between 30% to 70% null tones, while symbols transmitted during a first type time period include tones a majority of which are dedicated to the transmission of user data.

Transmitter 1704 includes an encoder 1716, a symbol generation module 1718, and symbol transmission control module 1720. Encoder 1716 encodes bits of data/information into coded bits, e.g., block encoding user data. Symbol generation module 1718 generates OFDM symbols including a plurality of tones. In some embodiments an OFDM symbol includes 113 tones. The symbol generation module 1718 includes a coherent modulation module 1722 and a self supporting modulation scheme module 1724. The coherent modulation module 1722 performs coherent modulation when generating symbols during a first period of time, e.g., using a $1^{st}$ type of modulation corresponding to $1^{st}$ type modulation information which is a coherent type of modulation. The self supporting modulation scheme module 1724 performs self supporting modulation scheme when generating symbols during a second period of time, the second type of modulation being a self supporting modulation type of modulation corresponding to $2^{nd}$ type of modulation information 1770.

The symbol transmission control module 1720 controls the generation of OFDM symbols in accordance with a downlink transmission schedule included in downlink transmission schedule information 1762. The symbol transmission control module 1720 causes the symbol generation module 1718 to switch between a first type of modulation when generating symbols during a first type of time period and using a second type of modulation when generating symbols to be transmitted during a second type of time period, the control module 1720 controlling operation to intentionally include null tones in symbols generated to be transmitted during the second type of time period. The first and second types of time periods repeat in accordance with the downlink transmission schedule.

I/O interface 1708 couples the base station 1700 to other network nodes, e.g., other base stations, routers, AAA nodes, home agent nodes, etc and/or the Internet. Memory 1710 includes routines 1726 and data/information 1728. The processor 1706, e.g., a CPU, executes the routines 1726 and uses the data/information 1728 in memory 1710 to control the operation of the base station 1700 and implement the methods of the present invention.

Routines 1726 include communications routines 1730 and a base station control routine 1732. The communications routines 1730 perform various communications operations and implement the various communications protocols used by the base station 1700. Base station control routine 1732 includes a scheduling module 1734, a receiver control module 1736, a transmitter control module 1738, and an I/O interface control module 1740. Scheduling module 1734, e.g., a scheduler, schedules uplink and downlink segments, e.g., uplink and downlink traffic channel segments, to wireless terminals. Receiver control module 1736 controls the operation of OFDM receiver 1702; transmitter control module 1738 controls the operation of OFDM transmitter 1704. The I/O interface control module 1740 controls the operation of I/O interface 1708.

Data/information 1728 includes wireless terminal data/information 1742, system data/information 1756, strip symbol information 1758, and non-strip symbol information 1760. WT data/information 1742 includes a plurality of sets of data/information (WT 1 data/information 1744, . . . , WTN data/information 1746), each set corresponding to a different wireless terminal being serviced by BS 1700. WT 1 data/information 1744 includes user data 1748, e.g., stored user data to be transmitted including at least one of text, image data, audio data and user application data intended for a user application executed on the wireless terminal, wireless terminal identification information 1750, e.g., a base station assigned wireless terminal active user identifier, and device/session/resource information 1752, e.g., device information pertaining to WT 1, information pertaining to a peer node in a communications session with WT 1, address information, routing information, communications session information and/or air link resource information, e.g., uplink and downlink segments assigned to WT 1.

System data/information 1756 includes downlink transmission schedule information 1762, uplink timing information 1764, tone information 1766, $1^{st}$ type of modulation information 1768, and $2^{nd}$ type of modulation information 1770.

Downlink transmission schedule information 1762 includes $1^{st}$ type time period information 1772 and $2^{nd}$ type time period information 1774. Downlink transmission schedule information 1762, which includes information indicating a timing relationship between first and second time periods, is used by the symbol transmission control module 1720. In some embodiments, the downlink transmission schedule information 1762 indicates that a first type of time period has a duration which is at least 50 times the duration of a second type of time period. $2^{nd}$ type time period information includes information indicating which tones should be used as null tones during the second type of time period. In some embodiments, the downlink transmission schedule information 1762 indicates that at least 30% of tones used during the first type time period should be used to communicate information during the second time period using codewords modulated on said at least 30% of the tones using self supporting modulation channel modulation.

In various embodiments, the downlink transmission schedule information 1762 schedules second type time periods to occur during periods of time in which wireless terminals, which are not registered and do not have uplink timing synchronization with the base station, are permitted to transmit uplink signals as part of a registration process.

Tone information 1766 includes uplink and downlink tone block information. 1st type modulation information 1768, coherent modulation information including, e.g., modulation constellation information for QPSK, QAM16, QAM64, QAM256, etc, coded bit to modulation symbol mapping information, power level information, etc., is used by coherent modulation module 1722. $2^{nd}$ type modulation information 1770, self supporting modulation scheme information, e.g., information identifying a modulation technique using a combination of zero and non-zero modulation symbols among the tones of the strip symbol, is used by self supporting modulation scheme module 1724.

Uplink timing information 1764 includes information identifying the uplink timing structure being used by base station 1700, e.g., indexed OFDM symbol transmission time periods within a repetitive uplink timing structure which is synchronized with respect to the downlink timing structure. Uplink timing information 1764 includes access interval information 1776. Access interval information 1776 identifies OFDM symbol transmission time periods within the uplink timing structure used for wireless terminals which are not registered with base station 1700 and do not have uplink timing synchronization with base station 1700 to attempt to register with base station 1700, e.g., by signaling using contention based segments. In some embodiments, the uplink and downlink timing structure is intentionally synchronized such that the second time intervals used for strip downlink signaling occur during access interval periods of time.

Strip symbol information 1758 includes information pertaining to OFDM symbols generated to be transmitted during second type time periods, e.g., information defining the OFDM symbol in terms of messages and/or information communicated, identified null tones, identified non-null tones, signal composition for each tone of the strip symbol and associated power levels. Non-strip symbol information 1760 includes information pertaining to OFDM symbols generated to be transmitted during first type time periods, e.g., information defining the non-strip OFDM symbol in terms of user data communicated, coded bits, modulation symbol values, signal composition for each tone of the non-strip symbol and associated power levels.

Figure 15:
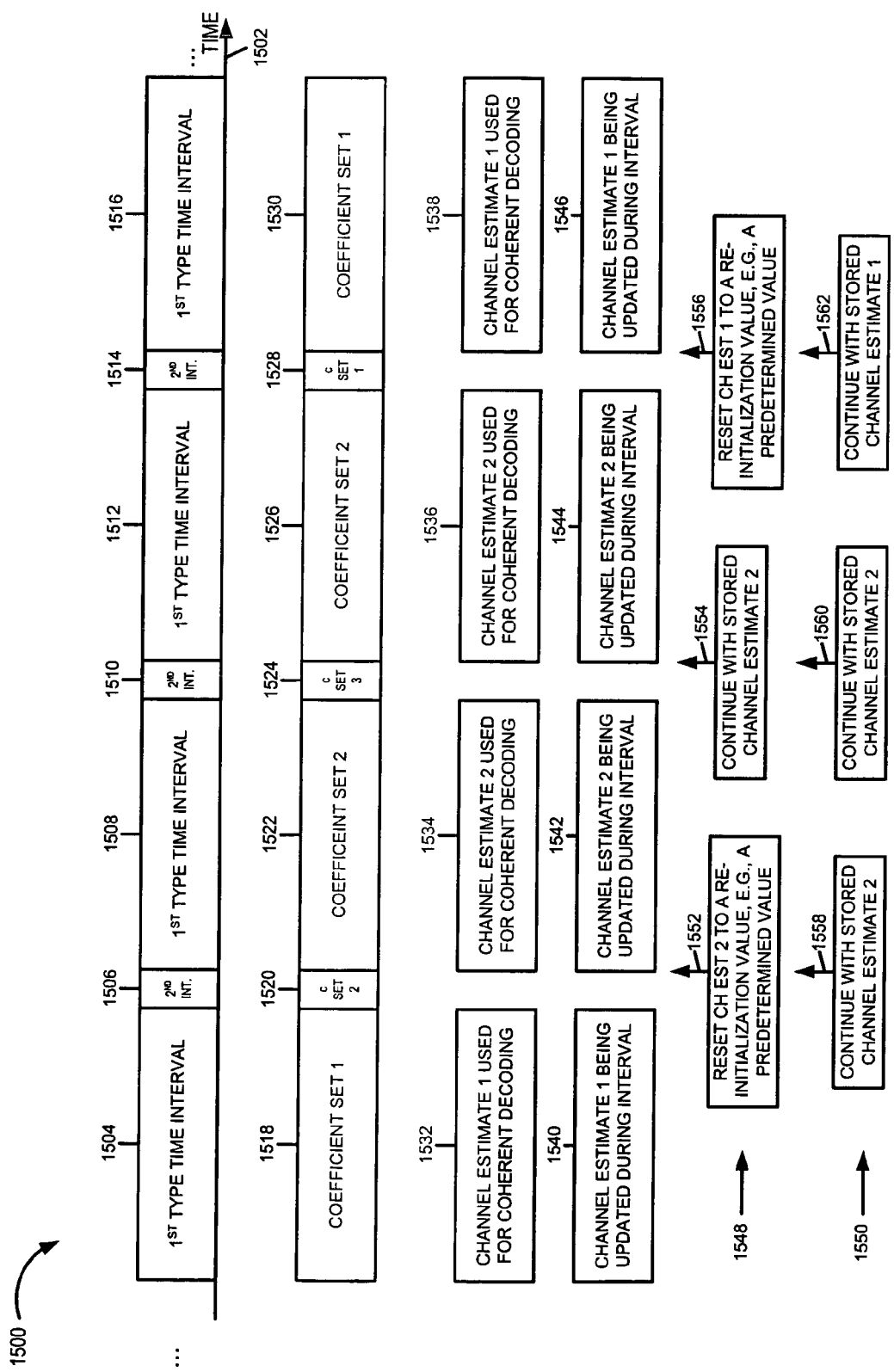
FIG. 15 is a drawing illustrating exemplary $1^{st}$ and $2^{nd}$ types of time intervals, exemplary antenna coefficient set usage, exemplary channel estimation usage intervals for decoding, exemplary channel estimation updating, exemplary opportunities for changing channel coefficient sets, and exemplary methods including reset of a channel estimate and/or continuation of a channel estimate.

FIG. 15 is a drawing 1500 illustrating exemplary $1^{st}$ and $2^{nd}$ types of time intervals, exemplary antenna coefficient set usage, exemplary channel estimation usage intervals for decoding, exemplary channel estimation updating, exemplary opportunities for changing channel coefficient sets, and exemplary methods including reset of a channel estimate and/or continuation of a channel estimate. Drawing 1500 describes operations performed by some wireless terminals in accordance with the present invention, e.g., wireless terminal 1600 of FIG. 16.

Horizontal line 1502 indicates time. The following successive time intervals are shown in FIG. 15: ($1^{st}$ type time interval 1504, $2^{nd}$ type time interval 1506, $1^{st}$ type time interval 1508, $2^{nd}$ type time interval 1510, $1^{st}$ type time interval 1512, $2^{nd}$ type time interval 1514, $1^{st}$ type time interval 1516). For the purposes of this example, assume that the wireless terminal supports three different antenna gain coefficient sets, stores in memory channel estimates corresponding each of those channel estimates. In other embodiments, a wireless terminal may support a different number of sets of antenna gain coefficients and store a different number of corresponding channel estimates.

During exemplary second time intervals (1506, 1510, 1514) the wireless terminal is controlled to use (coefficient set 2, coefficient set 3, coefficient set 1), respectively, as indicated by blocks (1520, 1524, 1528), respectively. In this example, the coefficient set for $2^{nd}$ intervals alternates in a predetermined sequence between the three alternative possibilities, thus providing testing of each antenna set combination. In some other embodiments, the antenna set chosen for the $2^{nd}$ type interval is a function of the antenna set used for a previous first type time interval. For example, the antenna set for an exemplary $2^{nd}$ type time interval, in some embodiments, is different from the antenna coefficient set used for the preceding $1^{st}$ type time interval.

In this exemplary embodiment, the wireless terminal has an opportunity to select an antenna coefficient set for each first type time interval, and the wireless terminal uses that selected antenna coefficient set for the first type time interval. In this example, the wireless terminal has selected to use (antenna coefficient set 1, antenna coefficient set 2, antenna coefficient set 2, antenna coefficient set 1) corresponding to first time intervals (1504, 1508, 1512, 1516), respectively. The selection of which coefficient set to use is based upon information derived from measurements performed during the $2^{nd}$ type time intervals, and, in some embodiments, from measurements performed during $1^{st}$ time intervals.

Blocks (1532, 1534, 1536, 1538) indicate that during $1^{st}$ type time intervals (1504, 1508, 1512, 1516), the channel estimate used for coherent decoding and demodulation operations is (channel estimate 1, channel estimate 2, channel estimate 2, channel estimate 1), respectively, matching the coefficient set in use at the time. Blocks (1540, 1542, 1544, 1546) indicate that during $1^{st}$ type time intervals (1504, 1508, 1512, 1516), (channel estimate 1, channel estimate 2, channel estimate 2, channel estimate 1), respectively, are being updated.

Row 1548 indicates one exemplary method used in some embodiments, wherein if for a $1^{st}$ type time interval, a wireless terminal decides to use the same antenna coefficient set as used in the last preceding $1^{st}$ type time interval, then the channel estimate corresponding to the selected antenna coefficient set continues with the stored channel estimate corresponding to the antenna coefficient set; while if the wireless terminal decides to use a different antenna coefficient set than the antenna coefficient set used during the last preceding $1^{st}$ type time interval, then the channel estimate corresponding to the selected antenna coefficient set is reset to a re-initialization value, e.g., a predetermined value.

Consider the selection opportunity corresponding to arrow 1552. The wireless terminal decides to use antenna coefficient set 2 for $1^{st}$ type time interval 1508 as indicated by block 1522, which is different from the antenna coefficient used during preceding $1^{st}$ type time interval 1504 which was coefficient set 1 as indicated by block 1518. In this case the wireless terminal resets the channel estimate 2 to a re-initialization value, e.g., a predetermined value.

Consider the selection opportunity corresponding to arrow 1554. The wireless terminal decides to use antenna coefficient set 2 for $1^{st}$ type time interval 1512 as indicated by block 1526, which is the same as the antenna coefficient used during preceding $1^{st}$ type time interval 1508 which was coefficient set 2 as indicated by block 1522. In this case the wireless terminal continues with the stored channel estimate 2.

Consider the selection opportunity corresponding to arrow 1556. The wireless terminal decides to use antenna coefficient set 1 for $1^{st}$ type time interval 1516 as indicated by block 1530, which is different from the antenna coefficient used during preceding $1^{st}$ type time interval 1512 which was coefficient set 2 as indicated by block 1526. In this case the wireless terminal resets the channel 1 estimate to a re-initialization value, e.g., a predetermined value.

In some embodiments, which are a variation of the method described in row 1548, a reset when called for is directed to the channel estimate of the previous $1^{st}$ type time interval. For example, corresponding to the selection of arrow 1552, stored channel estimate 1 could have been reset, and operation would resume with stored channel estimate 2 which had been previously reset. Corresponding to selection opportunity 1554 no reset is performed, and operation continues with stored channel estimate 2. Corresponding to selection opportunity 1556 a reset is performed of channel estimate 2, and operation continues with stored channel estimate 1, which had been previously reset at 1552.

Row 1550 indicates an alternative method to the one described with respect to row 1548. In the exemplary method, of row 1550, used in some embodiments, a wireless terminal continues with the stored channel estimate corresponding to the antenna coefficient set selected. Consider the selection opportunity corresponding to arrow 1558. The wireless terminal decides to use antenna coefficient set 2 for $1^{st}$ type time interval 1508 as indicated by block 1522, and the wireless terminal continues with the stored channel estimate 2. Consider the selection opportunity corresponding to arrow 1560. The wireless terminal decides to use antenna coefficient set 2 for $1^{st}$ type time interval 1512 as indicated by block 1526, and the wireless terminal continues with the stored channel estimate 2. Consider the selection opportunity corresponding to arrow 1562. The wireless terminal decides to use antenna coefficient set 1 for $1^{st}$ type time interval 1516 as indicated by block 1530, and the wireless terminal continues with the stored channel estimate 1.

In some embodiments, a variation of the method of row 1550 is used, wherein the channel estimate corresponding to the selected antenna coefficient set for a $1^{st}$ type interval is continued following the selection; however, stored channel estimates are reset, e.g., to a predetermined value, if the channel estimate is not used for a predetermined interval of time, number of OFDM symbol transmission time periods, or number of $1^{st}$ type interval selection opportunities. As another variation, used in some embodiments, of the present invention, a stored channel estimate corresponding to an antenna gain coefficient set is reset, e.g., to a predetermined value, if a quality level indicator associated with the channel estimate falls below a predetermined value.

Figure 18:
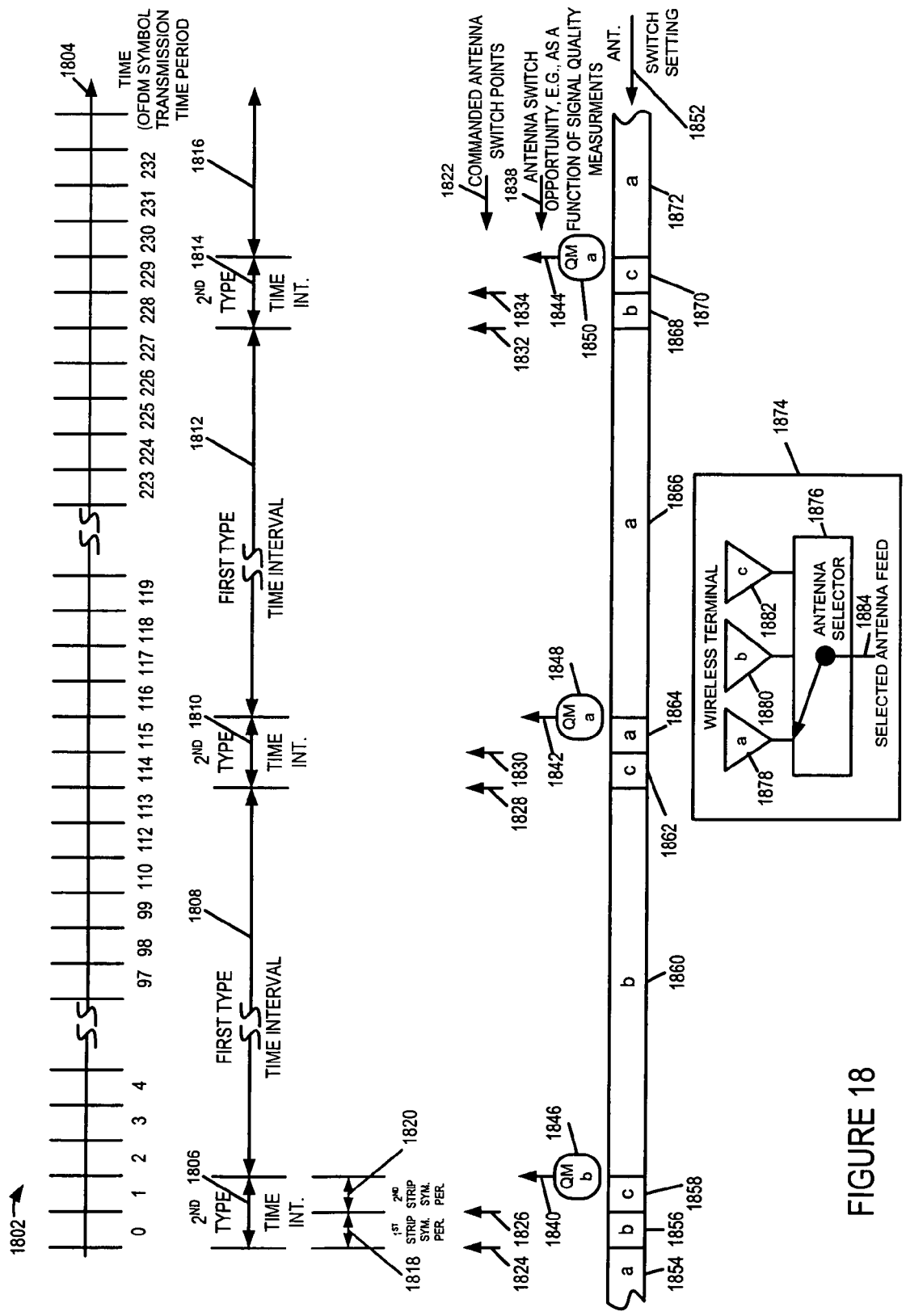
FIG. 18 is a drawing illustrating an exemplary downlink timing structure in accordance with the present invention and an exemplary wireless terminal implemented in accordance with the present invention.

FIG. 18 is a drawing illustrating an exemplary downlink timing structure 1802 in accordance with the present invention and an exemplary wireless terminal 1874 implemented in accordance with the present invention. Horizontal axis 1804 illustrates time in units of OFDM symbol transmission time periods. The exemplary downlink timing structure includes exemplary $2^{nd}$ type time intervals and exemplary first type time intervals. Each exemplary $2^{nd}$ type time interval includes 2 successive OFDM symbol transmission time periods, while each exemplary first type time interval includes 112 successive OFDM symbol transmission time periods. In the exemplary downlink timing structure, first and second type time intervals alternate. In FIG. 18, $2^{nd}$ type time interval 1806 is followed by first type time interval 1808, which is followed by $2^{nd}$ type time interval 1810, which is followed by first type time interval 1812, which is followed by $2^{nd}$ type time interval 1814, which is followed by another $1^{st}$ type time interval of which a portion 1816 is shown. Each exemplary second type time interval, e.g., $2^{nd}$ type time interval 1806, includes a $1^{st}$ strip OFDM symbol period 1818 and a $2^{nd}$ strip OFDM symbol period 1820, allowing the wireless terminal to obtain 2 independent signal quality measurements, one based on the received signal from each strip symbol time period.

Exemplary wireless terminal 1874 includes three antennas (antenna a 1878, antenna b 1880, antenna c 1882), an antenna selector 1876, and a selected antenna feed 1884. In some embodiments, the antennas are directional antennas. In accordance with the invention, the wireless terminal evaluates quality measurements corresponding to received signals using each of the antennas, and decides which antenna to select for a first type time interval. The wireless terminal 1874 operates using a selected primary antenna for each first type time interval, e.g., updating a channel estimate corresponding to the current primary antenna, receiving downlink user data signals and performing coherent modulation. During the first type time interval a received signal quality measurement is obtained. At the end of each first type time interval the wireless terminal antenna selection is switched to an alternative antenna for a first strip symbol period and then to a second alternative antenna for a second strip symbol period. One function of the $2^{nd}$ type time intervals is to allow the WT 1874 to evaluate received signals over each of the alternative antennas. For each of the strip symbol time periods, the WT 1874 obtains an independent signal quality measurement. The signal quality measurement corresponding to each strip symbol does not need to use, and in various embodiments does not use, information received outside the strip symbol time period in determining the corresponding signal quality measurement. The transmitted downlink signal for a strip symbol, in accordance with the present invention, has been intentionally constructed to include a mixture of at least some null tones and some non-null tones, e.g., some known non-null tones, thus facilitating a signal quality measurement which does not need to use information from other previous symbol transmission time periods. Therefore, for each set of: a first type time interval followed by two strip symbol periods, the WT 1874 has a set of three different signal quality measurements to compare, each corresponding to a different antenna.

The arrows (1824, 1826, 1828, 1830, 1832, 1834) of row 1822 identify commanded antenna switch points. The arrows (1840, 1842, 1844) of row 1838 indicate antenna switching opportunities, where the antenna may be switched, e.g., as a function of signal quality measurements obtained during the last first type time interval and the last two strip symbol time periods. Row 1852 indicates an exemplary sequence of antenna switch settings.

Consider that the wireless terminal 1874 has been operating using antenna a for the first type time interval preceding OFDM symbol transmission time period 0, as indicated by block 1854. At time 1824, the WT is commanded to switch to antenna b and remains on antenna b for a $1^{st}$ strip symbol period, as indicated by block 1856. Then at time 1826, the WT is commanded to switch to antenna c and remains on antenna c for the $2^{nd}$ strip symbol time period of $2^{nd}$ type time interval 1806, as indicated by block 1858. Thus the wireless terminal has been able to obtain 3 quality measurements, one associated with each of the antennas (a, b, c). The WT selects the antenna to use for the next first type time interval as a function of the obtained signal quality measurements. In some embodiments, the WT selects to use the antenna with the best, e.g., highest signal quality measurement, for the next first type time interval. For example, consider that the quality measurement corresponding to antenna b 1846 indicates the best signal quality, then at selection opportunity 1840, the WT 1874 selects to use antenna b, switches antenna from c to b and remains on antenna b for the next first type time interval 1808, as indicated by block 1860.

During the first type time interval 1808, the WT obtain a signal quality measurement associated with antenna b. At time 1828, the WT is commanded to switch to antenna c, switches to antenna c, and then remains on antenna c for a $1^{st}$ strip period as indicated by block 1862, and obtains a quality measurement associated with antenna c. Then, at time 1830, the WT is commanded to switch to antenna a, switches to antenna a, and then remains on antenna a for a 2nd strip period as indicated by block 1864, and obtains a quality measurement associated with antenna a.

For example, consider that the quality measurement corresponding to antenna a 1848 indicates the best signal quality, then at selection opportunity 1842, the WT 1874 selects to use antenna a. The WT 1874 does not need to switches antennas since the antenna selector 1876 is already set to antenna a. The WT 1874 remains on antenna a for the next first type time interval 1812, as indicated by block 1866.

During the first type time interval 1812, the WT obtain a signal quality measurement associated with antenna a. At time 1832, the WT is commanded to switch to antenna b, switches to antenna b, and then remains on antenna b for a $1^{st}$ strip period as indicated by block 1868, and obtains a quality measurement associated with antenna b. Then, at time 1834, the WT is commanded to switch to antenna c, switches to antenna c, and then remains on antenna c for a 2nd strip period as indicated by block 1870, and obtains a quality measurement associated with antenna c.

For example, consider that the quality measurement corresponding to antenna a 1850 indicates the best signal quality, then at selection opportunity 1844, the WT 1874 selects to use antenna a, switches antenna from c to a and remains on antenna a for the next first type time interval 1816, as indicated by block 1872.

In addition to performing channel quality measurements associated with each of the antennas, the wireless terminal performs channel estimation during at least each first type time intervals. In some embodiments, if the antenna selected does not change from one first type time interval to the next subsequent first type time interval, the channel estimate is maintained and continues from one first type time interval to the next first type time interval. For example, consider exemplary first type time interval 1812 and subsequent first type time interval portion 1816. The same antenna, antenna a, is used for both first type time intervals. The channel estimate at the end of interval 1812 is, in some embodiments, stored in memory at the end of interval 1812. Then, the channel estimate is allowed to resume at the start of interval 1816, without having been reset and using the stored value as the basis or its starting point.

In some embodiments, if the antenna selected is switched from one first type time interval to the next subsequent first type time interval, the channel estimation is reset, e.g., reinitialized for the new antenna. For example, at time 1840, the channel estimation, which will correspond to antenna b is reset, e.g., to a predetermined re-initialization value; and at time 1842, the channel estimation, which will correspond to antenna a, is reset, e.g., to a predetermined re-initialization value.

In some embodiments, if the antenna selected is switched from one first type time interval to the next subsequent first type time interval, a channel estimation is obtained from the preceding strip symbol recovered using the same selected antenna, the channel estimate being based on information from the strip symbol without using any prior channel information. Then, this strip symbol based channel estimate is used as the starting basis for the subsequent first type time interval. For example, a channel estimate corresponding to antenna b may be obtained based on the strip symbol recovered during OFDM symbol time period 0, then the channel estimate may be continued starting at time 1840. Also, a channel estimate corresponding to antenna a may be obtained based on the strip symbol recovered during OFDM symbol transmission time period 115; then the channel estimate may be continued starting at time 1842 for the subsequent first time period 1812.

Other embodiments of the invention may include a different number of OFDM symbol transmission time intervals in a $1^{st}$ type time interval and/or in a $2^{nd}$ type time interval. For example, some embodiments include a different number of OFDM symbol time periods in each second type time interval, e.g., one, three, or four OFDM symbol time periods. In various embodiments the ratio of the number of OFDM symbol time periods in a first type time interval is at least 40 times the number of OFDM symbol time periods in a second type time interval. In some embodiments, during a second type time interval an antenna selection may remain the same for multiple OFDM symbol transmission time periods, e.g., multiple consecutive OFDM symbol transmission time periods. For example, an exemplary second type time interval including four OFDM symbol transmission time periods may include two sets of 2 successive OFDM symbol transmission time periods, each set corresponding to a different antenna, and a channel quality measurement may be obtained for a given set.

In some embodiments, the number of antennas in a wireless terminal, among which selections may occur, does not match the number of strip symbol time periods in a $2^{nd}$ type time interval −1. For example, consider an embodiment using a second type time interval of two symbol time periods with an exemplary wireless terminal capable of switching between five antennas, a wireless terminal may be operating with a selected antenna for its first type time interval, and then during each second type time interval two alternate antennas may be selected from the four alternative antennas. In some such embodiments, two successive second type time intervals, which obtain quality information on each of the four alternatives, are completed before a wireless terminal is allowed to switch antennas to be used during first type time intervals. In some embodiments, switching is allowed after each second type time interval, wherein the antenna to be used during the next first type time interval is based on quality measurements of the last preceding first type time interval and the last second type time interval.

FIG. 18, has been described with respect to antenna switching; however, the invention is also applicable to embodiments, where the wireless terminal uses a plurality of antenna elements used in parallel with a set of gain coefficients, e.g., with a different set of gain coefficients corresponding to each of: a first time interval, a successive $1^{st}$ OFDM strip symbol time period, and a $2^{nd}$ OFDM strip symbol time period, and wherein the WT selects one of three gain coefficient sets for use in the next first type time interval period. In some such embodiments, antenna switching is functionally equivalent to the special case where gain coefficients sets are combinations of 0's and 1's. For example, consider a three antenna element embodiment with gain coefficient sets ($g_a$, $g_b$, $g_c$), wherein each of the gain coefficient value is a value between 0 and 1, corresponding to the three antenna elements used in parallel. To select solely antenna element a, the gain coefficient set is (1, 0, 0). To select solely antenna element b, the gain coefficient set is (0, 1, 0). To select solely antenna element c, the gain coefficient set is (0, 0, 1).

In some wireless communications systems, there may be a mixture of wireless terminals, operating differently with respect to operations related to strip symbol signaling. For example, some wireless terminals in the system may include only a single antenna and do not switch between different antennas. Other wireless terminals may include a first number of antennas, e.g., three, and switch between the antennas as a function of strip signal quality measurements. Other wireless terminals may include a second number of antennas, e.g., six, and switch between the antennas as a function of strip signal quality measurements. Still other wireless terminals may include a third number of antenna elements used in combination, support a fourth number of antenna gain coefficient sets, and switch between antenna gain coefficient sets as a function of strip signal quality measurements. Still other wireless terminals may include a fifth number of antenna elements used in combination, support a sixth number of antenna gain coefficient sets, and switch between antenna gain coefficient sets as a function of strip signal quality measurements.

Figure 19:
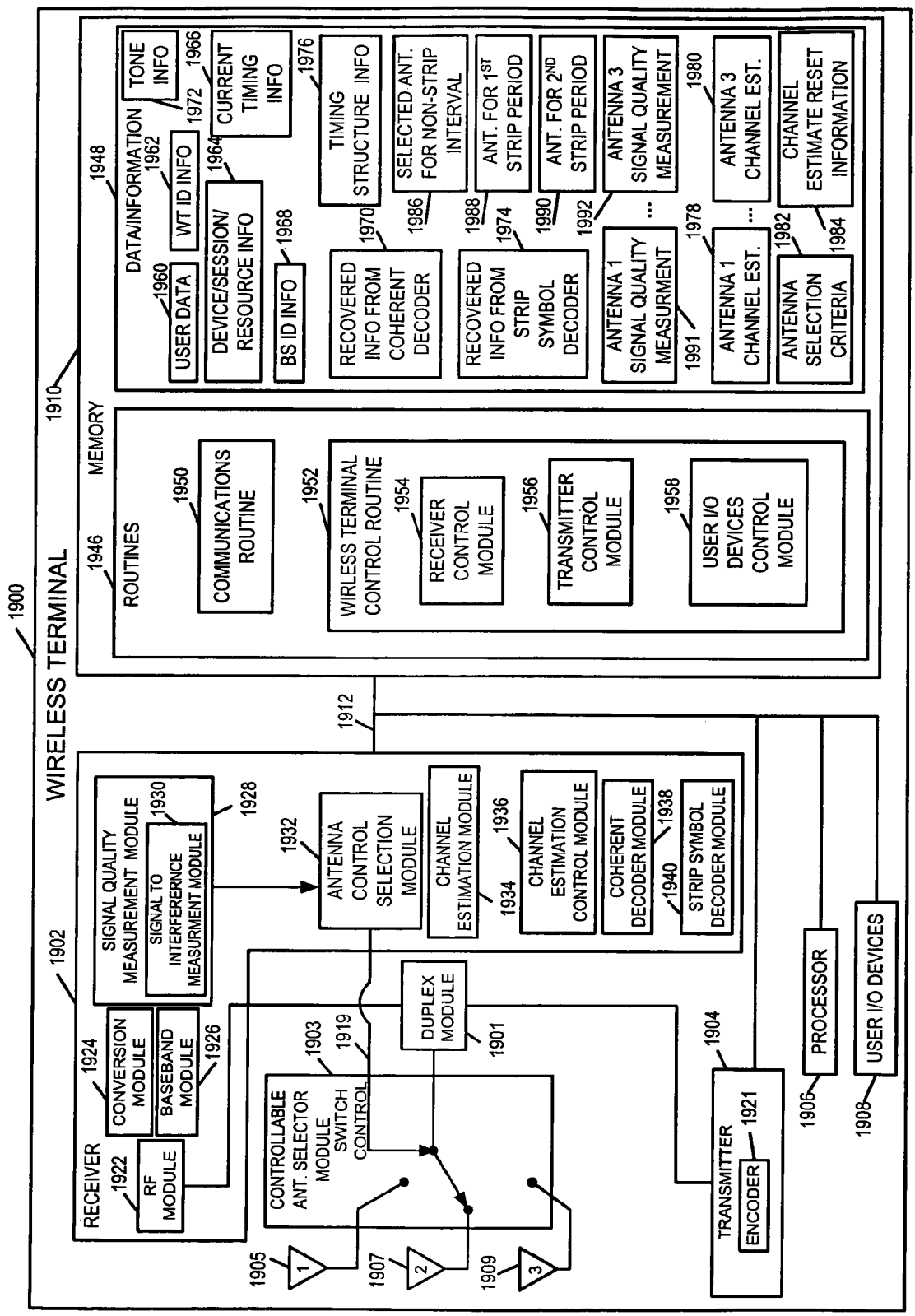
FIG. 19 is a drawing of an exemplary wireless terminal, e.g., a mobile node, implemented in accordance with the present invention and using methods of the present invention.

FIG. 19 is a drawing of an exemplary wireless terminal 1900, e.g., a mobile node, implemented in accordance with the present invention and using methods of the present invention. For example, exemplary wireless terminal 1900 may be a wireless terminal in an exemplary orthogonal frequency division multiplexing (OFDM) spread spectrum multiple access wireless communication system, implemented in accordance with the present invention.

Exemplary wireless terminal 1900 includes a receiver 1902, a transmitter 1904, a processor 1906, user I/O devices 1908, and a memory 1910 coupled together via a bus 1912 over which the various elements can interchange data and information. Exemplary wireless terminal 1900 also includes a duplex module 1901, a controllable antenna selector module 1903, an a plurality of antennas (antenna 1 1905, antenna 2 1907, antenna 3 1909). The duplex module 1901 couples both receiver 1902 and transmitter 1904 to the controllable antenna switching module 1903, allowing both transmitter and receiver to use the same selected antenna at the same time, yet while providing isolation between the transmitter 1904 output and the receiver 1902 input. Controllable antenna switching module 1903, e.g., a controllable switch, is controlled to switch an antenna feed line coupled to the duplex module to one of the plurality of antennas (1905, 1907, 1909) under the control of a switch control signal 1919 from an antenna control selection module 1932.

Receiver 1902 receives and processes downlink signals, e.g., downlink OFDM signals, from a base station. Downlink signals are received at any given time via one of the plurality of antennas (1905, 1907, 1909), the antenna depending upon the setting of the controllable antenna selection module 1903. Receiver 1902 also includes a RF module 1922, a conversion module 1924, a baseband module 1926, a signal quality measurement module 1928, an antenna control selection module 1932, a channel estimation module 1934, a channel estimation control module 1936, a coherent decoder module 1938, and a strip symbol decoder module 1940. The signal quality measurement module 1928 includes a signal to interference measurement module 1930.

The RF module 1922 is coupled to duplex module 1901 and receives and processes downlink passband signals. Conversion module 1924 coupled to RF module 1922 converts the received passband signals to baseband signals, which are processed by baseband module 1926.

Signal measurement module 1928 performs signal measurements on the signal output from the RF module and/or baseband module 1926 during different periods of time. In some embodiments, during time periods of a second type, an OFDM symbol is received which includes at least one null tone and a plurality of additional tones on which information is communicated using a modulation scheme which is not dependent upon previous OFDM symbol time periods. For example, an exemplary second type time period may include two successive OFDM symbol time periods, each referred to as a strip symbol period, and each strip symbol period may convey a strip OFDM symbol which is to be demodulated independently. Signal quality measurement module 1928 includes a signal to interference measurement module 1930. Signal to interference measurement module 1930 computes a signal to interference measurement as a function of a measurement of at least one null tone and at least one of the additional non-null tones, e.g., a known tone or a tone used to communicate coded bits of control information, in the OFDM symbol.

The antenna control selection module 1932 is coupled to the signal quality measurement module 1928. The antenna control selection module 1932 controls the wireless terminal to select different antennas during different periods of time. For example a first type period of time, e.g., of 112 consecutive OFDM transmission time periods may correspond to a current preferred antenna selection, and the first type period of time may include the processing of downlink user data and coherent demodulation using a channel estimate. An example of a second period of time may include two consecutive OFDM symbol time periods, and the antenna selected during each OFDM symbol transmission time period may use a different alternate antenna. The antenna control selection module 1932 generates a switch control signal 1919 sent to controllable antenna selector module 1903. For example, the downlink timing structure, is in some embodiments, constructed such the antenna switching and signal quality measurements are performed corresponding to each of the antennas, then a selection is performed using the quality measurements, and the antenna is coupled to the antenna corresponding to the best, e.g., highest, signal to interference measurement for the next first type time period. In some embodiments, antenna control selection module 1932 includes a sub-module to control antenna selection and/or switching for $2^{nd}$ type time intervals to test alternate communications channels corresponding to alternate antennas and another sub-module to control antenna selection and/or switching for $1^{st}$ type time intervals, e.g., to a selected preferred antenna for the next first type time interval based on a comparison of channel quality measurements.

The coherent decoding module 1938 performs coherent decoding to recover information communicated using coherent modulation during a period of time of a first type during which information is communicated using coherent modulation. Strip symbol decoder module 1940 performs decoding to recover information communicated during a period of time of a second type during which information is communicated to the wireless terminal, the information recovery method using a scheme which is based on using the signal received in a single OFDM symbol transmission time period corresponding to the strip symbol and does not rely on the channel estimation derived from the signal in any previous time or in a subsequent time. In some embodiments, the strip symbol decoder module 1940 performs two independent decoding operations during a second type time interval corresponding to two different antenna selections.

Channel estimation module 1934 generates a channel estimate during periods of time in which coherent modulation is used. The channel estimation control module 1936 is coupled to the channel estimation module 1934. The channel estimation control module 1936 controls the operation of channel estimates and/or the re-initialization of channel estimates. The channel estimation control module 1936 uses antenna selection information and previous antenna selection information in determining when to activate a channel estimation associated with a particular antenna, when to suspend a channel estimation associated with a particular antenna, and when to perform a reset of a channel estimation associated with a particular antenna.

Transmitter 1904 is coupled to one of the transmit antenna (1905, 1907, 1909), at a given time, through duplex module 1901 and controllable antenna selector module 1903, the transmitter 1904 transmits uplink signals, e.g., OFDM uplink signals, to a base station. Transmitter 1904 includes an encoder 1921 which can be used to encode information which is to be communicated in the uplink signals. User I/O devices 1908, e.g., microphone, speaker, display, keyboard, keypad, switches, camera, etc., are used to input user data/information, output user data/information, and to allow an operation to control at least some of the functions of the wireless terminal, e.g., initiate a user session, terminate a call, etc.

Memory 1910 includes routines 1946 and data/information 1948. The processor 1906, e.g., a CPU, executes the routines 1946 and uses the data/information 1948 in memory 1910 to control the operation of the wireless terminal 1900 and implement methods of the present invention.

Routines 1946 includes a communications routine 1950 and wireless terminal control routine 1952. The communications routine 1950 handles various communications operations and performs various communications protocols used by the wireless terminal. Wireless terminal control routine 1952 includes a receiver control module 1954, a transmitter control module 1956, and a user I/O devices control module 1958. The receiver control module 1954 controls the operation of receiver 1902; transmitter control module 1956 controls operations of the transmitter 1904. User I/O devices control module 1958 controls user I/O devices 1908.

Data/information 1948 includes user data 1960, e.g., voice data, audio data, image data, text data, etc., wireless terminal identification information 1962, e.g., a base station assigned wireless terminal active user identifier, device/session/resource information 1964, e.g., WT 1900 device information, peer node information, communication session information, routing information, and/or air link resource information such as assigned uplink and downlink channel segments, and downlink broadcast segment information. Data information 1948 also includes current timing information 1966, e.g., a current OFDM symbol time period index in a repetitive timing structure being used by the base station, base station identifier information 1968, e.g., a base station identifier, base station type identifier, sector and/or carrier identifier information.

Data/information 1948 also includes recovered information from coherent decoder 1970, recovered information from strip symbol decoder 1974, tone information 1972, timing structure information 1976, a plurality of sets of antenna signal quality measurements (antenna 1 signal quality measurement 1991, . . . , antenna 3 signal quality measurement 1992), a plurality of sets of channel estimation information (antenna 1 channel estimate 1978, . . . , antenna 3 channel estimate 1980), a selected antenna for non-strip interval 1986, e.g., the currently selected antenna for the first type time interval, antenna for $1^{st}$ strip period 1988, e.g., the current alternate antenna to be used for testing in the $1^{st}$ strip OFDM symbol transmission time period of a second type time interval, antenna for $2^{nd}$ strip OFDM symbol transmission time period 1990, e.g., the current second alternate antenna to be used for testing in the $2^{nd}$ strip OFDM symbol transmission time period of a second type time interval, antenna selection criteria 1982, and channel estimate reset information 1984. Each of the plurality of stored channel estimates corresponds to a different antenna, the channel estimation module 1934 maintaining different channel estimates in memory corresponding to the different antennas, the channel estimates are generated from processed signals which have been communicated using coherent modulation. Antenna signal quality measurements (1978, . . . , 1992) are output from signal quality measurement module 1928 and are input to antenna control selection module 1932. Antenna selection criteria 1982, e.g., predetermined switching limits, are used by antenna control selection module 1932 in comparing the quality measurements and making antenna selection decisions regarding the next first type time interval. Channel estimate reset information 1984 is used by the channel estimation control module 1936, e.g., in determining when to reset one of channel estimates (1978, . . . , 1980). Channel estimate reset information 1984 also includes information used by the channel estimation module 1934 when a reset is performed, e.g., a re-initialization value to be used at the start of the new estimate.

Figure 20:
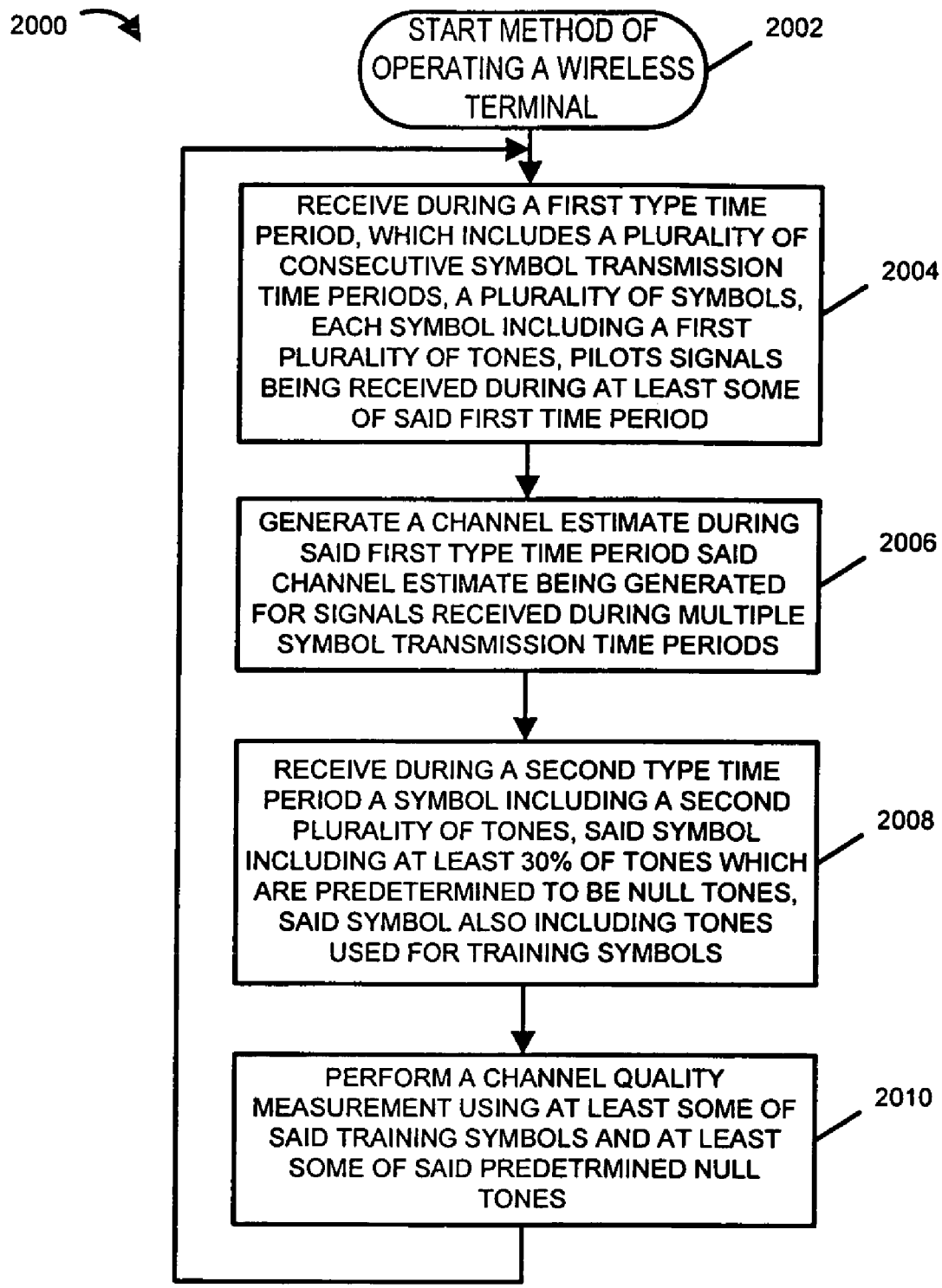
FIG. 20 is a drawing of a flowchart of an exemplary method of operating a wireless terminal in an exemplary wireless communications system in accordance with the present invention.

FIG. 20 is a drawing of a flowchart 2000 of an exemplary method of operating a wireless terminal in an exemplary wireless communications system in accordance with the present invention. The exemplary method starts in step 2002, where the wireless terminal is powered on and initialized. Operation proceeds from start step 2002 to step 2004. In step 2004, the wireless terminal is operated to receive during a first type time period which includes a plurality of consecutive symbol transmission time periods, a plurality of symbols, each symbol including a first plurality of tones. Pilot signals are received during at least some of said first time period. Operation proceeds from step 2004 to step 2006.

In step 2006, the wireless terminal generates a channel estimate during said first type time period, said channel estimate being generated for signals received during multiple symbol transmission time periods. Operation proceeds from step 2006 to step 2008. In step 2008, the wireless terminal is operated to receive during a second type time period a symbol including at least 30% of tones which are predetermined to be null tones, said symbol also including tones used for training symbols. In some embodiments, training symbols are transmitted at the same per-tone power as the coded modulation symbols. In some other embodiments, the per-tone transmission power of training symbols is, e.g., 3 dB to 5 dB, higher than that of coded modulation symbols. Operation proceeds from step 2008 to step 2010.

In step 2010, the wireless terminal is operated to perform a channel quality measurement using at least some of said training symbols and at least some of said predetermined null tones. Operation proceeds from step 2010 to step 2004.

In some embodiments, the first and second type time periods recur according to a predetermined transmission schedule and the number of symbol transmission time periods in each of said first type time periods is at least 40 times the number of symbol transmission time periods included in each second type transmission period. In some embodiments, each second type time period includes at most two symbol transmission time periods. In some embodiments, at least one first type time period occurs between each second type time period.

In various embodiments, broadcast control information is received on at least some tones during at least some of said second time periods. The broadcast control data received during said second type time periods being encoded using a modulation method which allows the received encoded broadcast control data to be decoded without the need for the use of information received during any other symbol transmission time period.

In some embodiments, the exemplary wireless communications system is an orthogonal frequency division multiplexing (OFDM) system, wherein at least 100 tones are used in parallel during each OFDM symbol transmission time period. For example, the wireless terminal may be a wireless terminal in a multiple access spread spectrum OFDM wireless communications system including a plurality of base stations, wherein each base station transmits downlink OFDM symbols in accordance with a downlink timing and frequency structure, e.g., using tone blocks of 113 downlink tones. In some such systems, the downlink timing structure includes a repetitive pattern of superslots, each superslot including a first portion, e.g., of two consecutive OFDM symbol transmission time periods followed by a second portion, e.g., of 112 consecutive OFDM symbol transmission time periods. In some such embodiments, at least some of the first superslot portions correspond to the second type time periods, and at least some of the second superslot portions correspond to first type time periods. In some embodiments, the first superslot portion corresponds to a broadcast channel, e.g., a broadcast channel which is multiplexed between various function including beacon signal/timing synchronization signals, paging signals, timing and/power control signals, and/or broadcast messages. In some embodiments, the second superslot portion corresponds to segments which include traffic downlink traffic channel segments. In some such embodiments, during first type time periods, pilots signals are transmitted, e.g., during each symbol transmission time interval of a first type time period, pilot signals are transmitted on a set of tones in the tone block, e.g., four out of the 113 downlink tones. In some embodiments, during an OFDM symbol transmission time period of a second type time period, at least 30% of the tones are null tones. In some such embodiments, a majority of the tones are null tones, e.g., 57 of the 113 downlink tones are intentionally left as null tones, in an OFDM symbol corresponding to a second type time interval. In some embodiments, during each OFDM symbol transmission period of a second type known modulation symbols are communicated on a fixed number of tones, e.g., 8 of the 113 downlink tones.

Figure 21:
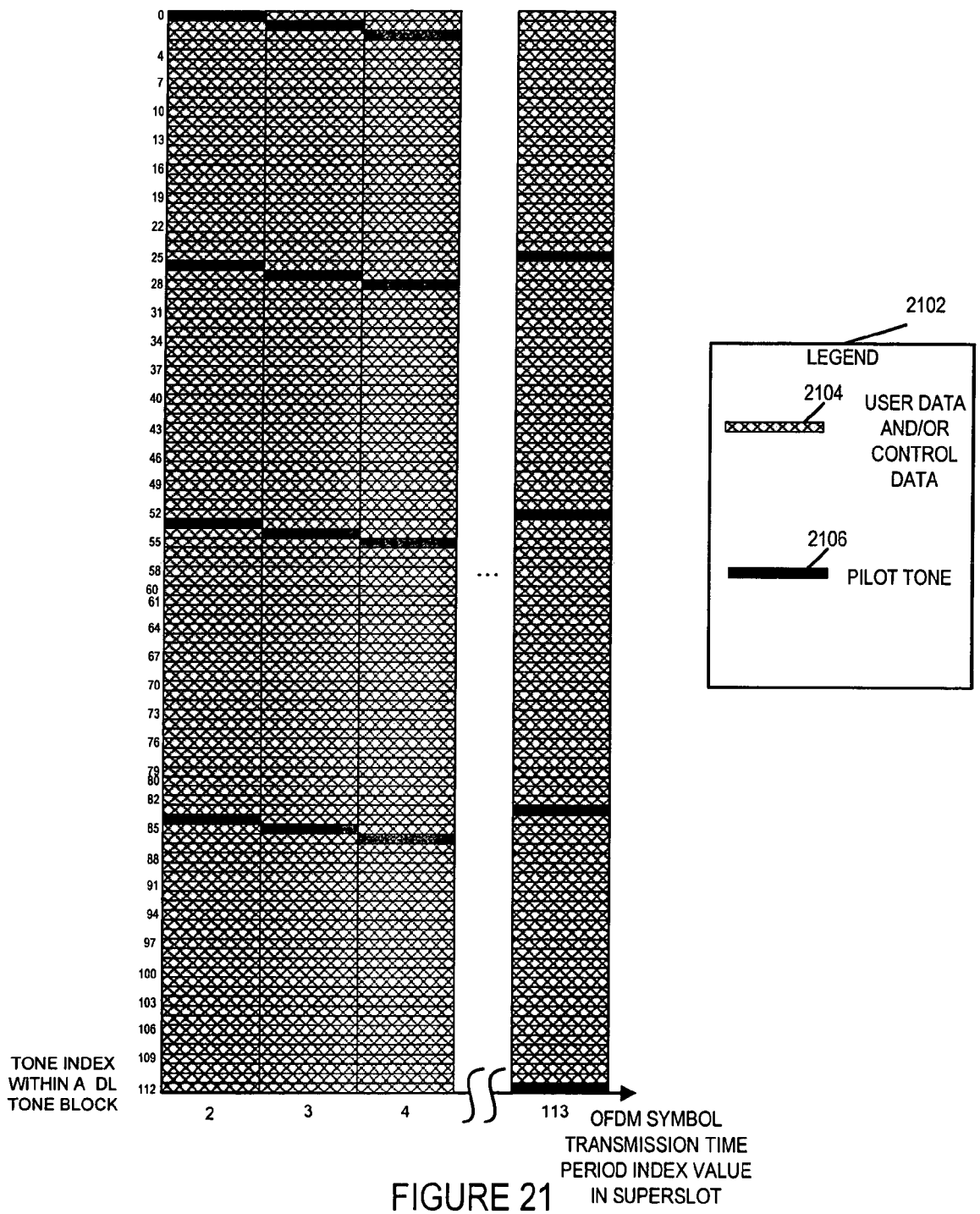
FIG. 21 is a drawing of an exemplary first type time interval, used in various embodiments of the present invention, e.g., corresponding to the method of flowchart 20.

FIG. 21 is a drawing of an exemplary first type time interval, used in various embodiments of the present invention, e.g., corresponding to the method of flowchart 20. Time frequency grid 2100 plots tone index (0, . . . , 112) within an exemplary downlink tone block of 113 tones vs OFDM symbol transmission time period index value (2, . . . , 113) in an exemplary superslot of 114 consecutive OFDM symbol transmission time periods. Each small rectangular box in grid 2100 represents the air link resource of a tone-symbol. Legend 2102 indicates that rectangular boxes of type 2104 with crosshatch shading represent user data and/or control data being communicated via the tone-symbol. Legend 2102 also indicates that rectangular boxes of type 2106 with solid shading indicate that a pilot tone is communicated via the tone-symbol. In exemplary time frequency grid 2100 there are four pilot tone modulation symbols communicated during each OFDM symbol transmission time period. In some embodiments, the DC tone, e.g., tone 56, is intentionally not used for conveying a modulation symbol value. In some such embodiments, if a pilot tone is mapped to the DC tone, e.g., based on a downlink timing and frequency structure, during an OFDM symbol transmission time interval, the pilot tone is not transmitted. For example, the number of pilots tones transmitted in such an OFDM symbol transmission time period may be reduced from four to three for that particular OFDM symbol transmission time period.

Figure 22:
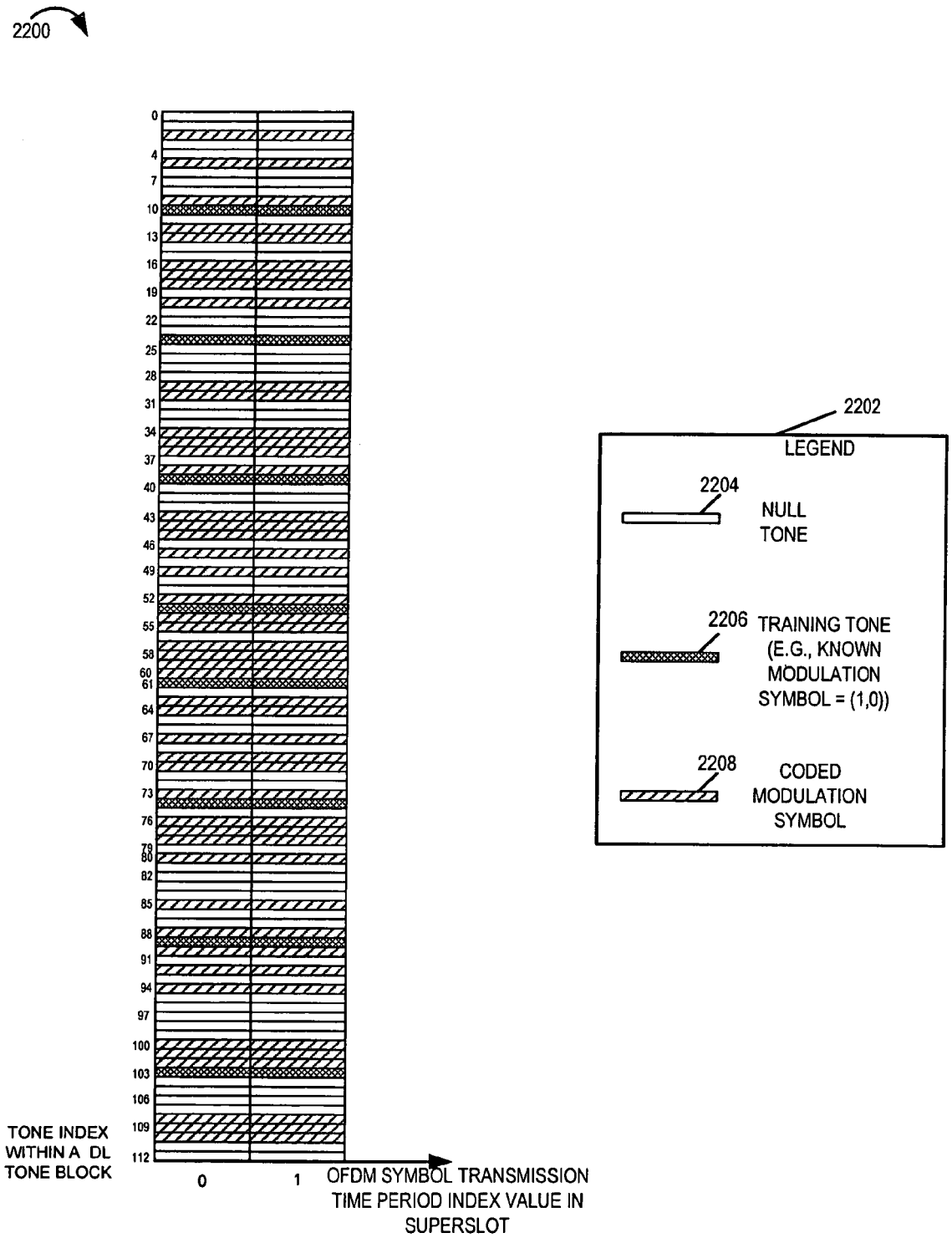
FIG. 22 is a drawing of an exemplary second type time interval, used in various embodiments of the present invention, e.g., corresponding to the method of flowchart 20.

FIG. 22 is a drawing of an exemplary second type time interval, used in various embodiments of the present invention, e.g., corresponding to the method of flowchart 20. Time frequency grid 2200 plots tone index (0, . . . , 112) within an exemplary downlink tone block of 113 tones vs OFDM symbol transmission time period index (0, 1) in an exemplary superslot of 114 consecutive OFDM symbol transmission time periods. Each small rectangular box in grid 2200 represents the air link resource of a tone-symbol. Legend 2202 indicates that rectangular boxes of type 2204 with no shading indicate a NULL tone being communicated using the tone-symbol. Legend 2202 also indicates that rectangular boxes of type 2206 with fine crosshatch shading indicate that a training tone, e.g., a known modulation symbol such as a known modulation symbol with value (1, 0), is communicated via the tone-symbol. Legend 2202 also indicates that rectangular boxes of type 2208 with diagonal line shading indicate that a coded modulation symbol, e.g., conveying coded bits of broadcast control information, is communicated via the tone-symbol. In exemplary time frequency grid 2200 there are 57 NULL tones, 8 known tones, and 48 tones used for coded modulation symbols during each OFDM symbol transmission time period.

While described in the context of an OFDM system, the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, strip signal generation, strip signal decode, registration, channel measurement, antenna coefficient evaluation, antenna coefficient selection, antenna coefficient testing, SNR, SIR, test value selection, test value switching control. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A method of operating a wireless terminal in a wireless communications system, the method comprising:
   receiving during a first type time period, which includes a plurality of consecutive symbol transmission time periods, a plurality of symbols, each symbol including a first plurality of tones, pilot signals being received during at least some of said consecutive symbol transmission time periods of said first type time period;
   generating a channel estimate during said first type time period, said channel estimate being generated for signals received during multiple symbol transmission time periods;
   receiving during a second type time period, a symbol including a second plurality of tones, said symbol including a plurality of tones which are predetermined to be NULL tones;
   measuring interference on one of said predetermined NULL tones included in said received symbol; and
   generating a value based on said measured interference.

2. The method of claim 1, wherein the plurality of tones which are predetermined to be NULL tones includes at least 30% of the tones received during said second type time period.

3. The method of claim 2, wherein during said second period of time, training symbols are received on a plurality of different tones in said symbol.

4. The method of claim 3, further comprising:
   performing a channel quality measurement using at least some of said predetermined NULL tones.

5. The method of claim 4, wherein said first and second type time periods recur according to a predetermined transmission schedule and wherein the number of symbol transmission time periods included in each of said first type time periods is at least 40 times the number of symbol transmission time periods included in each second type transmission time period.

6. The method of claim 5, wherein each second type time period includes at most two symbol transmission time periods.

7. The method of claim 6, wherein at least one first type time period occurs between each second type time period.

8. The method of claim 5, wherein each symbol of the first type time period includes the same number of pilot symbols and wherein each second type time period includes more training symbols than said same number of pilot symbols.

9. The method of claim 5, wherein the number of training modulation symbols communicated in a symbol of the second type time period is at least twice the number of pilot modulation symbols communicated in a symbol of the first type time period.

10. The method of claim 8, wherein user data encoded using coherent modulation is received during portions of said first time period.

11. The method of claim 10, wherein broadcast control information is received on at least some tones during at least some of said second type time periods, said broadcast control data received during said second type time periods being encoded using a modulation method which allows the received encoded broadcast control data to be decoded without the need for the use of information received during any other symbol transmission time period.

12. The method of claim 11, wherein said system is an OFDM system, and wherein at least 100 tones are used in parallel during each OFDM symbol transmission time period.

13. A method of operating a base station in a wireless communications system, the method comprising:
   transmitting during a first type time period, which includes a plurality of consecutive symbol transmission time periods, a plurality of symbols, each symbol including a first plurality of tones, pilot signals being transmitted during at least some of said consecutive symbol transmission time periods of said first type time period;
   transmitting during a second type time period a symbol including a second plurality of tones, said symbol including a plurality of tones which are predetermined to be NULL tones, said plurality of tones which are predetermined to be NULL tones includes at least 30% of the tones transmitted during said second type time period; and
   wherein said first and second type time periods recur according to a predetermined transmission schedule.

14. The method of claim 13, wherein said plurality of symbols includes OFDM symbols.

15. The method of claim 14, wherein transmitting during said second type time period includes transmitting training symbols on a plurality of different tones in said symbol.

16. The method of claim 15, wherein the number of symbol transmission time periods included in each of said first type time periods is at least 40 times the number of symbol transmission time periods included in each second type transmission time period.

17. The method of claim 16, wherein each second type time period includes at most two symbol transmission time periods.

18. The method of claim 17, wherein at least one first type time period occurs between each second type time period.

19. The method of claim 16, wherein each symbol of the first type time period includes the same number of pilot symbols and wherein each second type time period includes more training symbols than said same number of pilot symbols.

20. The method of claim 16, wherein the number of training modulation symbols communicated in a symbol during a second type time period is at least twice the number of pilot modulation symbols communicated in a symbol during a first type time period.

21. The method of claim 19, wherein transmitting during said first type time period includes transmitting user data encoded using coherent modulation during portions of said first time period.

22. The method of claim 21, wherein transmitting during said second type time period includes transmitting broadcast control information on at least some tones during at least some of said second type time periods, said broadcast control data transmitted during said second type time periods being encoded using a modulation method which allows the received encoded broadcast control data to be decoded without the need for the use of information received during any other symbol transmission time period.

23. The method of claim 22, wherein said system is an OFDM system, and wherein at least 100 tones are used in parallel during each OFDM symbol transmission time period.

24. The method of claim 1, wherein said generated value is a signal to interference value.

25. A wireless terminal for use in a wireless communications system, comprising:

receiver means for receiving, during a first type time period, which includes a plurality of consecutive symbol transmission time periods, a plurality of symbols, each symbol including a first plurality of tones, pilot signals being received during at least some of said consecutive symbol transmission time periods of said first type time period, and for receiving, during a second type time period, a symbol including a second plurality of tones, said symbol including a plurality of tones which are predetermined to be NULL tones;

means for generating a channel estimate during said first type time period, said channel estimate being generated for signals received during multiple symbol transmission time periods;

means for measuring interference on one of said predetermined NULL tones included in said received symbol; and means for generating a value based on said measured interference.

26. The wireless terminal of claim 25, wherein the plurality of tones which are predetermined to be NULL tones includes at least 30% of the tones received during said second type time period.

27. The wireless terminal of claim 26, wherein during said second period of time, training symbols are received on a plurality of different tones in said symbol.

28. The wireless terminal of claim 27, further comprising: means for performing a channel quality measurement using at least some of said predetermined NULL tones.

29. A wireless terminal for use in a wireless communications system, comprising:

a receiver for receiving, during a first type time period, which includes a plurality of consecutive symbol transmission time periods, a plurality of symbols, each symbol including a first plurality of tones, pilot signals being received during at least some of said consecutive symbol transmission time periods of said first type time period, and for receiving, during a second type time period, a symbol including a second plurality of tones, said symbol including a plurality of tones which are predetermined to be NULL tones;

a channel estimation module for generating a channel estimate during said first type time period, said channel estimate being generated for signals received during multiple symbol transmission time periods;

a signal quality measurement module for measuring interference on one of said predetermined NULL tones included in said received symbol; and wherein said signal quality measurement module generates a value based on said measured interference.

30. The wireless terminal of claim 29, wherein the plurality of tones which are predetermined to be NULL tones includes at least 30% of the tones received during said second type time period.

31. The wireless terminal of claim 30, wherein during said second period of time, training symbols are received on a plurality of different tones in said symbol.

32. The wireless terminal of claim 31, wherein said signal quality measurement module includes a signal to interference measurement module.

33. A device comprising a processor configured to control said device to implement a method of operating a wireless terminal in a wireless communications system, the method comprising:

receiving during a first type time period, which includes a plurality of consecutive symbol transmission time periods, a plurality of symbols, each symbol including a first plurality of tones, pilot signals being received during at least some of said consecutive symbol transmission time periods of said first type time period;

generating a channel estimate during said first type time period, said channel estimate being generated for signals received during multiple symbol transmission time periods;

receiving during a second type time period a symbol including a second plurality of tones, said symbol including a plurality of tones which are predetermined to be NULL tones;

measuring interference on one of said predetermined NULL tones included in said received symbol; and generating a value based on said measured interference.

34. The device of claim 33, wherein the plurality of tones which are predetermined to be NULL tones includes at least 30% of the tones received during said second type time period.

35. The device of claim 34, wherein during said second period of time, training symbols are received on a plurality of different tones in said symbol.

36. A computer readable medium embodying computer executable instructions for controlling a wireless terminal to implement a method in a wireless communications system, the method comprising:

receiving during a first type time period, which includes a plurality of consecutive symbol transmission time periods, a plurality of symbols, each symbol including a first plurality of tones, pilot signals being received during at least some of said consecutive symbol transmission time periods of said first type time period;

generating a channel estimate during said first type time period, said channel estimate being generated for signals received during multiple symbol transmission time periods;

receiving during a second type time period a symbol including a second plurality of tones, said symbol including a plurality of tones which are predetermined to be NULL tones;

measuring interference on one of said predetermined NULL tones included in said received symbol; and generating a value based on said measured interference.

37. The computer readable medium of claim 36, wherein the plurality of tones which are predetermined to be NULL tones includes at least 30% of the tones received during said second type time period.

38. The computer readable medium of claim 37, wherein during said second period of time, training symbols are received on a plurality of different tones in said symbol.

39. A base station for use in a wireless communications system, comprising:

transmitter means for transmitting signals;

transmitter control means for controlling:

i) transmission of a plurality of symbols, during a first type time period, which includes a plurality of consecutive symbol transmission time periods, each symbol including a first plurality of tones, pilot signals being transmitted during at least some of said consecutive symbol transmission time periods of said first type time period; and ii) transmission of a symbol including a second plurality of tones during a second type time period, said symbol including a plurality of tones which are predetermined to be NULL tones, said plurality of tones which are predetermined to be NULL tones includes at least 30% of the tones transmitted during said second type time period, said first and second type time periods recurring according to a predetermined transmission schedule.

40. The base station of claim 39, wherein said plurality of symbols includes OFDM symbols.

41. The base station of claim 40, wherein transmitting during said second type time period includes transmitting training symbols on a plurality of different tones in said symbol.

42. A base station for use in a wireless communications system, comprising:
 a transmitter for transmitting signals;
 a transmitter control module for controlling:
  i) transmission of a plurality of symbols, during a first type time period, which includes a plurality of consecutive symbol transmission time periods, each symbol including a first plurality of tones, pilot signals being transmitted during at least some of said consecutive symbol transmission time periods of said first type time period; and
  ii) transmission of a symbol including a second plurality of tones during a second type time period, said symbol including a plurality of tones which are predetermined to be NULL tones, said plurality of tones which are predetermined to be NULL tones includes at least 30% of the tones transmitted during said second type time period, said first and second type time periods recurring according to a predetermined transmission schedule.

43. The base station of claim 42, wherein said plurality of symbols includes OFDM symbols.

44. The base station of claim 43, wherein transmitting during said second type time period includes transmitting training symbols on a plurality of different tones in said symbol.

45. A device for use in a base station, said device comprising a processor configured to control said base station to implement a method in a wireless communications system, the method comprising:
 transmitting during a first type time period, which includes a plurality of consecutive symbol transmission time periods, a plurality of symbols, each symbol including a first plurality of tones, pilot signals being transmitted during at least some of said consecutive symbol transmission time periods of said first type time period; and
 transmitting during a second type time period, a symbol including a second plurality of tones, said symbol including a plurality of tones which are predetermined to be NULL tones, said plurality of tones which are predetermined to be NULL tones includes at least 30% of the tones transmitted during said second type time period, said first and second type time periods recurring according to a predetermined transmission schedule.

46. The device of claim 45, wherein said plurality of symbols includes OFDM symbols.

47. The device of claim 46, wherein transmitting during said second type time period includes transmitting training symbols on a plurality of different tones in said symbol.

48. A computer readable medium embodying computer executable instructions for controlling a base station to implement a method in a wireless communications system, the method comprising:
 transmitting during a first type time period, which includes a plurality of consecutive symbol transmission time periods, a plurality of symbols, each symbol including a first plurality of tones, pilot signals being transmitted during at least some of said consecutive symbol transmission time periods of said first type time period; and
 transmitting during a second type time period, a symbol including a second plurality of tones, said symbol including a plurality of tones which are predetermined to be NULL tones, said plurality of tones which are predetermined to be NULL tones includes at least 30% of the tones transmitted during said second type time period, said first and second type time periods recurring according to a predetermined transmission schedule.

49. The computer readable medium of claim 48, wherein said plurality of symbols includes OFDM symbols.

50. The computer readable medium of claim 49, wherein transmitting during said second type time period includes transmitting training symbols on a plurality of different tones in said symbol.

* * * * *